United States Patent

Totsuka et al.

Patent Number: 6,128,046
Date of Patent: Oct. 3, 2000

[54] KEY SIGNAL GENERATING APPARATUS AND PICTURE SYNTHESIS APPARATUS, AND KEY SIGNAL GENERATING METHOD AND PICTURE SYNTHESIS METHOD

[75] Inventors: Takashi Totsuka, Chiba; Taku Yokoyama; Tomoo Mitsunaga, both of Kanagawa, all of Japan

[73] Assignee: Sony Corporation, Tokyo, Japan

[21] Appl. No.: 08/765,286

[22] PCT Filed: May 10, 1996

[86] PCT No.: PCT/JP96/01251

§ 371 Date: Jan. 6, 1997

§ 102(e) Date: Jan. 6, 1997

[87] PCT Pub. No.: WO96/36168

PCT Pub. Date: Nov. 14, 1996

[30] Foreign Application Priority Data

May 12, 1995 [JP] Japan ................................ P7-113482

[51] Int. Cl.$^7$ ................................ H04N 9/74; H04N 9/75
[52] U.S. Cl. ........................ 348/590; 348/591; 348/595
[58] Field of Search ........................ 348/582, 590, 348/591, 592, 593, 594, 595, 596, 597, 598, 586, 585, 584, 587; 382/107; 358/182, 22, 183; H04N 9/74, 9/75

[56] References Cited

U.S. PATENT DOCUMENTS

| | | | |
|---|---|---|---|
| 4,463,372 | 7/1984 | Bennett et al. | 348/580 |
| 4,488,169 | 11/1984 | Yamamoto | 358/22 |
| 4,800,432 | 1/1989 | Barnett | 358/160 |
| 4,951,144 | 8/1990 | Jardins | 348/578 |
| 5,253,065 | 10/1993 | Richards et al. | 348/579 |
| 5,410,644 | 4/1995 | Thier | 395/125 |
| 5,416,529 | 5/1995 | Lake | 348/591 |
| 5,428,401 | 6/1995 | Hinson | 348/587 |
| 5,495,297 | 2/1996 | Fujimori | 348/591 |
| 5,539,475 | 7/1996 | Sadjadian et al. | 348/591 |
| 5,608,466 | 3/1997 | Nakamoto | 348/587 |
| 5,764,306 | 6/1998 | Steffano | 348/586 |

FOREIGN PATENT DOCUMENTS

| | | | |
|---|---|---|---|
| 58-9475 | 1/1983 | Japan | H04N 5/22 |
| 58-9476 | 1/1983 | Japan | H04N 5/22 |
| 60-232787 | 11/1985 | Japan | H04N 5/272 |
| 2-268082 | 11/1990 | Japan | H04N 5/262 |
| 4-70293 | 3/1992 | Japan | H04N 9/75 |
| 4-340671 | 11/1992 | Japan | G06F 15/66 |
| 5-153493 | 6/1993 | Japan | H04N 5/275 |
| 5-236347 | 9/1993 | Japan | H04N 5/275 |

Primary Examiner—Mark R. Powell
Assistant Examiner—Wesner Sajous
Attorney, Agent, or Firm—Limbach & Limbach LLP

[57] ABSTRACT

In this invention, when the portion from which a key signal α is to be generated of picture is caused to be foreground F, the portion except for the above is caused to be background B, and pixel value of pixels constituting that picture is designated at C, the key signal α is generated so as to satisfy the relational expression C'=(F−B)α'('(prime) represents differentiation). In more practical sense, a change detecting section 10 calculates change C' of pixel value between pixels constituting picture, and an F−B detecting section 30 calculates difference F−B between the foreground and the background. In addition, an integral value calculating section 40 divides the change C' by the difference F−B to integrate the result obtained by divisional operation to thereby determine key signal α. As a result, precise key signal can be obtained in this invention.

28 Claims, 36 Drawing Sheets

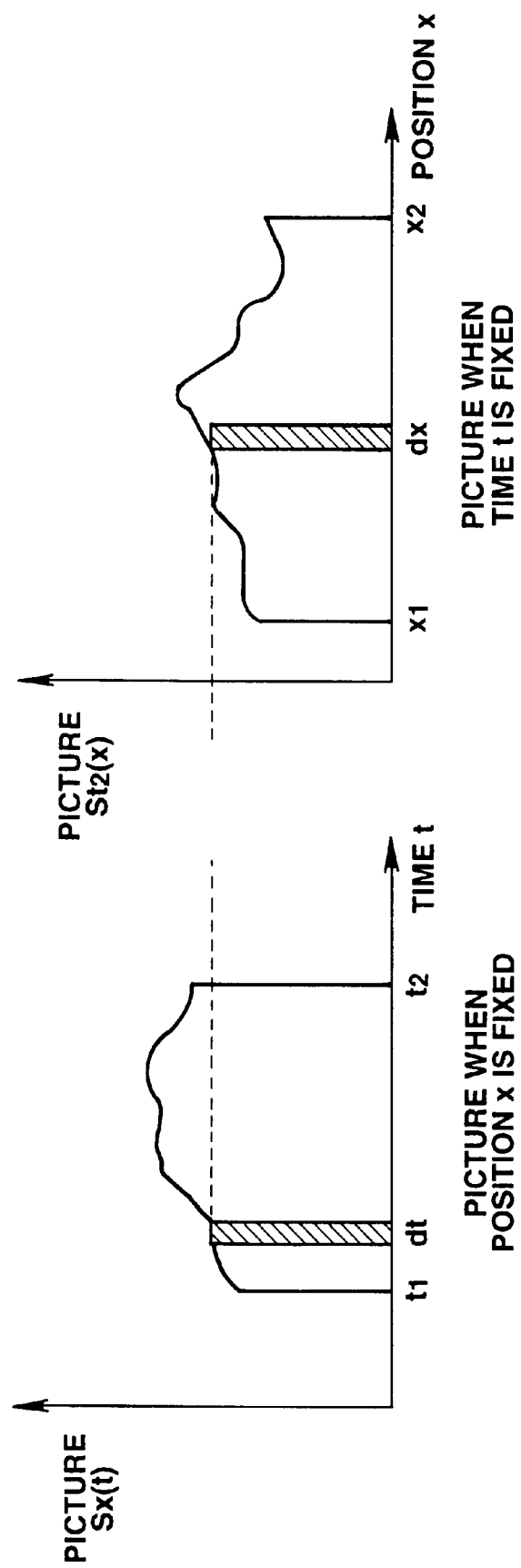
FIG.5A PICTURE WHEN POSITION x IS FIXED
FIG.5B PICTURE WHEN TIME t IS FIXED

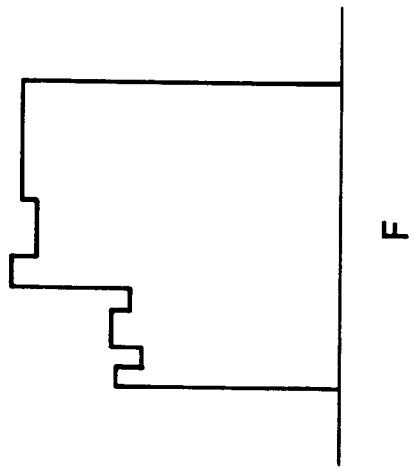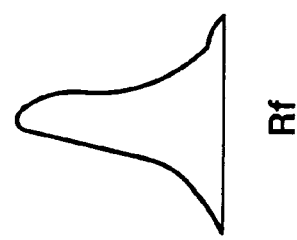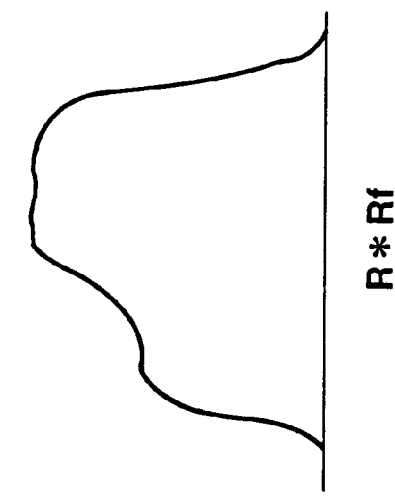
FIG.8

|    |    |    |        |    |    |    |
|----|----|----|--------|----|----|----|
| -1 | 0  | 1  |        | -1 | -2 | -1 |
| -2 | 0  | 2  | SOy    | 0  | 0  | 0  |
| -1 | 0  | 1  |        | 1  | 2  | 1  |

SOx (left), SOy (right)

$$|\delta f| = \sqrt{f_x^2 + f_y^2}$$

$$\theta = \tan^{-1}(f_y/f_x)$$

KEY SIGNAL GENERATING APPARATUS AND PICTURE SYNTHESIS APPARATUS, AND KEY SIGNAL GENERATING METHOD AND PICTURE SYNTHESIS METHOD

TECHNICAL FIELD

This invention relates to a key signal generating apparatus and a picture synthesis apparatus, and a key signal generating method and a picture synthesis method. More particularly, this invention relates to a key signal generating apparatus and a picture synthesis apparatus, and a key signal generating method and a picture synthesis method which are adapted for detecting change of pixel value between pixels constituting pictures to generate a key signal on the basis of the change of the pixel value, thereby making it possible to obtain an accurate key signal.

BACKGROUND ART

For example, in movies and other image productions, in the case where various simulations of pictures (images) are carried out, or any special effect is given to pictures, a remarked portion (object) is extracted from picture, or the extracted portion is synthesized with respect other pictures. Such a partial extraction from picture and/or synthesis (of the extracted portion) is carried out by using key signal.

As a technology relating to such a key signal, an example thereof is proposed in the specification and the drawings of the U.S. Pat. No. 4,488,169 (Registered Date: Dec. 11, 1984) by the applicant of this invention.

As the key signal, there are a key signal called hard key and a key signal called soft key. Now, in the case where, e.g., the remarked portion within picture used for generating the key signal is caused to be the foreground (foreground picture), and the portion except for the above is caused to be the background (background picture), a binary key signal (mask picture) in which the range of the foreground in the picture is caused (assumed) to be 1 and the range of the background is caused (assumed) to be 0 as shown in FIG. 1A is called hard key. On the contrary, a key signal which can take not only two values of 0 and 1, but also continuous real numbers within the range from 0 to 1 as shown in FIG. 1B in consideration of alias and/or motion blur which will be described later taking place in picture is called soft key. Here, the area where the key signal takes values within the range from 0 to 1 is called gray area as the occasion may demand.

Namely, it can be said that the hard key is a signal having a sharp boundary (border) line (signal in which inclination (gradient) of the boundary line where the key signal changes from 0 (or 1) to 1 (or 0) is sharp), and the soft key is a signal having a smooth (gentle) boundary (border) line (signal in which inclination (gradient) of the boundary line where the key signal changes from 0 (or 1) to 1 (or 0) is smooth (gentle)).

It is now assumed that a (a value) shown in FIGS. 1A and 1B indicates continuous key signal values and also indicates, in this case, values of the key signal of pixel units at the same time. In practice, e.g., continuous key signals are caused to undergo filtering by the range of pixel, etc. to use, as the key signal of the pixel unit, the result by that filtering at the center of corresponding pixel. In this case, in the picture, pixel value of the pixels at the boundary portion between the foreground and the background is a value in which respective signal components of the foreground and the background are interposed. From facts as above, it can be said that a indicates contribution ratio (factor) indicating to what degree the foreground contributes with respect to respective pixels.

Meanwhile, it is rare that in the case where both the foreground and the background are stationary, the boundary between the foreground and the background is positioned at the boundary line between pixels constituting a corresponding picture. Ordinarily, as shown in FIG. 2A, the boundary between the foreground and the background exists within the pixel having finite dimensions. However, since the pixel is the minimum unit constituting the picture, even if the boundary between the foreground and the background as described above exists within the pixel, that pixel is caused to have color or brightness (pixel value) of any one of the foreground and the background as shown in FIG. 2B. For this reason, the boundary line between the foreground and the background is drawn along the boundary line between pixels as shown in FIG. 2C. When the entirety of such a picture is viewed, unnatural flicker, i.e., alias takes place at the portion of the boundary between the foreground and the background (boundary line between pixels).

Accordingly, even if a key signal smoothly indicating the boundary line between the foreground and the background can be obtained, alias would take place in the synthetic picture obtained as the result of the fact that the key signal mentioned above is used to carry out picture synthesis.

In view of the above, as a method of preventing alias taking place in the synthetic picture, there are, e.g., methods disclosed in the Japanese Patent Application Laid Open No. 232787/1985 and the Japanese Patent Application Laid Open No. 340671/1992. In the case of the method disclosed in the Japanese Patent Application Laid Open No. 232787/1985, the hard key is used to carry out picture synthesis, and to apply low-pass filter (LPF) only to the boundary portion between the foreground and the background to allow the boundary portion thereof to be blurred to allow it to be smooth to look at. In this method, since the hard key is used, but LPF is applied to the boundary portion between the foreground and the background, it can be said that picture synthesis is carried out by using key in which the key signal is caused to have gradient (inclination), i.e., substantially soft key.

Moreover, in the method disclosed in the Japanese Patent Application Laid Open No. 340671/1992, a block in which a remarked pixel on the boundary between the foreground and the background is caused to be the center is set to calculate a key signal (soft key) from the pixel pattern constituting the foreground and the background within that block to carry out, by using such a key signal, extraction of the foreground, and synthesis of the foreground and the background to thereby reduce the alias.

However, since the soft key used in the above-mentioned method is such that value of a at the inclined (gradient) portion (the portion of 0<α<1 in FIG. (B)), i.e., in the gray area is uniform, there was the problem that it is difficult to cope with motion blur taking place, e.g., in the case where the foreground is moving.

The motion blur will now be briefly described. The moving picture is realized as the result of the fact that picture (still picture) is continuously displayed, e.g., in frame units, etc. For example, assuming now that a circular object moving from the left direction to the right direction within picture exists, in the case where the frame period is assumed to be a short time such that it can be considered to be infinitesimal (infinitely small) with respect to the movement velocity of that object, that object is displayed as a circular object in respective frames as shown in FIG. 3A. However, in the case where the frame period is not a short time such that it can be considered to be infinitesimal with respect to the movement velocity of the circular object, picture of frame at a certain time $t_2$ becomes a picture in which movement of the object from time $t_1$ of frame preceding by one to the time $t_2$ is reflected as shown in FIG. 3B. Namely, the object within the picture of the frame at the time $t_2$ is not circular picture image, but picture image extended (elongated) in a thin manner in the direction of that motion such that the contour is blur. Such a phenomenon is called motion blur.

It is to be noted that while motion blur takes place not only in the case where any one of the foreground and the background is moving, but also in the case where both are independently moving, in the case where only the background is moving and in the case where both are independently moving, it is possible to consider those cases similarly to the case where only the foreground is moving if the background is taken as reference. In addition, in the case where motion blur takes place, clear boundary between the foreground and the background does not exist.

As a method of generating a key signal in which motion blur is taken into consideration as described above, there are methods, e.g., the Japanese Patent Application Laid Open No. 153493/1993 and the Japanese Patent Application Laid Open No. 236347/1993. In the method disclosed in the Japanese Patent Application Laid Open No. 153493/1993, current frame and frame preceding (earlier) by one are compared with each other to thereby determine sum total with respect to the entirety of frame of change quantities (magnitudes) of pixel value of pixels constituting the foreground of the current frame (or the frame preceding by one) and pixel value corresponding to pixels of the frame preceding by one (or the current frame) to determine the gray area of the soft key from the sum total value. However, in this method, since the soft key is determined in dependency upon the above-described change quantity of pixel value (difference between pixel values of the same pixel), the direction of movement of the foreground is not taken into consideration, so whether or not correct soft key corresponding to that movement can be obtained was not clear.

On the other hand, in the method disclosed in the Japanese Patent Application Laid Open No. 236347/1993, an approach is employed to first generate hard key to shave, at respective points on the boundary between the foreground and the background, the side surface of that hard key (side surfaces of column in which the portion of $\alpha=1$ is caused to be the bottom surface shown in FIG. 1A) by the elliptical cone to thereby generate soft key. In this case, the long axis and the short axis of the ellipse constituting the bottom surface of the elliptical cone is determined by motion vector of the remarked portion and the magnitude of the edge intensity. However, in this method, the direction of the edge intensity is not correctly taken into consideration. For this reason, whether or not precise or correct soft key corresponding to movement of the foreground can be obtained was not clear similarly to the above.

This invention has been made in view of such circumstances and can contemplate generating a key signal which is precisely coping with motion blur, and permits the influence of alias to be reduced.

DISCLOSURE OF THE INVENTION

A key signal generating apparatus according to this invention comprises change detecting means for detecting change of pixel value between pixels constituting picture, and key signal generating means for generating a key signal on the basis of the change of the pixel value outputted from the change detecting means.

A picture synthesis apparatus according to this invention comprises change detecting means for detecting change of pixel value between pixels constituting a first picture, key signal generating means for generating a key signal on the basis of the change of the pixel value outputted from the change detecting means, and synthesis means for synthesizing foreground picture of the first picture and background picture of a second picture by using the key signal generated by the key signal generating means.

A key signal generating method according to this invention comprises the steps of detecting change of pixel value between pixels constituting picture, and generating a key signal on the basis of the change of the pixel value.

A picture synthesis method according to this invention comprises the steps of detecting change of pixel value between pixels constituting a first picture, generating a key signal on the basis of the change of the pixel value, and synthesizing foreground picture of the first picture and background picture of a second picture by using that key signal.

In the key signal generating apparatus according to this invention, the change detecting means detects change of pixel value between pixels constituting picture, and the key signal generating means generates a key signal on the basis of the change of the pixel value outputted from the change detecting means.

In the picture synthesis apparatus according to this invention, the change detecting means detects change of pixel value between pixels constituting a first picture, and the key signal generating means generates a key signal on the basis of the change of the pixel value outputted from the change detecting means. In addition, the synthesis means synthesizes foreground picture of the first picture and background picture of a second picture by using the key signal generated by the key signal generating means.

In the key signal generating method according to this invention, change of the pixel value between pixels constituting picture is detected to generate a key signal on the basis of the change of the pixel value.

In the picture synthesis method according to this invention, change of pixel value between pixels constituting a first picture is detected to generate a key signal on the basis of the change of the pixel value to synthesize foreground picture of the first picture and the background picture of a second picture by using the key signal thus generated.

BRIEF DESCRIPTION OF THE DRAWINGS

FIGS. 5A–5B are views for explaining a method of calculating picture in which motion blur takes place.

FIG. 8 is a view showing that local texture of the foreground F to which the effect of motion blur has been applied is considered to be uniform.

BEST MODE FOR CARRYING OUT THE INVENTION

Prior to description of preferred embodiments of this invention, in order to clarify the correspondence relationship between respective means of the invention described in the claims and the embodiments described below, the features of this invention will be described in the following manner in the state where the description of corresponding embodiments (which should be considered to be as examples) are added within parentheses after respective means.

Figure 10:
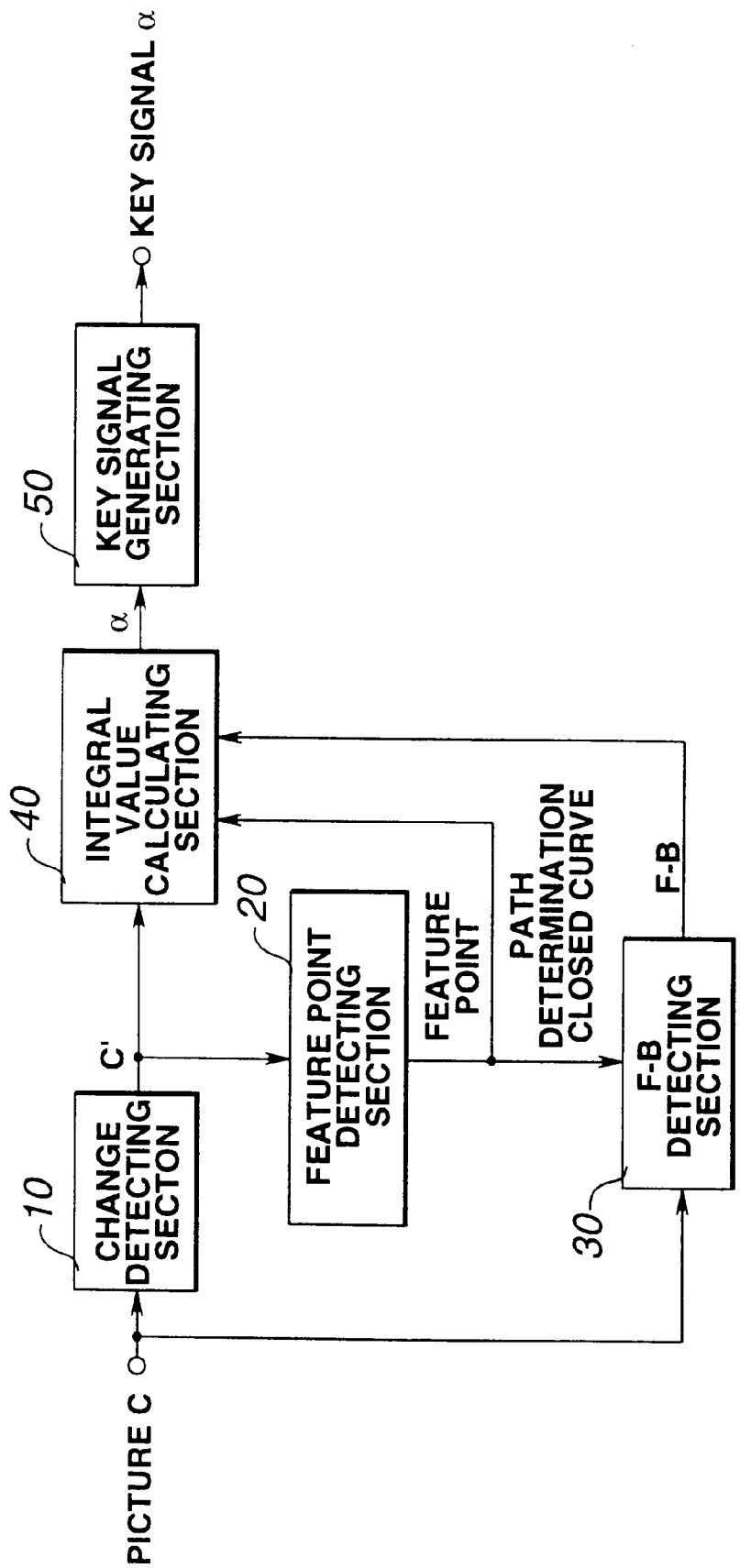
FIG. 10 is a block diagram showing the configuration of a first embodiment of a key signal generating apparatus to which this invention is applied.
Figure 30:
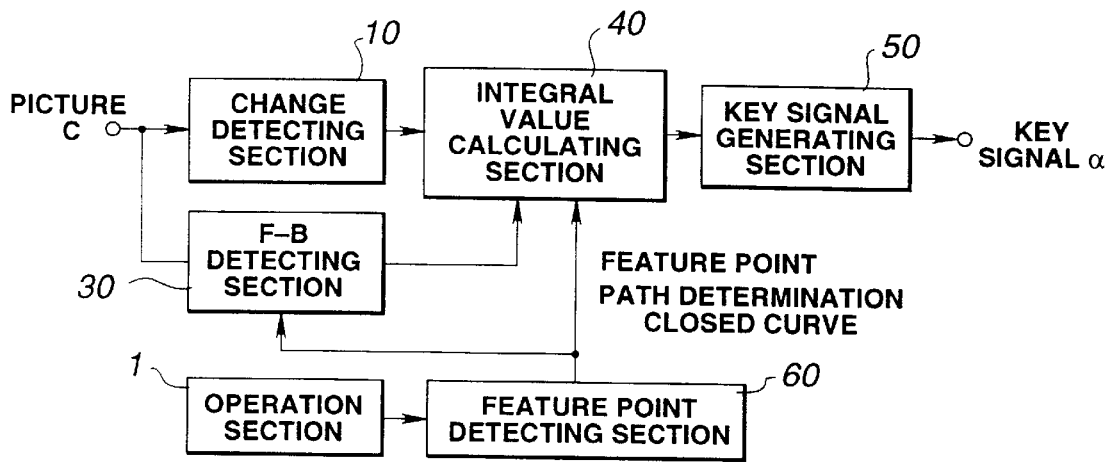
FIG. 30 is a block diagram showing the configuration of a second embodiment of the key signal generating apparatus to which this invention is applied.
Figure 33:
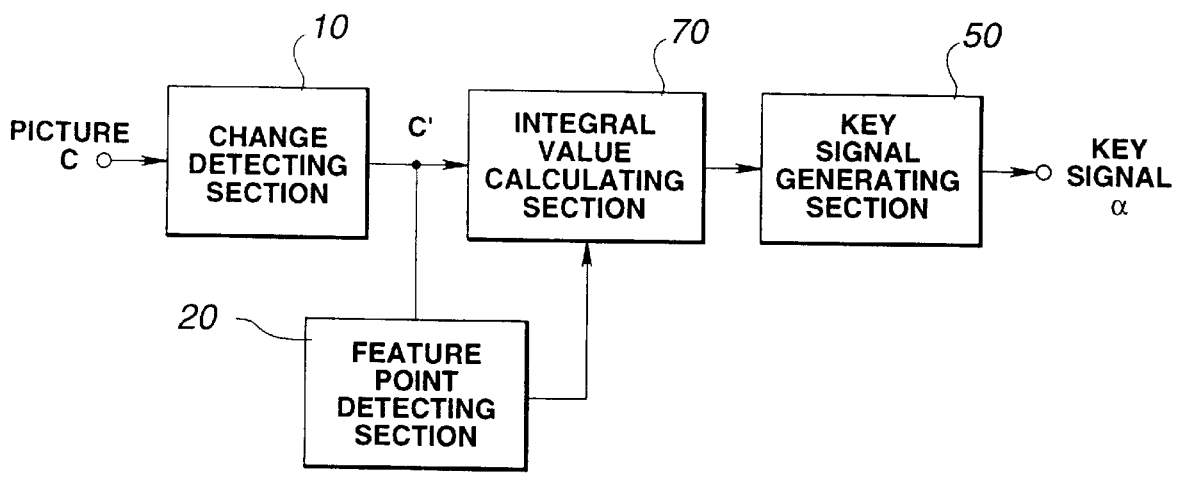
FIG. 33 is a block diagram showing a third embodiment of the key signal generating apparatus to which this invention is applied.

Namely, a key signal generating apparatus according to this invention is directed to a key signal generating apparatus adapted for generating a key signal from picture, the apparatus comprising: change detecting means (e.g., change detecting section 10, shown in FIG. 10, 30 or 33, etc.) for detecting change of pixel value between pixels constituting picture; and key signal generating means (e.g., integral value calculating section 40 shown in FIG. 10 or 30, or integral value calculating section 70 and key signal generating section 50 shown in FIG. 33, etc.).

The key signal generating apparatus according to this invention further comprises difference detecting means (e.g., F–B detecting section 30 shown in FIG. 10 or 30, etc.) for detecting difference between foreground picture and background picture constituting the picture to output difference information indicating the difference, wherein the change detecting means outputs change information indicating change of pixel value, and the key signal generating means generates the key signal on the basis of the difference information and the change information.

In the key signal generating apparatus according to this invention, the key signal generating means comprises normalizing means (e.g., normalization executing section 42 shown in FIG. 24, etc.) for normalizing the change information by the difference information to output normalized information obtained as the result of the normalization, and integration executing means (e.g., integration executing section 43 shown in FIG. 24, etc.) for integrating the normalized information along a predetermined integral path).

Figure 36:
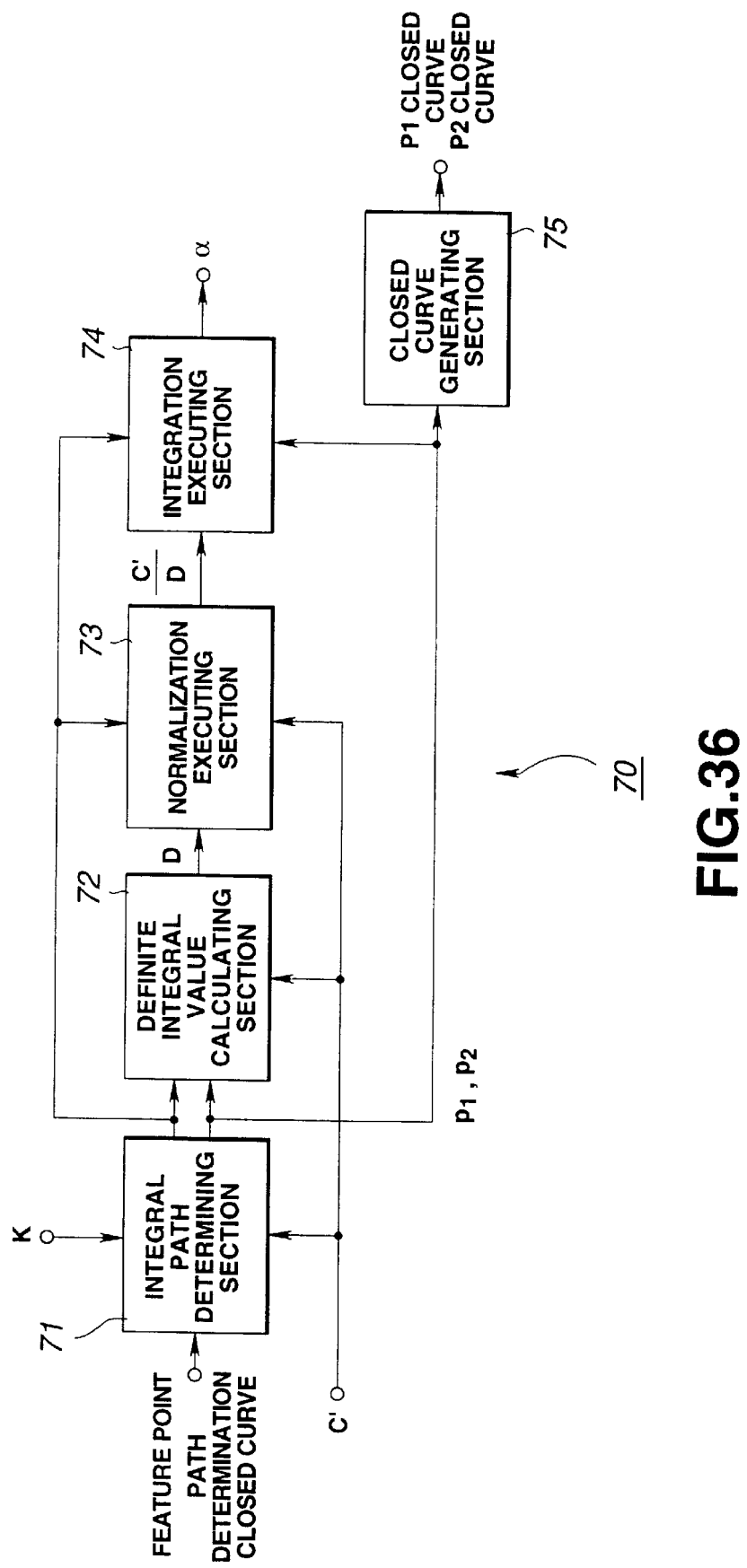
FIG. 36 is a block diagram showing an example of the configuration of the integral value calculating section 70 of FIG. 33.

In the key signal generating apparatus according to this invention, the key signal generating means comprises range detecting means (e.g., integral path determining section 71 shown in FIG. 36, etc.) for detecting integral range, definite integral information generating means (e.g., definite integral value calculating section 72 shown in FIG. 36, etc.) for integrating the change information along a predetermined integral path within the integral range to generate definite integral information of the change information within the integral range, normalizing means (e.g., normalization executing section 73 shown in FIG. 36, etc.) for normalizing the change information by the definite integral information to output normalized information obtained as the result of the normalization, and integration executing means (e.g., integration executing section 74 shown in FIG. 36, etc.) for integrating the normalized information to thereby generate a key signal.

A picture synthesis apparatus according to this invention is directed to a picture synthesis apparatus adapted for receiving a first picture consisting of at least foreground picture and background picture, and a second picture consisting of at least background picture to synthesize the foreground picture of the first picture and the background picture of the second picture, the apparatus comprising: change detecting means (e.g., change detecting section 10 shown in FIG. 10, 30 or 33, etc.) for detecting change of pixel value between pixels constituting the first picture; key signal generating means (e.g., integral value calculating section 40 shown in FIG. 10 or 30, or integral value calculating section 70 shown in FIG. 33, etc.) for generating a key signal on the basis of the change of the pixel value outputted from the change detecting means; and synthesis means (e.g., mixer 85 shown in FIG. 38 or mixer 96 shown in FIG. 39, etc.) for synthesizing the foreground picture of the first picture and the background picture of the second picture by using the key signal generated by the key signal generating means.

The picture synthesis apparatus according to this invention further comprises difference detecting means (e.g., F–B detecting section 30 shown in FIG. 10 or 30, etc.) for detecting difference between the foreground picture and the background picture of the first picture to output difference information indicating the difference thus detected, wherein the change detecting means outputs change information indicating the change of the pixel value, and the key signal generating means generates the key signal on the basis of the difference information and the change information.

It should be noted that it is a matter of course that the foregoing description does not mean that the respective means are limited to the above-mentioned components.

The theoretical ground (principle) of this invention will now be described. It is to be noted that picture is assumed to be one-dimensional picture here for the brevity of explanation.

It is now assumed that pixel value of pixel at position (coordinate) x constituting one-dimensional picture C. Moreover, the picture C is assumed to consist of foreground (foreground picture) F and background (background picture) B, and pixel values of pixel at the position x constituting the foreground F and the background B are respectively designated at $F(x)$ and $B(x)$. It is further assumed that value at the position x of the key signal for extracting the foreground F from the picture C (contribution ratio of the foreground F at the position x) is $\alpha(x)$. In this case, it is assumed that $\alpha(x)$ takes a value within the range from 0 to 1, and respectively takes 1 and 0 at positions of pixels completely constituting the foreground F and the background B. In addition, at the positions of pixels where the foreground F and the background B are mixed, $\alpha(x)$ is assumed to take a value corresponding to the degree of contribution of pixel value of the foreground F.

In this case, the pixel value $C(x)$ of pixels constituting the picture C is considered to be value in which the pixel value $F(x)$ of pixels constituting the foreground F and the pixel value $B(x)$ of pixels constituting the background B are synthesized at a ratio corresponding to the key signal $\alpha(x)$. Accordingly, the pixel value $C(x)$ can be expressed by the following equation (1):

$$C(x)=\alpha(x)F(x)+(1-\alpha(x))B(x) \tag{1}$$

Here, the previously described alias takes place because pixel has definite size (dimensions), and motion blur takes place in the case where any one of the foreground F and the background B is moving, and in the case where both are independently moving. Explanation will now be given in a manner classified into four cases:

[1] Case where the foreground F and the background B are stationary, and pixels can be considered to be infinitely small.

[2] Case where the foreground F or the background B is moving, and pixels can be considered to be infinitely small.

[3] Case where the foreground F and the background B are stationary, and pixels have definite size (dimensions).

[4] Case where the foreground F or the background B is moving, and pixels have definite size (dimensions).

[1] Case where the foreground F and the background B are stationary, and pixels are considered to be infinitely small.

In this case, since the foreground F and the background B are stationary, no motion blur takes place. Moreover, since pixels are considered to be infinitely small, no alias also takes place. Accordingly, the key signal $\alpha(x)$ takes any one of value of 0 and 1, and the position x where that value becomes equal to 1 is in correspondence with the existing range of the foreground F.

Here, when the equation (1) is differentiated by x, the equation (2) is obtained. It should be noted that description of argument (x) of the function is omitted as the occasion may demand.

$$C'=(F-B)\alpha'+(F'-B')\alpha+B' \tag{2}$$

In the above equation, ' (prime) represents differentiation.

Figure 4A:
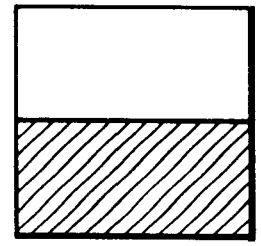
FIGS. 4 and 4A are views showing the state where local texture of picture is considered to be uniform.
Figure 4:
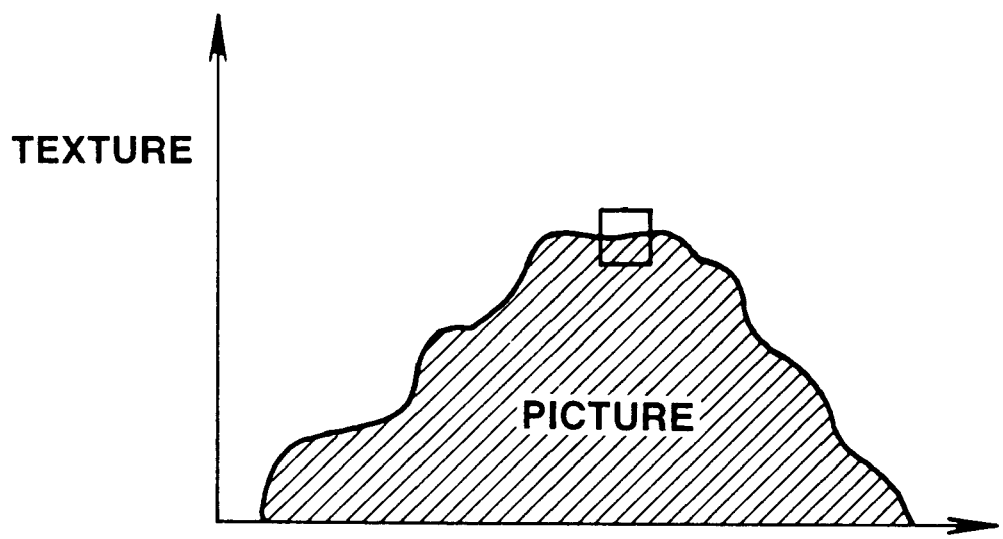

In the case where ordinary picture is assumed, texture (pixel value) of the foreground F and the background B is not uniform, but varies as shown in FIG. 4. However, in the case where the foreground F and the background B are locally viewed, e.g., in pixel units, etc., that texture can be considered to be uniform as shown in the FIG. 4 mentioned above. Accordingly, from a local point of view, the pixel value of the foreground F and the pixel value of the background B can be considered to be constant. As a result, the differential value F' and the differential value B' can be both considered to be zero (0). From this fact, the equation (2) can be rewritten into the following equation (3):

$$C'=(F-B)\alpha' \tag{3}$$

Since the differential value C' of the left side of the equation (3) is a value obtained by differentiating pixel value $C(x)$ constituting the picture C by x, this differential value C' represents change of pixel value between pixels constituting the picture C. It is seen from the equation (3) that change $C'(x)$ of pixel value between pixels of the picture C and differential value $\alpha'(x)$ of the key signal have the proportional relationship in which difference $F(x)-B(x)$ between pixel value $F(x)$ of the foreground F and pixel value $B(x)$ of the background B is caused to be proportional constant.

[2] Case where the foreground F or the background B is moving and pixels can be considered to be infinitely small.

Figure 1A:
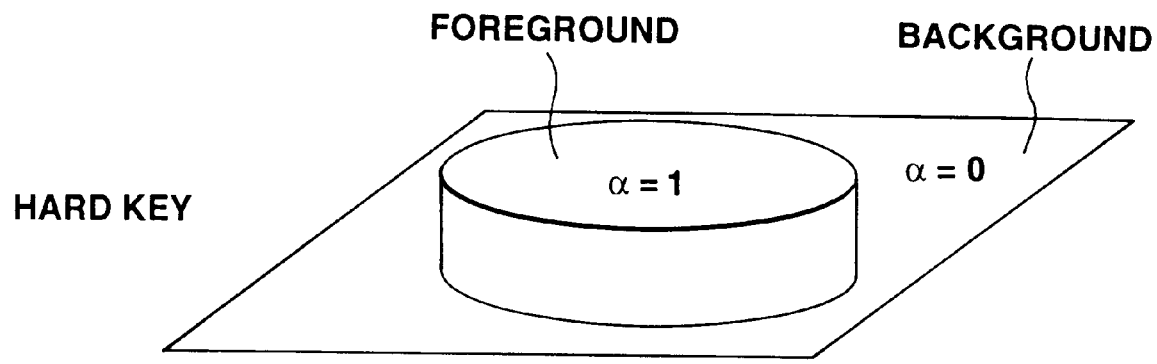
FIG. 1A is a view for explaining hard key.
Figure 1B:
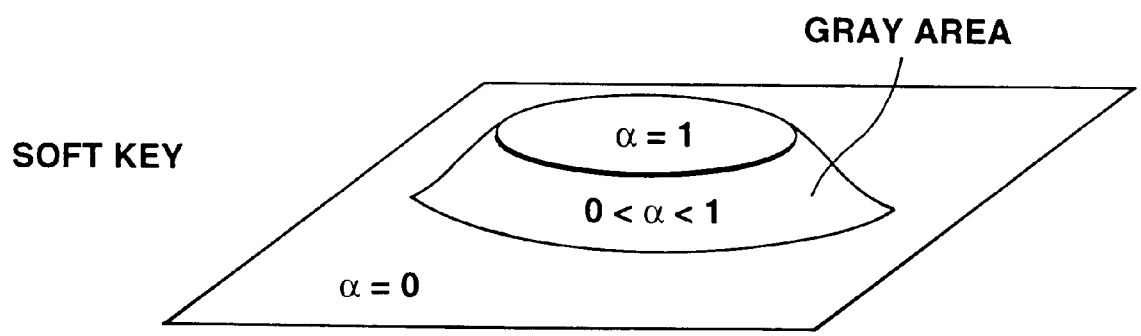
FIG. 1B is a view for explaining soft key.
Figures 2A, 2B, 2C:
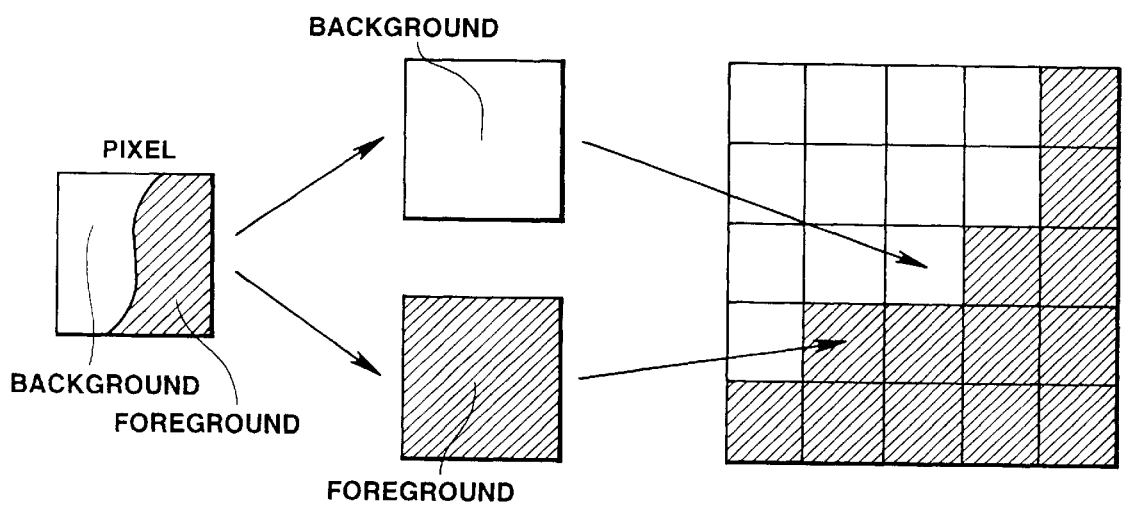
FIGS. 2A, 2B and 2C are views for explaining alias.
Figures 3A, 3B:
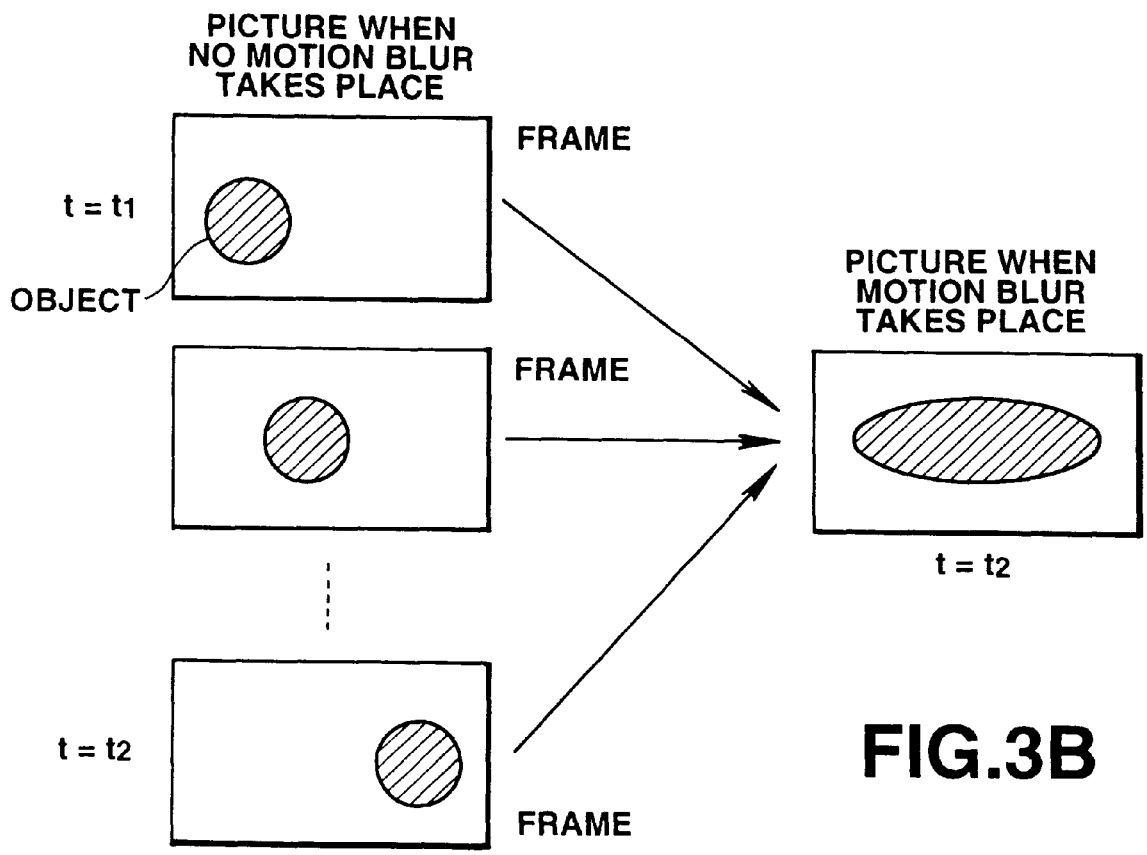
FIGS. 3A and 3B are views for explaining motion blur.

In the case where attention is now drawn to picture of moving object, motion blur takes place in the picture of the current frame as has been explained with reference to FIG. 3. Namely, the picture of the current frame is the picture in which movement of the object from the frame preceding (earlier) by one relative to the current frame up to the current frame is reflected. Accordingly, in the case where times of the current frame and the frame preceding by one are respectively designated at $t_2$, $t_1$, and pixel value at time t of pixel at a certain position x of the picture C is represented by $Ct(x)$, pixel value $Ct_2(x)$ of pixel of the position x at the time $t_2$ can be represented by time integration of picture Sx(t) which has been passed through the pixel of the position x for a time period from the times ti to $t_2$. Namely, the pixel value $Ct_2(x)$ can be expressed by the following equation (4):

$$Ct_2(x) = \int_{t1}^{t2} Sx(t)dt \qquad (4)$$

However, there is no way to find out (recognize) the picture Sx(t) which has been passed through the pixel of the position x for the time period from times ti to $t_2$ from the picture of the current frame, or the picture of the frame preceding by one. In view of the above, when the picture located at the position x is represented by $St_2(x)$ at the time $t_2$ of the current frame, pictures existing within the range from the positions $x_1$ to $x_2$ are respectively represented by pictures $St_2(x_1)$ to $St_2(x_2)$. In this case, when it is assumed that the pictures $St_2(x_1)$ to $St_2(x_2)$ have been passed through the pixel located at the position x for the time period from the times $t_1$ to $t_2$, whereby pixel value $Ct_2(x)$ of picture of the position x at the time $t_2$ has experienced the influence of the pictures $St_2(x_1)$ to $St_2(x_2)$, the pixel value $Ct_2(x)$ is equal to time integration of the picture Sx(t) which has been passed through the pixel of the position x for the time period from the times $t_1$ to $t_2$ as shown in FIG. 5B, and can be represented by the spatial integration of the pictures $St_2(x_1)$ to $St_2(x_2)$ existing within the range from the positions $x_1$ to $x_2$ at the time $t_2$. Namely, the pixel value $Ct_2(x)$ can be expressed by the following equation (5):

$$Ct_2(x) = \int_{x_1}^{x_2} St_2(x)dx \qquad (5)$$

Figure 6A:
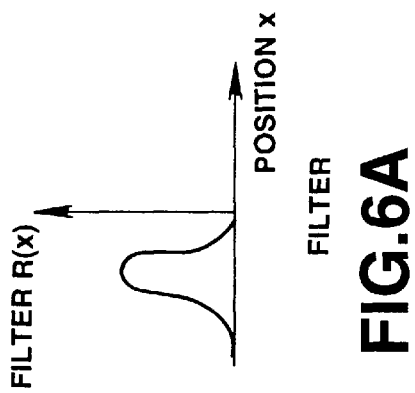
FIGS. 6 and 6A are views showing filtering (filter processing) for providing the effect of motion blur.
Figure 6:
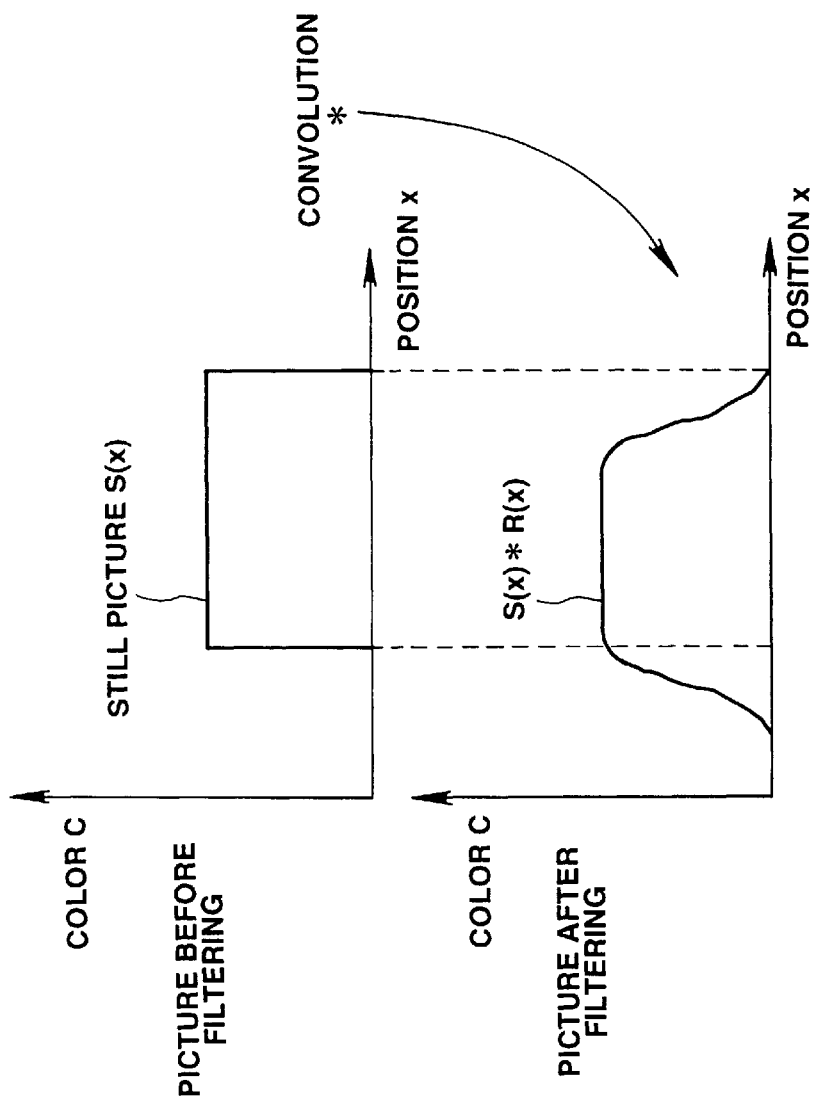

Meanwhile, when still picture (picture in which no motion blur takes place) at the time $t_2$ is represented by S(x) and filter for giving the effect of the motion blur with respect to the still picture is represented by R(x), the right side of the equation (5) is equal to convolution integral of S(x) and R(x) as shown in FIG. 6. Accordingly, the equation (5) can be rewritten as indicated by the following equation (6).

$$Ct_2(x) = S(x)*R(x) \qquad (6)$$

In the above equation, * indicates convolution integral.

Figure 7:
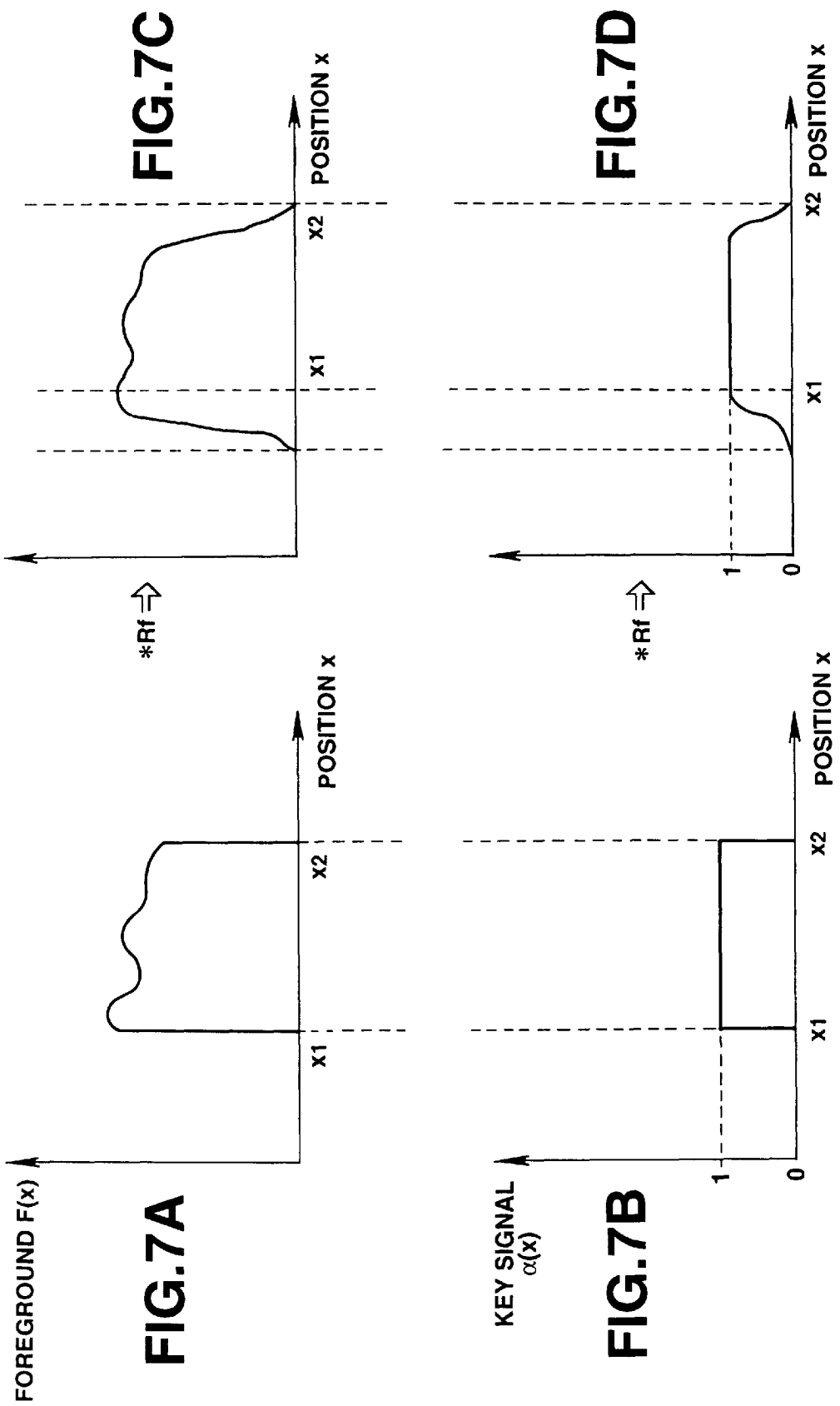
FIGS. 7A–7D are views showing foreground F and key signal $\alpha$ in which the effect of motion blur is taken into consideration.

Now, filters which give the effect of the motion blur to the foreground F and the background B are assumed to be respectively represented by Rf(x) and Rb(x). In addition, in this embodiment, since the key signal $\alpha(x)$ moves along with the foreground F, in the case where the effect of the motion blur is given by the filter Rf(x) with respect to the foreground F, it is necessary to give the effect of the motion blur also to the key signal $\alpha(x)$ blur by the same filter Rf(x) as shown in FIG. 7B. When the effect of the motion blur is given to the foreground F, the background B and the key signal $\alpha$ in consideration of the above-mentioned facts to rewrite the equation (1), the following equation (7) is provided:

$$C=(\alpha*Rf)(F*Rf)+(1-\alpha*Rf)(B*Rb) \qquad (7)$$

Differentiation of the above equation (7) gives the following equation (8):

$$C'=(F*Rf-B*Rb)(\alpha'*Rf) +(F'*Rf-B'*Rb)(\alpha*Rf)+B'*Rb \qquad (8)$$

If the texture of the picture of the foreground F to which the effect of the motion blur has been given, i.e., the texture of the picture obtained by filtering the foreground F by the filter Rf can be considered to be also uniform similarly to the case shown in FIG. 4 from a local point view. This similarly applies to the pixel value B of the background B.

Accordingly, from a local point of view, the pixel values F*Rf and B*Rb which have been caused to undergo filtering can be considered to be constant. As a result, these differential values (F*Rf)' and (B*Rb)' can be both considered to be zero (0). From this fact, the above-mentioned equation (8) can be rewritten as indicated by the following equation (9):

$$C'=(F*Rf-B*Rb)(\alpha*Rf)' \qquad (9)$$

It is seen from the equation (9) that change C' of the pixel value between pixels of the picture C and differential value $(\alpha*Rf)'$ of the key signal in which the effect of the motion blur is taken into consideration have the proportional relationship in which difference F*Rf-B*Rb between F*Rf of the foreground and the pixel value B*Rb of the background in which the effect of the motion blur is similarly taken into consideration is caused to be proportional constant.

Figure 9:
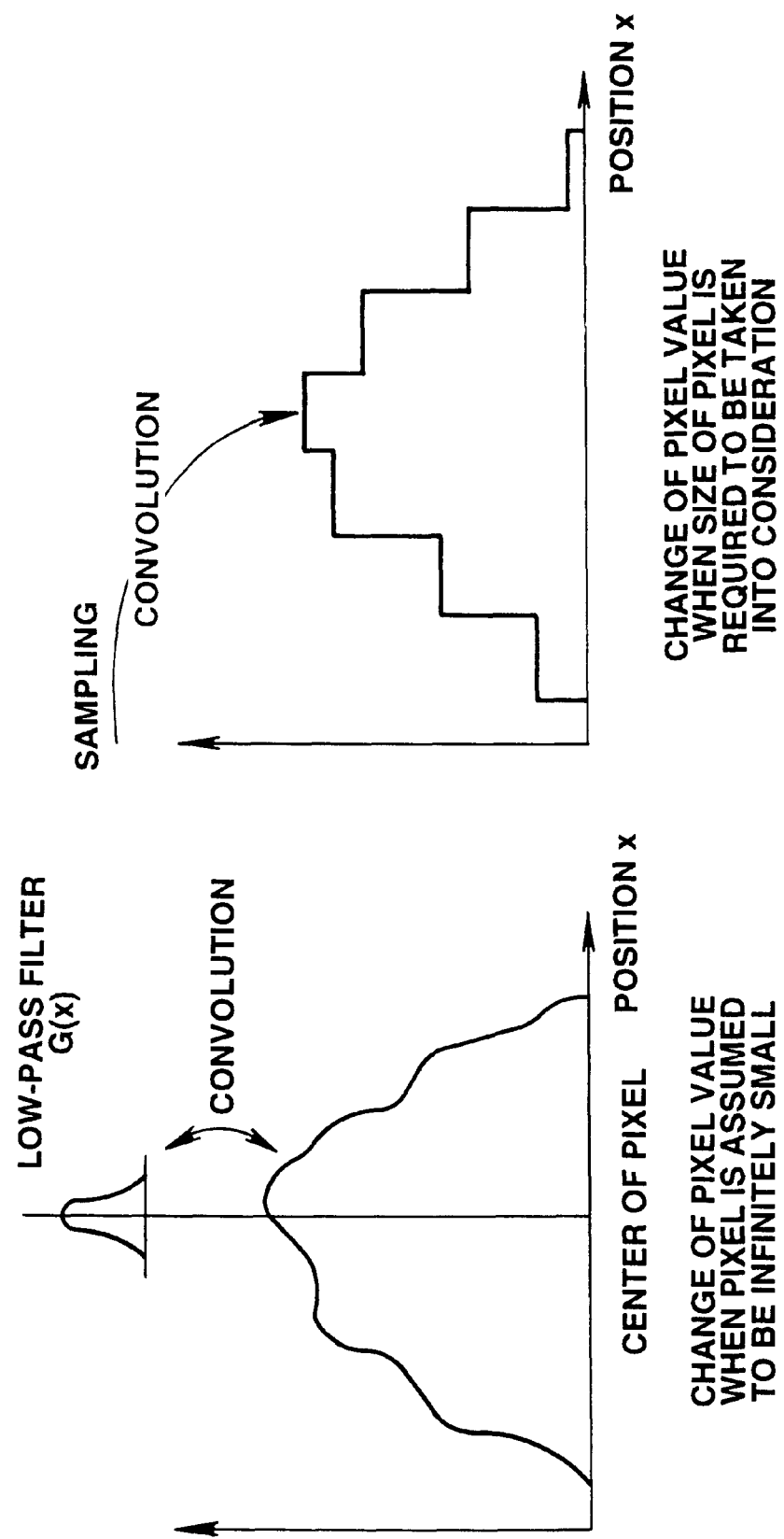
FIGS. 9A–9B are views showing that alias takes place in the case where pixel has finite size (dimensions).

[3] Case where the foreground F and the back ground B are stationary, and pixels have definite size In the case where the size of pixel is considered to be infinitely small, the pixel value smoothly varies with respect to the position x as shown in FIG. 9A. In contrast, in the case where pixels have definite size, the pixel value varies in a step form with respect to the position x as shown in FIG. 9B. For this reason, in the case where the signal shown in FIG. 9A is merely sampled, alias takes place at the boundary between the foreground F and the background B as previously described. In order to reduce such alias, there is a method, as shown in FIG. 9A, in which, for the purpose of calculating the pixel value, the pixel value is caused to undergo filtering by the low-pass filter G(x) to carry out sampling, i.e., value obtained as the result of convolution integral of the pixel value and the low-pass filter G(x) at the pixel position is caused to be new pixel value. In view of the above, in the case where picture in which alias is reduced by the low-pass filter G(x) in a manner described above is assumed, its pixel value (new pixel value) C(x) can be represented by the following equation (10) from the above-mentioned equation (1):

$$C(x)=(\alpha(x)F(x)+(1-$$
$$(x))B(x))*G(x) \qquad (10)$$

When the equation (10) is differentiated by x, the following equation (11) is provided.

$$C'=((F-B)\alpha'+(F'-B')\alpha+B')*G=((F-B)\alpha')*G+((F*G)'-(B*G)')\alpha+ (B*G)' \qquad (11)$$

Here, the texture of the picture obtained as the result of the fact that the pixel value of the foreground F and the pixel value of the background B are subjected to filtering by the low-pass filter R can be also considered to be both uniform similarly to the case shown in FIG. 4 when they are locally viewed.

Accordingly, from a local point of view, the pixel values F*G and B*G which have been caused to undergo filtering can be considered to be both constant. As a result, these differential values (F*G)' and (B*G)' can be considered to be both zero (0). From this fact, the equation (11) can be rewritten as indicated by the following equation (12).

$$C'=((F-B)\alpha')*G \qquad (12)$$

Moreover, when locally viewed, as explained with reference to FIG. 4, the pixel values of the foreground F and the background B can be considered to be both constant. Accordingly, the equation (12) can be rewritten as indicated by the following equation (13):

$$C' = (F-B)(\alpha * G)' \quad (13)$$

It is seen from the above equation (13) that change C' of the pixel value between pixels of the picture C and the differential value $(\alpha * G)'$ of the key signal for reducing alias have the proportional relationship in which difference F−B between the pixel value of the foreground F and the pixel value of the background B is caused to be proportional constant.

[4] Case where the foreground F or the background B is moving and pixels have definite size In this case, from the above-described equations (1), (7) and (10), the pixel value C can be expressed by the following equation (14):

$$C = ((\alpha * Rf)(F * Rf) + (1 - \alpha * Rf)(B * Rf)) * G \quad (14)$$

When the equation (14) is differentiated by x, the following equation (15) is provided:

$$C' = ((F * Rf - B * Rb)(\alpha' * Rf) + (F' * Rf - B' * Rb)(\alpha * Rf) + B' * Rb) * G \quad (15)$$

Here, the texture of the picture obtained by filtering the pixel value of the foreground F by the filter Rf to further allow it to undergo filtering by the low-pass filter G can be considered to be also uniform similarly to the case in FIG. 4 when locally viewed. This similarly applies to the pixel value of the background B.

Accordingly, from a local point of view, the pixel values F*Rf*G and B*Rb*G which have been caused to undergo filtering can be considered to be constant. As a result, these differential values (F*Rf*G)', (B*Rb*G)' can be considered to be both zero (0). Further, when locally viewed, as explained with reference to FIG. 4, the pixel value of the foreground F and the pixel value of the background B can be considered to be both constant. From this fact, the equation (15) can be rewritten as indicated by the following equation (16):

$$C' = (F * Rf - B * Rb)(\alpha * Rf * G)' \quad (16)$$

It is seen from the above equation (16) that the change C' of the pixel value between pixels of the picture C and the differential value $(\alpha * Rf * G)'$ of the key signal such that the effect of motion blur is taken into consideration and that alias is permitted to be reduced have proportional relationship in which difference F*Rf−B*Rb between the pixel value F*Rf and the pixel value B*Rb of the background in which the effect of motion blur is taken into consideration is caused to be the proportional constant.

It is seen from the above-mentioned equations (3), (9), (13) and (16) that, in all of the above-described cases of [1] to [4], the change C' of the pixel value between pixels of the picture C and the differential value α' of the key signal have the proportional relationship, and the proportional constant is difference F−B between the pixel value of the foreground and the pixel value of the background constituting the picture C. Namely, even if motion blur or alias does not take place in the picture C, the proportional relationship between C' and α' holds. Moreover, in the case where motion blur or alias takes place in the picture C, the proportional relationship between C' and α' holds also with respect to the relationship between the key signal α in which the influence of that motion blur is taken into consideration, or the key signal for permitting alias to be reduced and the pixel value C. In any case, the proportional constant becomes difference F−B between the pixel value of the foreground and the pixel value of the background constituting the picture C.

Accordingly, a key signal α adapted to allow the proportional relationship to hold is such that in the case where motion blur takes place in the picture C, it becomes a key signal in which the influence of that motion blur is taken into consideration, and that in the case where alias takes place in the picture C, it becomes a key signal for allowing that alias to be reduced. This invention is based on the above-described theoretical ground (principle).

FIG. 10 shows the configuration of an embodiment of the key signal generating apparatus adapted for generating a key signal on the basis of the above-mentioned principle. A picture C for generating key signal is inputted to a change detecting section 10. Then, the change detecting section 10 calculates (detects) change C' (change information) of pixel value between pixels of the picture C to deliver this change C' to a feature point detecting section 20 and an integral value calculating section 40.

The feature point detecting section 20 detects closed curve for path determination and feature point which will be described later on the basis of the change C' of the pixel value delivered from the change detecting section 10 to deliver the path determination closed curve and the feature point to an F−B detecting section 30 and an integral value calculating section 40.

The F−B detecting section 30 is supplied with the change C' of the pixel value from the change detecting section 10, and the path determination closed curve and the feature point from the feature point detecting section 20, and is supplied with the same picture C as the picture inputted to the change detecting section 10. Thus, the F−B detecting section 30 calculates (detects) difference F−B (difference information) between the pixel value of the foreground F and the pixel value of the background B of the picture C to deliver this difference F−B to the integral value calculating section 40.

The integral value calculating section 40 calculates the skeleton portion which will be described later of key signals α corresponding to the entirety of the picture C on the basis of the change C' of the pixel value delivered from the change detecting section 10, the path determination closed curve and the feature point delivered from the feature point detecting section 20, and the difference F−B delivered from the F−B detecting section 30 to deliver this skeleton portion to a key signal generating section 50.

The key signal generating section 50 extracts the foreground F from the picture C by using the skeleton portion delivered from the integral value calculating section 40, and to generate a key signal for synthesizing the extracted foreground F with any other picture. Namely, the key signal that the integral value calculating section 40 outputs is only the skeleton portion of the key signals α corresponding to the entirety of the picture C. The key signal generating section 50 interpolates portions except for the skeleton portion of the key signal to generate the key signal α corresponding to the entirety of the picture C.

More practical operation of the key signal generating apparatus will now be described with reference to the flowchart of FIG. 11. It is to be noted that picture C is assumed to be picture on the xy plane, i.e., two-dimensional picture in the following description.

At step S1, when picture C for generating a key signal is inputted, that picture C is delivered to the change detecting section 10 and the F–B detecting section 30. Then, the change detecting section 10 is operative so that when picture C is inputted thereto, it calculates change C' of the pixel value between pixels of that picture C. Namely, at this step S1, with respect to respective pixels constituting the picture C, e.g., distance on the color space between pixels adjacent to each other is calculated. The distance thus calculated is outputted as change (color change in this case) C' of the pixel value between pixels of the picture C.

Figure 12:
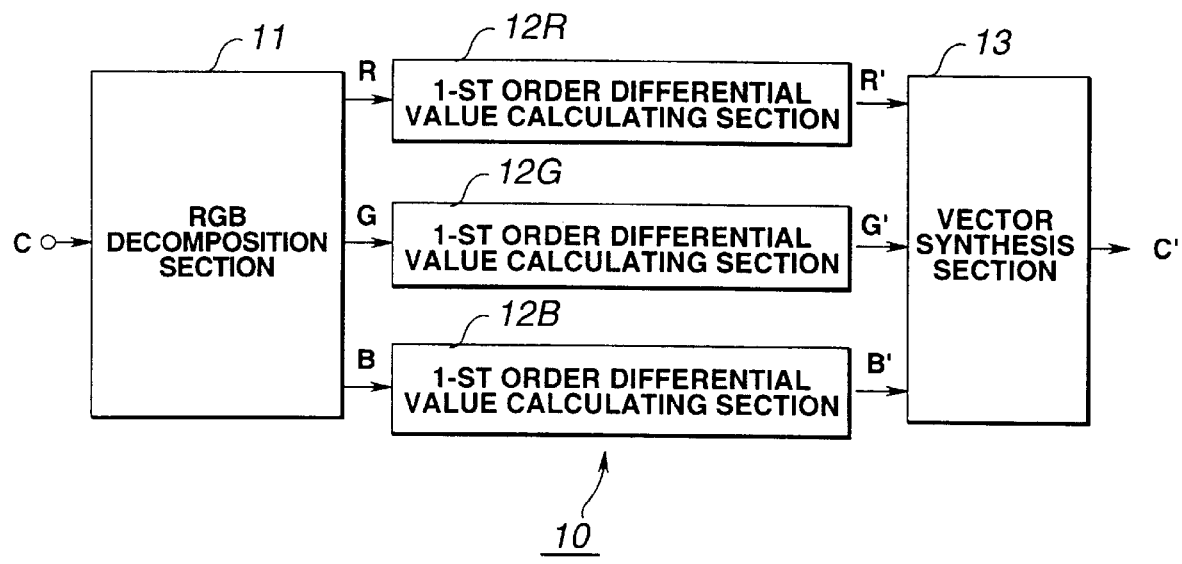
FIG. 12 is a block diagram showing an example of the configuration of change detecting unit 10 of FIG. 10.

A more practical example of the configuration of the change detecting section 10 of FIG. 10 is shown in FIG. 12. The picture C is delivered to an RGB decomposing section 11. The RGB decomposing section 11 decomposes the picture C into, e.g., components of respective axes directions in RGB (Red, Green, Blue) space, i.e., R-component G-component and B-component (hereinafter referred to as R, G, B components as the occasion may demand). These R, G, B components are respectively delivered to first (1-st) order differential value calculating sections 12R, 12G and 12B.

The first order differential value calculating sections 12R, 12G, 12B calculates respective first order differential values R', G', B' to calculate directions and magnitudes (vectors) R', G', B' of changes of respective components (i.e., gradients of the curve assumed to be constituted by pixel values (respective components) of the picture C on the space in which axis indicating pixel values vertical to the xy-plane where the picture C exists is added to the xy-plane. Then, vectors R', G', B' of respective changes of the R, G, B components are delivered to a vector synthesis section 13.

The vector synthesis section 13 synthesizes the vectors R', G', B' delivered from the first order differential value calculating sections 12R, 12G, 12B, i.e., synthesizes directions of respective changes of R, G, B components, and synthesizes magnitudes of the respective components to calculate change (color change) C' of pixel values between pixels of the picture C.

Figure 13:
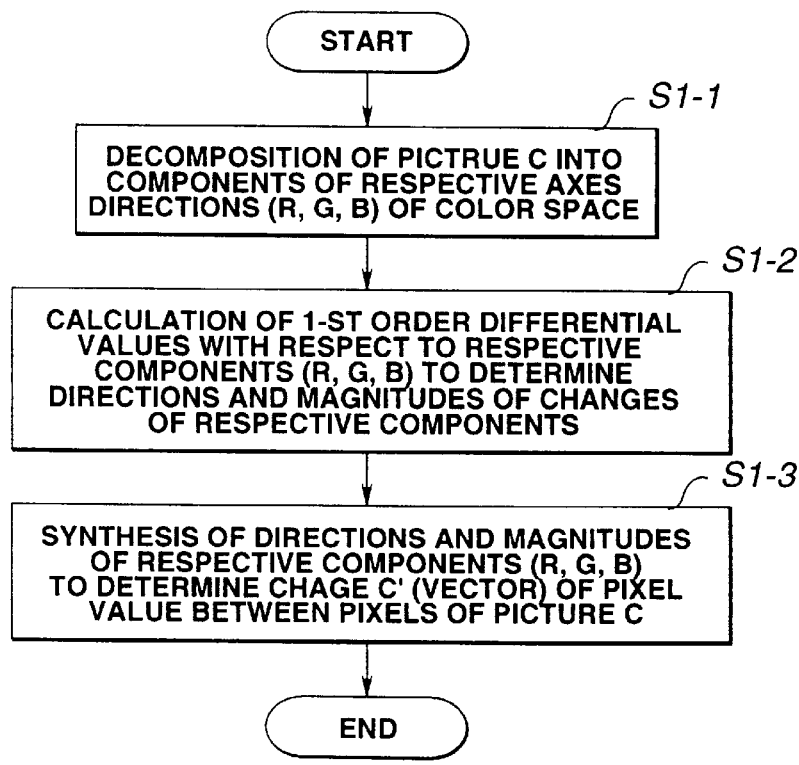
FIG. 13 is a flowchart for explaining the operation of the change detecting section 10 of FIG. 12.

The operation of the change detecting section 10 will now be described with reference to the flowchart of FIG. 13.

At step S1-1, the RGB decomposing section 11 decomposes the picture C into components of respective axes directions of R G B space, i.e., R, G, B components. It is to be noted that the picture C may be decomposed into Y, U, V components in color space except for the RGB space, e.g., YUV space. Namely, the color space employed is not particularly limited. In addition to decomposing the picture C into components of respective axes directions of the color space, luminance components may be extracted therefrom to carry out processing of the succeeding stage only with respect to the luminance components. Then, the R, G, B components obtained at the step S1-1 are respectively delivered from the RGB decomposing section 11 to the first order differential value calculating sections 12R, 12G, 12B.

At step S1-2, the first order differential value calculating sections 12R, 12G, 12B is operative so that when the R, G, B components are delivered thereto, they calculate the first order differential values R', G', B' of these R, G, B components.

Figures 14, 15:
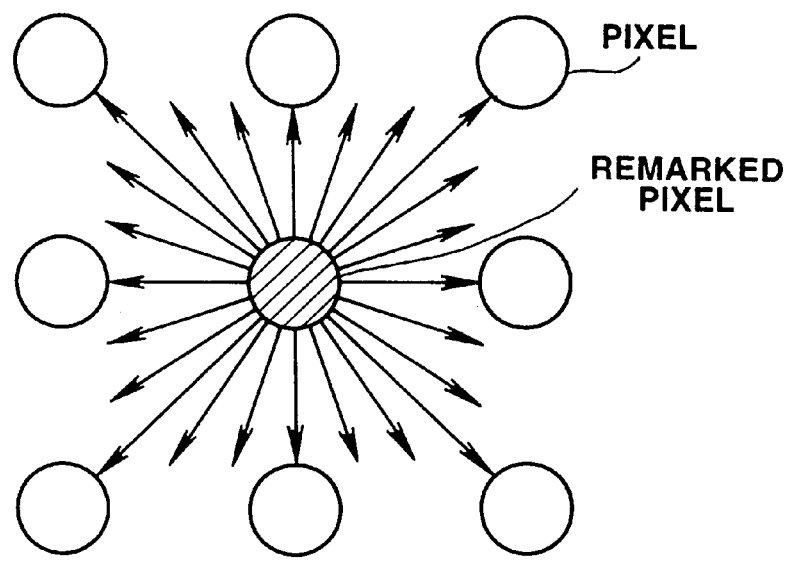
FIG. 14 is a view showing sobel operator.
FIG. 15 is a view for explaining processing of step S1-2 of FIG. 13.

It is to be noted that, in this embodiment, first order differential values of respective components are determined by carrying out, e.g., convolution of respective components and sobel operator, etc. Namely, at the first order differential value calculating sections 12R, 12G, 12B, values obtained by carrying out convolution of x or y direction components of the respective R, G, B components and sobel operator $SO_x$ or $SO_y$ shown in FIG. 14 are caused to be respectively first order differential values $f_x$, $f_y$ in the x or y direction.

First order differential values of the R, G, B components determined in a manner described above, i.e., changes of the R, G, B components are such that their magnitudes (gradients) are maximum at respective pixels. Accordingly, the directions of changes of respective components are in correspondence with the directions in which the edge intensity is maximum. Namely, at this step S1-2, as shown in FIG. 15, changes of the R, G, B components with respect to the direction caused to be in correspondence with the direction in which the edge intensity is maximum of any (arbitrary) directions of 360 degrees with respect to the remarked pixel (the portion to which slanting lines are attached in FIG. 15) are determined.

Then, first order differential values R', G', B' of R, G, B components respectively determined at the first order differential value calculating sections 12R, 12G, 12B (these values are vectors because they have magnitude and direction as described above) are delivered to the vector synthesis section 13.

At step S1-3, the vector synthesis section 13 synthesizes first order differential values R', G', B' to calculate change (color change) C' of the pixel value between pixels of the picture C. Namely, if first order differential values R', G', B' are respectively represented by $(r_x, r_y)$, $(g_x, g_y)$, $(b_x, b_y)$ and C' is represented by $(c_x, c_y)$ (a and b of (a, b) respectively indicate x-component and y-component). At this step S1-3, x component $c_x$ and y component $c_y$ of change C' of the pixel value are respectively determined by the expression $r_x+g_x+b_x$ and $r_y+g_y+b_y$. Then, change C' of the pixel value determined in a manner as stated above at the change detecting section 10 is delivered to the feature point detecting section 20 and the integral value calculating section 40. Thus, the processing at the change detecting section 10 is completed.

At step S2 (FIG. 11), the feature point detecting section 20 is operative so that when the change C' of the pixel value is delivered thereto from the change detecting section 10, it detects the path determination closed curve and the feature point from the change C' of that pixel value.

Figure 16:
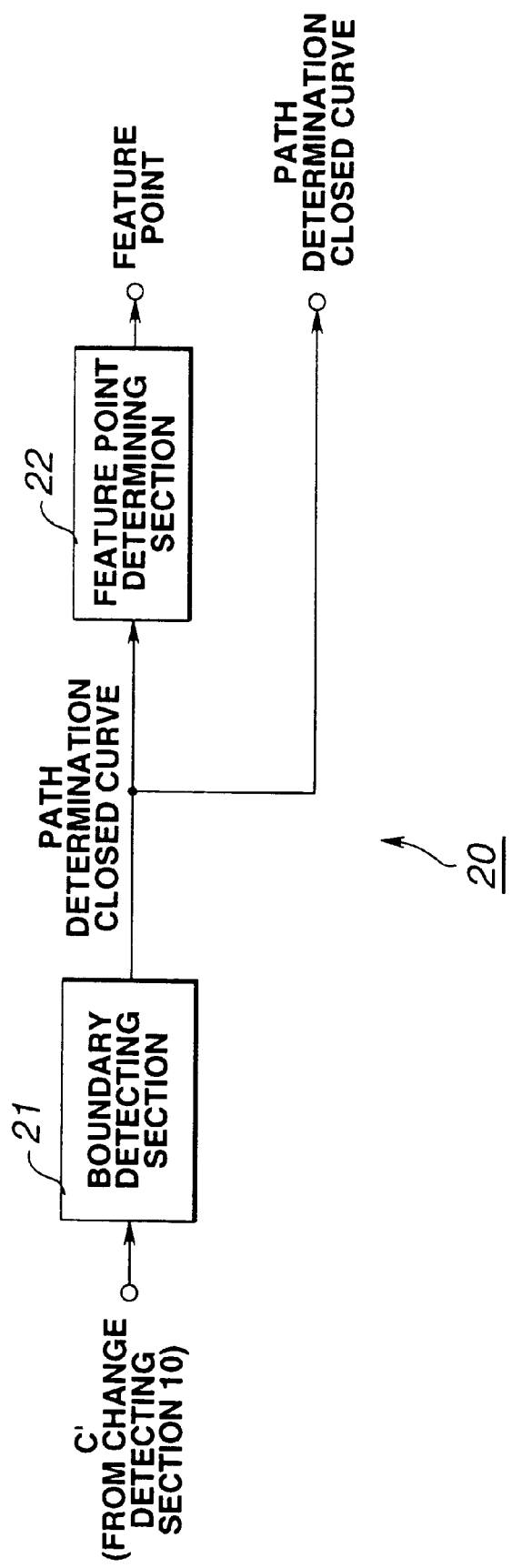
FIG. 16 is a block diagram showing an example of the configuration of feature point detecting section 20 of FIG. 10.
Figure 17A:
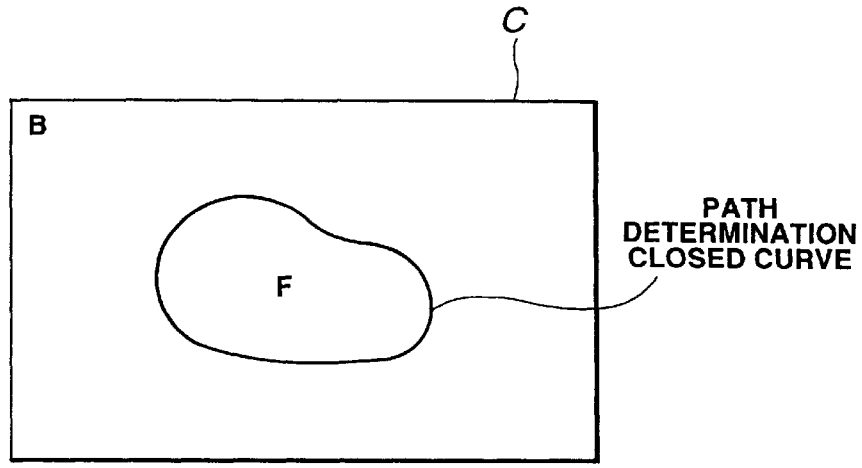
FIG. 17 is a view for explaining processing of the feature point detecting section 20 of FIG. 16.

A more practical example of the configuration of the feature point detecting section 20 is shown in FIG. 16. A boundary (border) detecting section 21 is supplied with the change C' of the pixel value from the change detecting section 10. Thus, the boundary detecting section 21 detects, from the change C' of the pixel value, boundary between the foreground (object) and the background B which constitute the picture C. Namely, the boundary detecting section 21 is operative, as shown in FIG. 17A, for example, to detect the points (pixel) where the change C' of the pixel value is well to detect, as the boundary between the foreground F and the background B (boundary of the object in the picture C), closed curve constituted by connecting such points (since this closed curve is used for determining integral path which will be described later, it will be called hereinafter path determination closed curve as the occasion may demand). Then, the path determination closed curve detected at the boundary detecting section 21 is delivered to the feature point determining section 22.

Figure 17B:
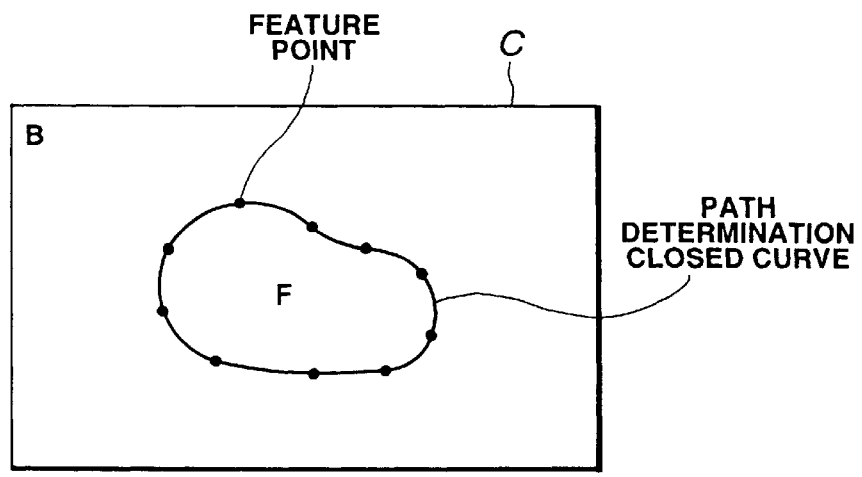

The feature point determining section 22 determines, as the feature point, predetermined points on the path determination closed curve delivered from the boundary detecting section 21 as shown in FIG. 17B, for example. Namely, the feature point determining section 22 detects, e.g., the points where curvature is high of points constituting the path determination closed curve to determine those points as the feature point.

Figure 17C:
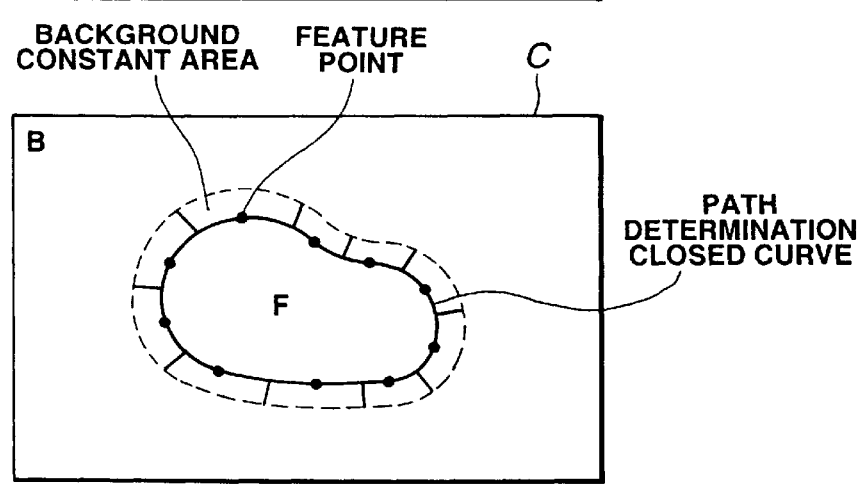

Moreover, the feature point determining section 22 is operative, as shown in FIG. 17C, for example, to determine the closed curve surrounding the path determination closed curve (the portion indicated by dotted lines in FIG. 17C), and divides the area of the background B surrounded by that closed curve and the path determination closed curve into several areas where the change C' of that pixel value is relatively constant (hereinafter referred to as background constant area as the occasion may demand). Further, the feature point determining section 22 partitions the path determination closed curve in the background constant area units so that divided very small areas are provided. In addition, the feature point determining section 22 detects middle points in respective very small areas to determine those points as the feature point.

Figure 18:
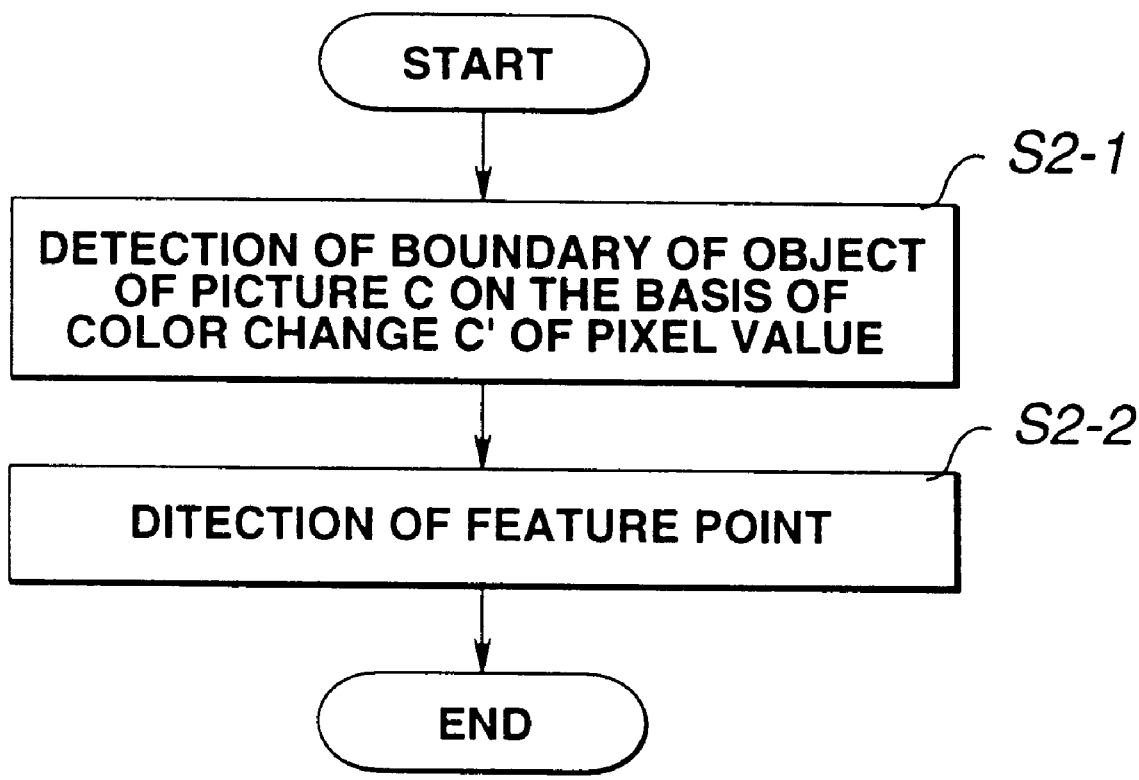
FIG. 18 is a flowchart for explaining the operation of the feature point detecting section of FIG. 16.

The operation of the feature point detecting section 20 will now be described with reference to the flowchart of FIG. 18.

At step S2-1, the boundary detecting section 21 is operative so that when the change C' of the pixel value is delivered thereto from the change detecting section 10, it detects the points where the change C' of that pixel value is great to connect those points to thereby detect a path determination closed curve. Then, the path determination closed curve is delivered to the feature point determining section 22.

At step S2-2, the feature point determining section 22 is operative so that when the path determination closed curve is delivered thereto from the boundary detecting section 21, it determines, as the feature point, predetermined points on the path determination closed curve. Then, the path determination closed curve and the feature points respectively obtained at the boundary detecting section 21 and the feature point determining section 22 are delivered to the F–B detecting section 30 and the integral value calculating section 40. Thus, the processing at this feature point detecting section 20 is completed.

At step S3 (FIG. 11), the F–B detecting section 30 is operative so that when the path determination closed curve and the feature points are delivered thereto from the feature point detecting section 20, it calculates difference F–B between the pixel value of the foreground F and the pixel value of the background B which constitute the picture C.

Figure 19:
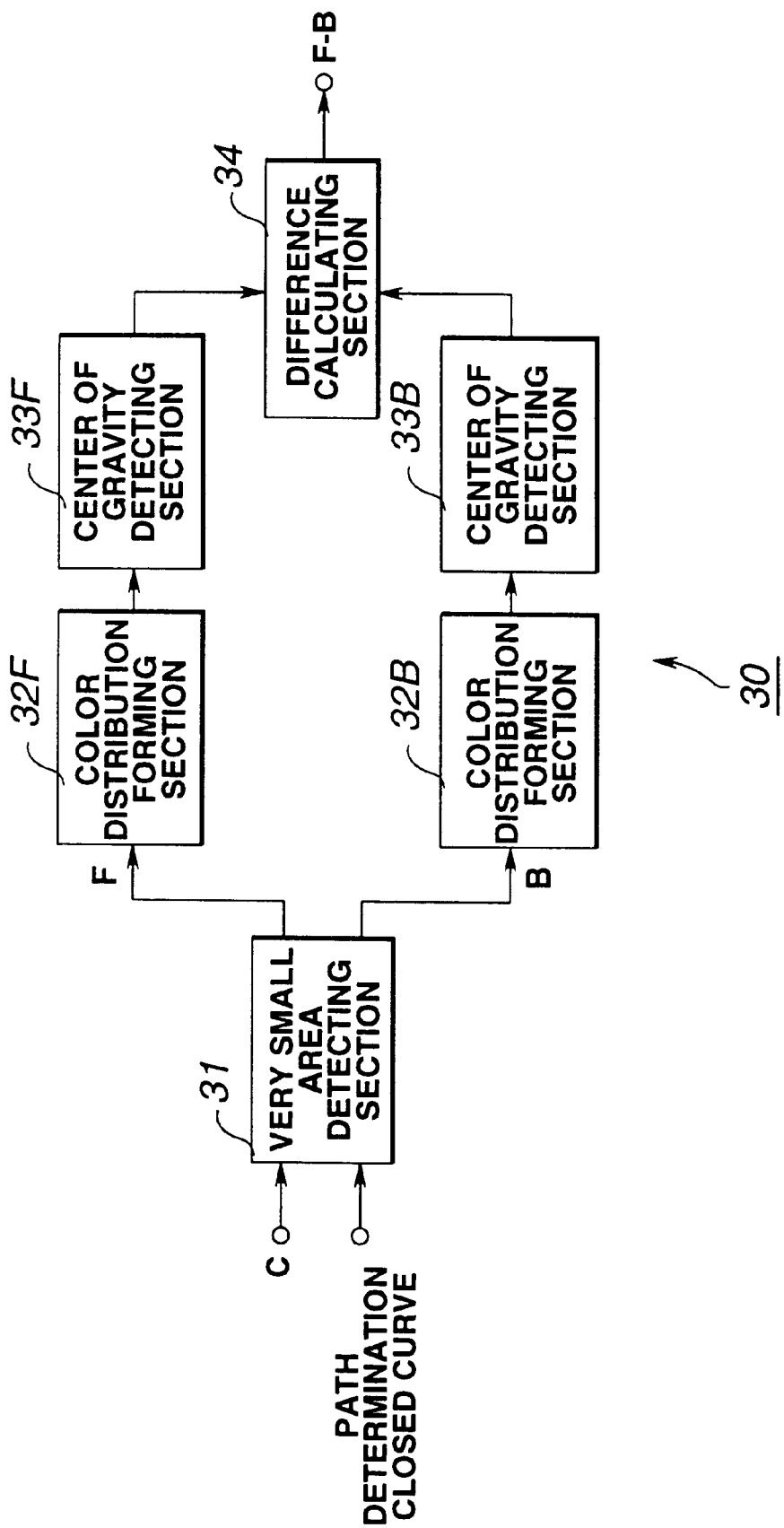
FIG. 19 is a block diagram showing an example of F–B detecting section 30 of FIG. 10.
Figure 20A:
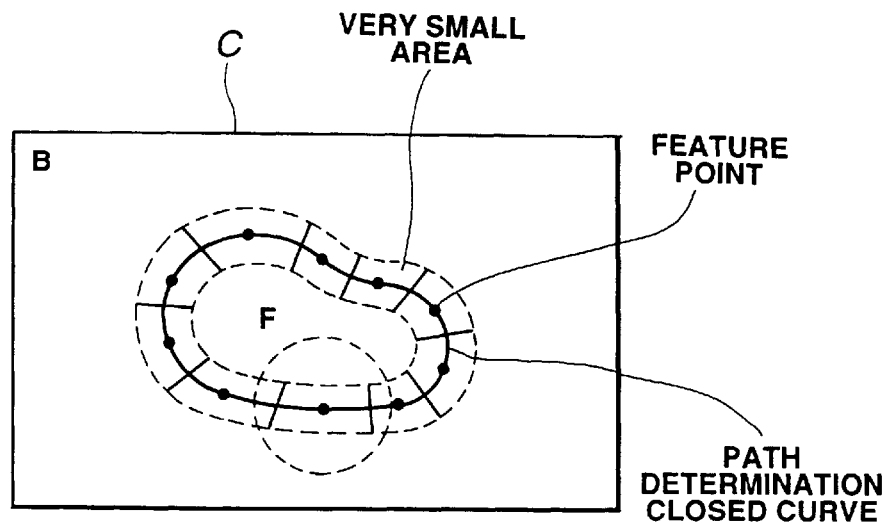
FIGS. 20A–20B are views for explaining processing of very small area detecting section 31 of FIG. 19.
Figure 20B:
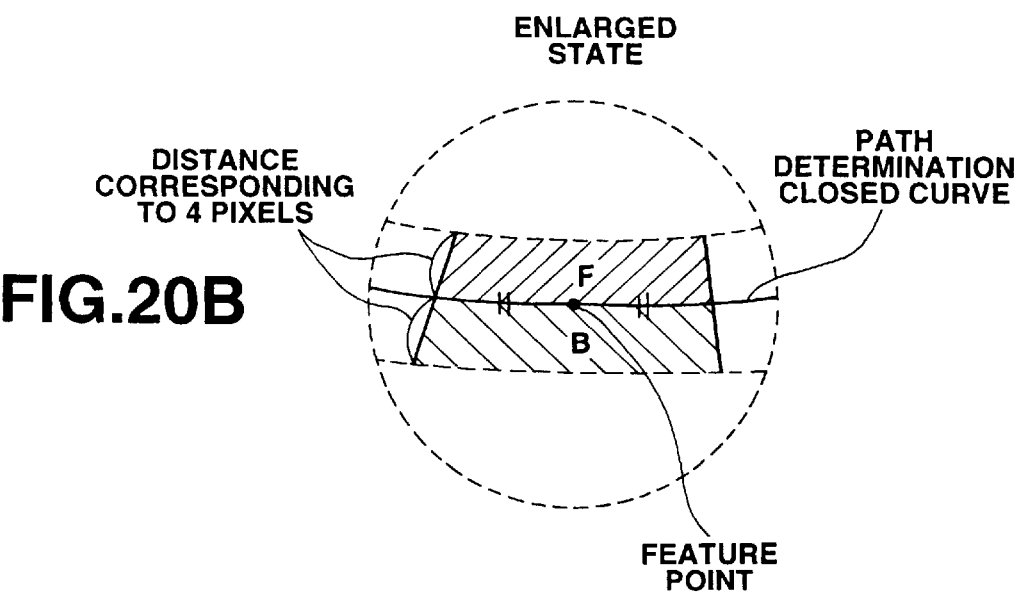

A more practical example of the configuration of the F–B detecting section 30 is shown in FIG. 19. The very small area detecting section 31 is supplied, in addition to the picture C (picture value), with the feature points and the path determination closed curve from the feature point detecting section 20. Thus, the very small area detecting section 31 detects the very small area including the feature points as shown in FIG. 20A, for example. Namely, the very small area detecting section 31 divides the path determination closed curve into very small line segments at points equidistant from the feature point as shown in FIG. 20B in the state where a portion of FIG. 20A is enlarged to detect, as the very small area (the portion to which slanting lines are attached in FIG. 20B), the range spaced by a predetermined distance (e.g., distance corresponding to four pixels, etc.) toward the side of the foreground F or the background B from that line segment. Moreover, the very small area detecting section 31 extracts, with respective to respective very small areas, pixels constituting the foreground F included within those areas (pixels existing at the foreground F side from the path determination closed curve, i.e., the portion to which slanting lines going down to the left are attached in FIG. 20B) to deliver pixel value of those pixels (hereinafter referred to as F boundary pixel value as the occasion may demand) to a color distribution forming circuit 32F, and extracts pixels constituting the background B (pixels existing at the background B side from the path determination closed curve, i.e., the portion to which slanting lines going down to the right are attached in FIG. 20B) to deliver pixel value of those pixels (hereinafter referred to as B boundary pixel value as the occasion may demand) to a color distribution forming section 32B.

The color distribution forming sections 32F, 32B respectively determines color distributions on the color space, e.g., RGB space, etc. of the F boundary pixel values and the B boundary pixel values every very small areas delivered from the very small area detecting section 31 to respectively deliver them to center of gravity detecting sections 33F, 33B. The center of gravity detecting sections 33F, 33B respectively determine centers of gravity of the color distributions of the F boundary pixel values and the B boundary pixel values delivered from the color distribution forming sections 32F, 32B to considers respective centers of gravity as pixel values of the foreground F and the background B of pixels in the gray area to deliver them to a difference calculating section 34.

Figure 21:
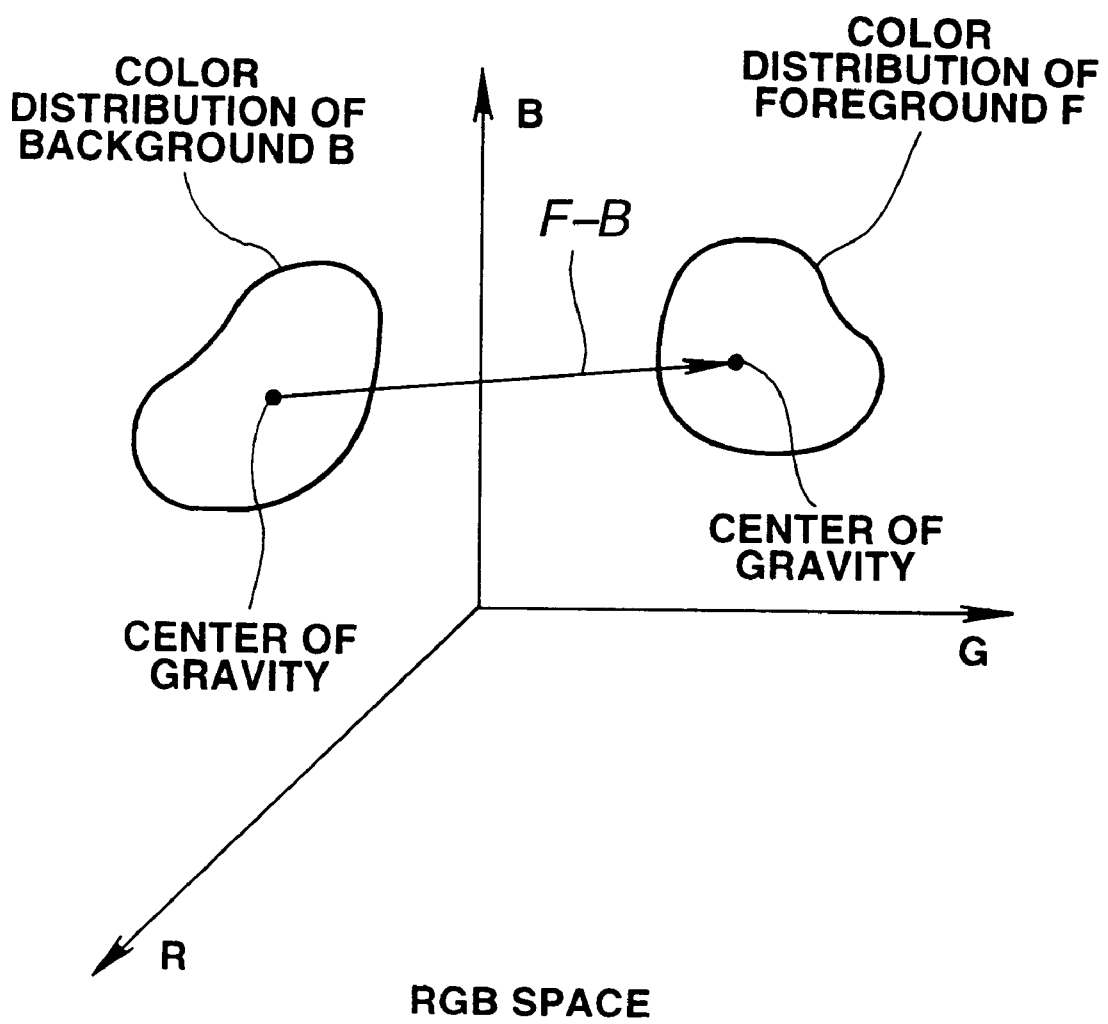
FIG. 21 is a view for explaining processing of difference calculating section 34 of FIG. 19.

The difference calculating section 34 is operative, as shown in FIG. 21, for example, to subtract, from the center of gravity of the color distribution of the F boundary pixel values delivered from the center of gravity detecting section 33F, the center of gravity of the color distribution of the B boundary pixel values delivered from the center of gravity detecting section 33B to output the subtraction result as difference F–B between the foreground F and the background B (different of pixel value between the pixel value of the foreground F and pixel value of the background B, and this difference is thus considered to be vector similarly to C') in the very small area (or at feature point included within that very small area).

Figure 22:
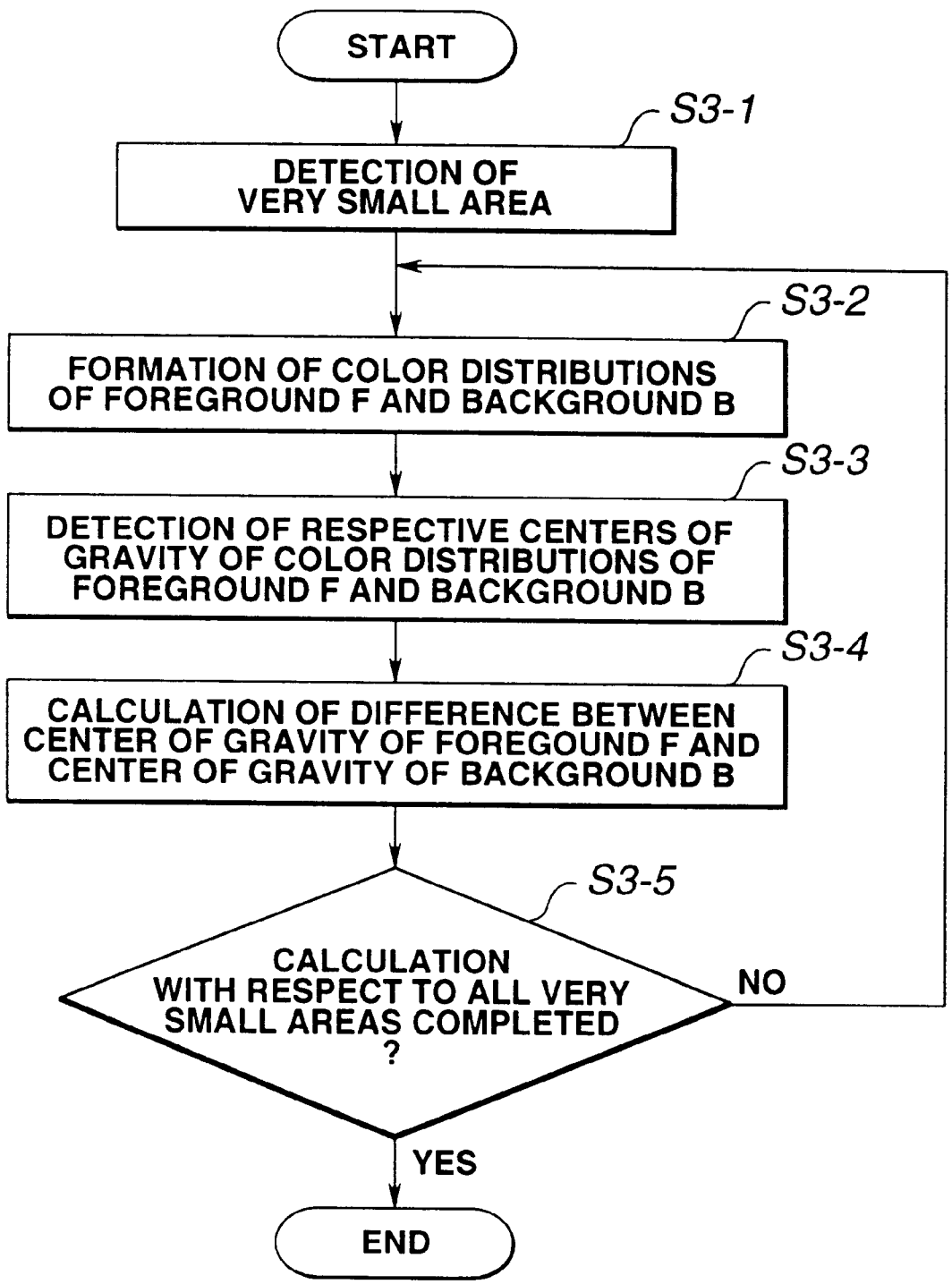
FIG. 22 is a flowchart for explaining the operation of the F–B detecting section 30 of FIG. 19.

The operation of the F–B detecting section 30 will now be described with reference to the flowchart of FIG. 22.

At step S3-1, the very small area detecting section 31 detects the very small area, which has been explained with reference to FIG. 20, on the basis of the feature points and the path determination closed curve delivered from the feature point detecting section 20 to further extract F boundary pixel values and B boundary pixel values in that very small area to respectively deliver the F boundary pixel value and the B boundary pixel value to the color distribution forming sections 32F, 32B.

At step S3-2, the color distribution forming sections 32F, 32B respectively determines color distributions on the RGB space of the F boundary pixel values and the B boundary pixel values in a certain very small area to deliver them to the center of gravity detecting sections 33F, 33B.

At step S3-3, the center of gravity detecting sections 33F, 33B respectively calculates (detect) centers of gravity of color distributions of the F boundary pixel values and the B boundary pixel values to deliver them to the difference calculating section 34.

At step S3-4, the difference calculating section 34 determines difference value between the center of gravity of the color distribution of the F boundary pixel values delivered from the center of gravity detecting section 33F and the center of gravity of the color distribution of the B boundary pixel values delivered from the center of gravity detecting section 33B to output this difference value as difference F–B between the foreground F and the background B at the feature point included within the very small area.

At step S3-5, after the difference F–B between the foreground F and the background at the feature point included within a certain very small area is obtained in a manner as stated above, whether or not the difference F–B is determined with respect to all very small areas detected at the very small area detecting section 31 (all feature points detected at the feature point detecting section 20) is judged. In the case where it is judged at the step S3-5 that the difference F−B has not yet been determined with respect to all very small areas, the processing operation returns to the step S3-2 to carry out the processing at step S3-2 and steps subsequent thereto with respect to the very small areas where the difference F−B has not been determined. On the other hand, in the case where it is judged at the step S3-5 that the difference has been determined with respect to all the very small areas, the processing at the F−B detecting section 30 is completed. Then, the differences F−B which have been determined with respect to all the very small areas are delivered to the integral value calculating section 40.

It is to be noted that the direction of the difference F−B (vector) between the foreground F and the background B obtained in a manner as described above is in correspondence with (substantially in correspondence with) the direction in which the edge intensity becomes maximum, and the direction of F−B and the direction of C' are in correspondence with each other (substantially in correspondence with each other).

Further, while the F−B detecting section 30 shown in FIG. 19 determines the very small area on the basis of the path determination closed curve (the boundary between the foreground F and the background B) obtained from the change C' of the pixel value to determine the difference F−B from the very small area, the difference F−B may be determined, e.g., in a manner stated below at the F−B detecting section 30. In more practical sense, e.g., not only the frame of the picture C but also frames constituting moving picture before and after that frame is inputted to the F−B detecting section 30 in a time series manner. Then, the F−B detecting section 30 stores the frame inputted at present until the subsequent frame is inputted. In the case where picture C for generating a key signal is inputted, frame of that picture C and the stored frame preceding (earlier) by one are caused to undergo the so-called block matching to detect the boundary between the foreground F and the background B on the basis of the above-mentioned result and the result of the block matching preceding thereto as occasion demands. Then, the F−B detecting section 30 determines feature points on the path determination closed curve estimated from the boundary by using the boundary to detect the very small area including respective feature points similarly to the case at the steps S3-1, S3-2 of FIG. 22 to recognize respective distributions of the foreground F and the background B which constitute the picture C every respective very small areas to determine centers of gravity of respective color distributions of the foreground F and the background B similarly to the case at the steps S3-3, S3-4 of FIG. 22 at times subsequent thereto to further determine direction of the position of the center of gravity of the color distribution of the background F with respect to the position of the center of gravity of the color distribution of the background B, and distance on the color space therebetween, i.e., the difference F−B between the fore is unnecessary to deliver the path determination closed curve and the feature points from the feature point detecting section 20 to the F−B detecting section 30. It is to be noted that the detail of the method of detecting the boundary between the foreground F and the background B by using block matching as described above is disclosed, e.g., in the Japanese Patent Application No. 164792/1995, etc.

Moreover, while the method of detecting the boundary between the foreground F and the background B is not limited to the method using change C' of the pixel value and the method using block matching as described above, detection of the boundary between the foreground F and the background B may be carried out by instruction from users as described later in FIG. 30, for example. Further, the boundary between the foreground F and the background B may be detected by employing in combination, e.g., the method by instruction from users and the method using change C' of pixel value. Furthermore, the boundary between the foreground F and the background B may be detected by employing in combination, e.g., the method by instruction from users and the method using block matching. Namely, e.g., an approach may be employed to detect the boundary between the foreground F and the background B by instruction from users with respect to the first frame, and to detect the boundary between the foreground F and the background B by block matching with respect to frames subsequent thereto.

Further, the method of detecting the difference F−B is not limited to the above-described method, but may employ other methods.

Figure 11:
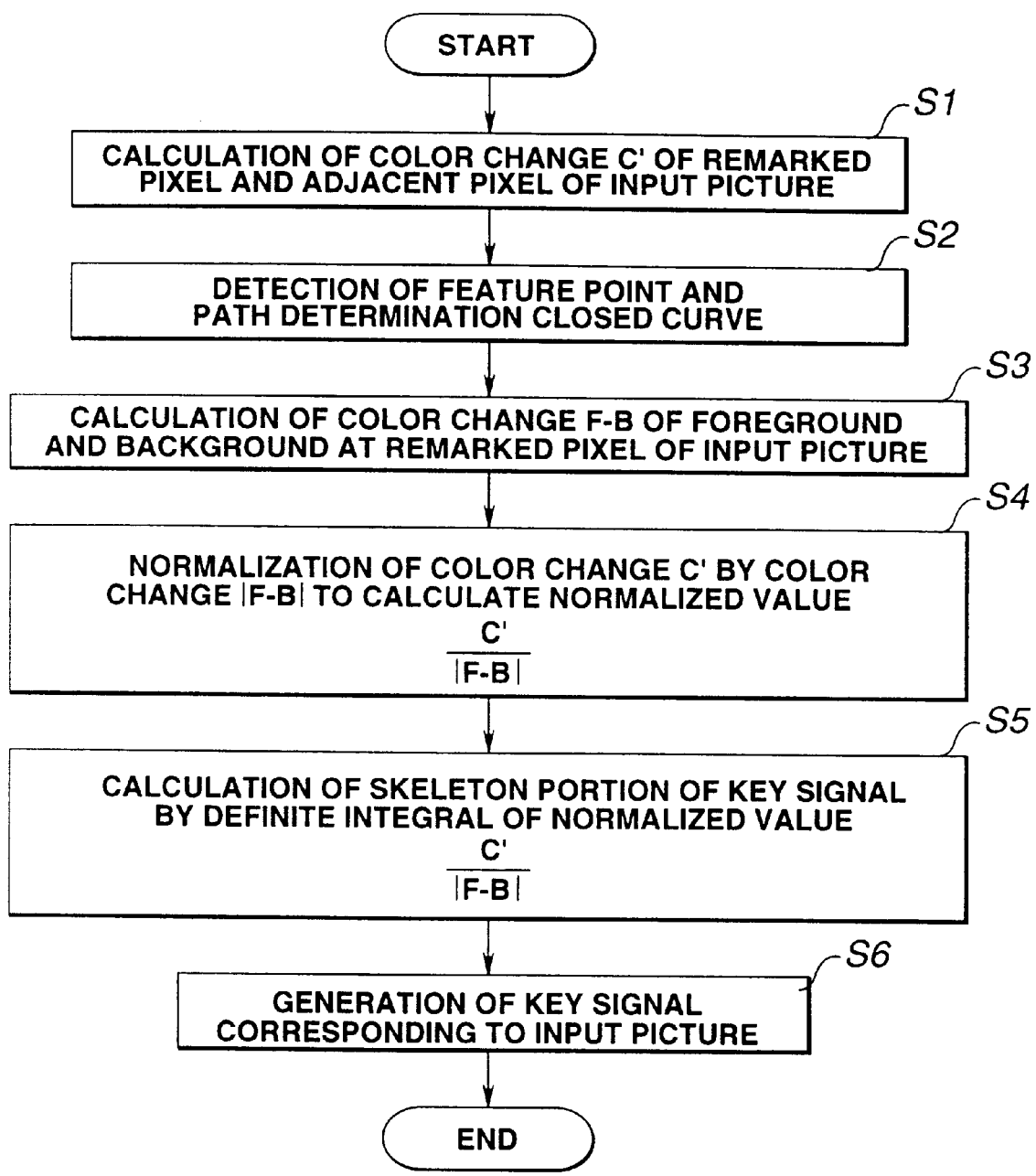
FIG. 11 is a flowchart for explaining the operation of the key signal generating apparatus of FIG. 10.

Moreover, while after the processing of the step S2, the processing of the step S3 is carried out in the flowchart shown in FIG. 11, in the case where there is no necessity of delivering the path determination closed curve and the feature points with respect to the F−B detecting section 30 from the feature point detecting section 20, the processing of the step S2 and the step S3 may be carried out in an order opposite to the above, or may be carried out at the same time (in parallel). The difference F−B determined in a manner as described above at the step S3 (FIG. 11) is delivered from the F−B detecting section 30 to the integral value calculating section 40.

At step S4, the integral value calculating section 40 normalizes change C' of pixel value delivered from the change detecting section 10 by absolute value |F−B| of difference F−B delivered from the F−B detecting section 30.

At step S5, the integral value calculating section 40 integrates the normalized value C'/|F−B| along, e.g., the direction in which change C' of pixel value is calculated (detected) to thereby calculate the skeleton portion of the key signal α.

In more practical sense, since the change C of pixel value between pixels of the picture C and the differential value α' of the key signal have the proportional relationship therebetween as described above, and the proportional constant is difference F−B between the foreground and the background which constitute the picture C, i.e., the expression C'=(F−B) α' holds, the key signal α(p) can be determined by the following equation (17).

$$\alpha(p) = \int \frac{C'(p)}{|F(p) - B(p)|} dp \qquad (17)$$

In the above equation, α(p) means a key signal with respect to pixel at the position (point) p(x, y) constituting the picture C, and F(p) and B(p) respectively means pixel values of pixels at the position p(x, y) of the foreground F and the background B which constitute the picture C. Further, C(p) means pixel value of pixel at the position p(x, y) constituting the picture C. It is to be noted that description of the argument (p) of the function will be hereinafter omitted as the occasion may demand.

Accordingly, at the above-described step S4, C'/|F−B| constituting the right side of the equation (17), i.e., normalized value obtained by normalizing the change C' of the pixel value by the absolute value |F−B| of difference is determined. At this step S5, integration at the right side of the equation (17), i.e., integration of the normalized value C'/|F−B| along, e.g., the direction in which change C' of the pixel value is detected is carried out. Value obtained as the result of integrating value obtained by normalizing change C' of the pixel value by the absolute value |F−B| of difference without integrating the change C' of the pixel value as it is, i.e., the key signal α takes value within the range from 0 to 1.

Figure 23:
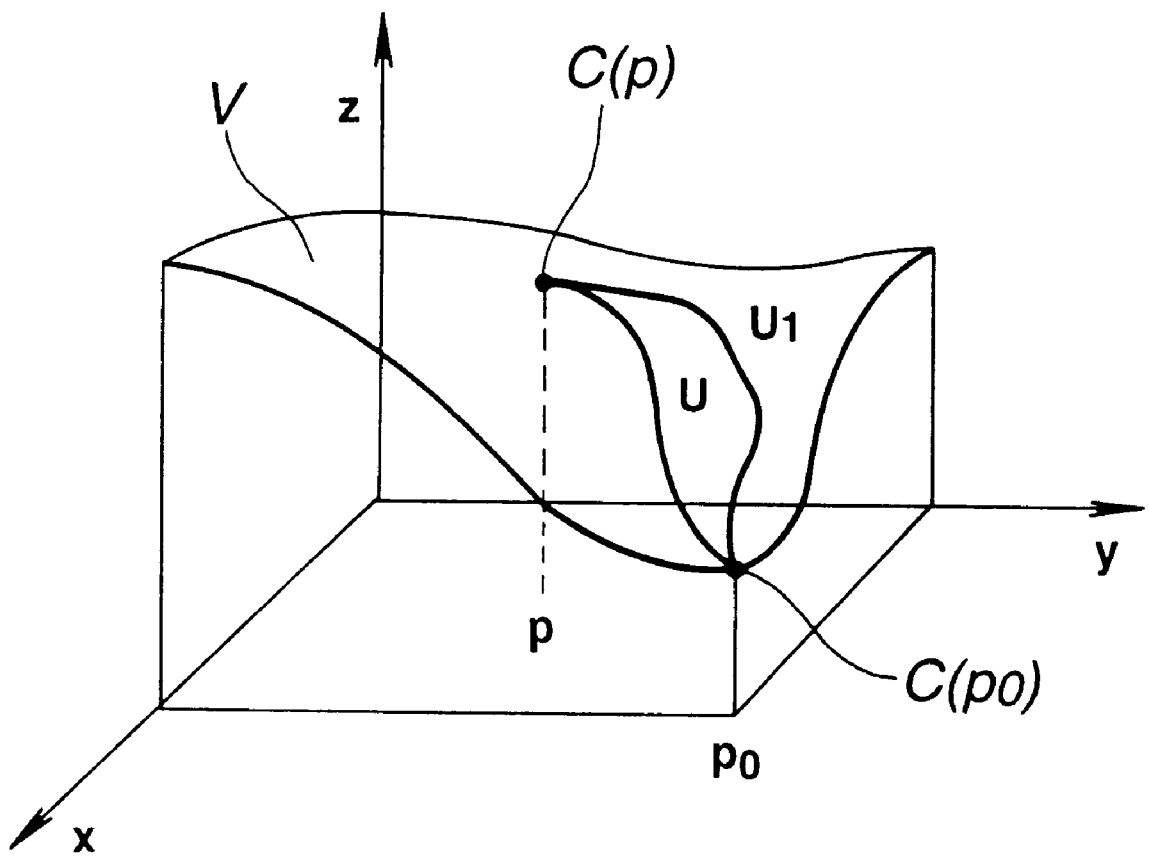
FIG. 23 is a view for explaining processing of step S5 of FIG. 11.

The integration carried out at the step S5 will now be described in more detail. When space in which the z-axis perpendicular to the xy plane where the picture C exists is provided is assumed to be on the xy-plane is assumed as shown in FIG. 23, for example, to take pixel value in the z-axis direction, plane (curved surface) V consisting of pixel values is formed within that space. It should be noted that if the picture C is color picture (picture image), there are three components such as RGB or YUV, etc. as described above, but the pixel value is assumed to consist of one component for the brevity of explanation.

In this case, gradient at an intersecting point of a straight line passing through a certain point p on the picture C and perpendicular to the xy-plane and the plane V, i.e., change of pixel value C(p) of pixel located at the position p can be represented as vector in the maximum inclination direction when the plane V is viewed from that point C(p) (vector obtained by calculating gradient of the plane V at the point C(p)).

Here, the maximum inclination direction is the direction in which in the case where a ball having size assumed to be infinitely small is placed at the point C(p), that ball rolls.

Let now suppose that in the case where a ball is placed at the point C(p) and that ball falls (rolls) down to the point C(p$_0$), the locus (path) that the ball depicts on the plane V is U. In this instance, the integration of the equation (17) means the integration along the path (hereinafter referred to as the maximum inclination direction path as the occasion may demand), and the equation (17) means that the integration expressed thereby is carried out, whereby key signal α(p) with respect to the pixel located at the position p can be determined.

Accordingly, if the key signal α(p$_0$) with respect to the pixel located at the position p$_0$ can be recognized, it is possible to determine the key signal α(p) with respect to the pixel located at the position p in accordance with the following equation (18) from the equation (17):

$$\alpha(p) = \alpha(p_0) \int U \frac{C'(p)}{|F(p) - B(p)|} dp \quad (18)$$

In the above equation, integral symbol in which U is attached at the upper right means the integration along the maximum inclination direction path U.

At step S5, e.g., calculation of the right side of the equation (18) is carried out, or the like, whereby the key signal α (the skeleton portion of the key signal) is determined.

It is to be noted that it is not necessarily required to carry out the integration of the right side of the equation (18) along the maximum inclination direction path U. Namely, integration along path U$_1$ (FIG. 23) which is not the maximum inclination direction path U as the path from the point C(p) up to the point C(p$_0$) may be carried out. Namely, since the integration of the right side of the equation (18) means the integration of gradients at respective points on the maximum inclination direction path U, in the case where integration is carried out along other path U$_1$, the component in the direction of the maximum inclination direction path U of gradients at respective points on the path U, is integrated (Accordingly, this integration can be also considered to be eventually the same as the integration along the maximum inclination direction path U), thereby making it possible to determine the same key signal α as that in the case where integration is carried out along the maximum inclination direction path U.

It is to be noted that since in the case where integration is carried out along paths except for the maximum inclination direction path U, the quantity of operations is increased to more degree as compared to the case where integration is carried out along the maximum inclination direction path, it is preferable to carry out integration along the maximum inclination direction path U as far as possible.

An example of the configuration of the integral value calculating section 40 of FIG. 10 for carrying out a processing as described above is shown in FIG. 24. The path determination closed curve and the feature points from the feature point detecting section 20 are delivered to an integral path determining section 41, and change C' of the pixel value from the change detecting section 10 and difference F−B from the F−B detecting section 30 are delivered to a normalization executing section 42.

Figure 25A:
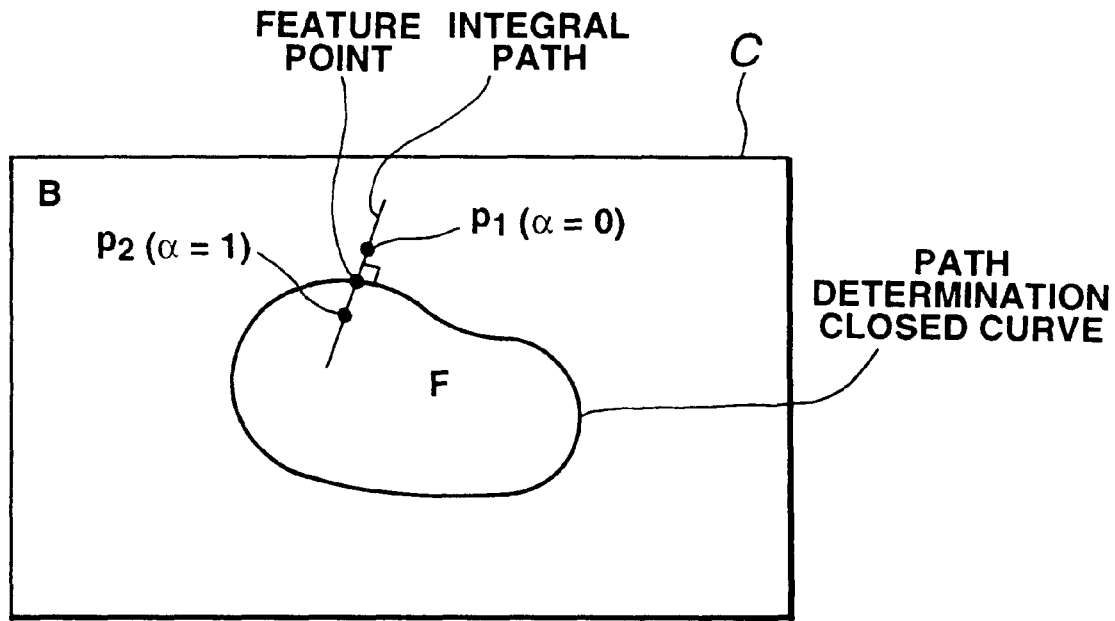
FIG. 25 is a view for explaining processing of integral value calculating section 40 of FIG. 24.

The integral path determining section 41 determines integral path for carrying out integration of the equation (18) on the basis of the path determination closed curve and the feature points delivered from the feature point detecting section 20. Namely, as shown in FIG. 25A, the integral path determining section 41 determines, as the integral path with respect to corresponding feature point, a line in a normal direction of the path determination closed curve and passing through the corresponding feature point. The integral path with respect to the feature point determined in a manner as described above is delivered to the normalization executing section 42 and the integration executing section 43. It is to be noted that the integral path determined in this way is the path substantially along the maximum inclination direction path U.

The normalization executing section 42 determines normalized value C'/|F−B| (normalized information) obtained by normalizing change C' of pixel value of pixel existing on the integral path delivered from the integral path determining section 41 by absolute value |F−B| of difference F−B to deliver it to the integration executing section 43. The integration executing section 43 carries out integration of the normalized value C'/|F−B| along the integral path from the integral path determining section 41 in accordance with the equation (18) to determine key signal α on the integral path. The key signal on the integral path is delivered to the closed curve generating section 44.

The closed curve generating section 44 generates a P1 closed curve and a P2 closed curve which will be described later from the key signal α delivered from the integration executing section 43.

Figure 25B:
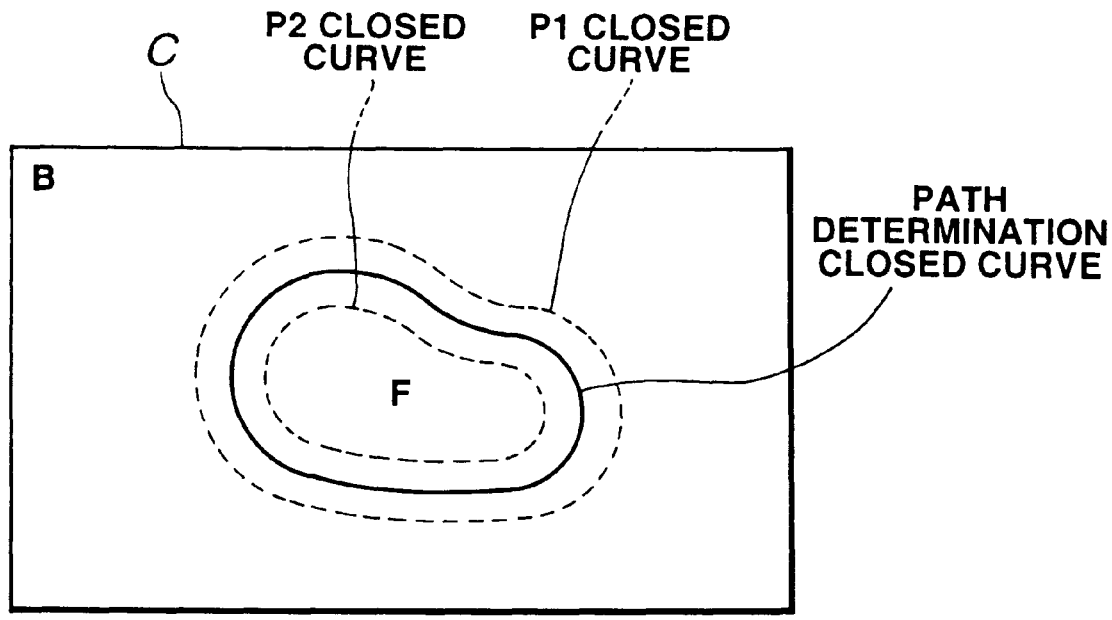

Namely, while the integration in accordance with the equation (18) is carried out along the integral path shown in FIG. 25A at the integration executing section 43, whereby the key signal α on the integral path can be obtained, that key signal α becomes equal to 0 (zero) at the boundary between the gray area and the background B, and becomes equal to 1 at the boundary between the gray area and the foreground F. Accordingly, as shown in FIG. 25A, the closed curve generating section 44 determines points where key signals a on respective integral paths become equal to 0 (points where a is equal to 0, which will be referred to as pi as the occasion may demand hereinafter), and determines points where key signals a become equal to 1 (points where a becomes equal to 1, which will be referred to as $p_2$ as the occasion may demand hereinafter), thus to connect the points $p_1$ on respective integral paths to each other, and to connect the points $p_2$ on the respective integral path to each other. Then, as shown in FIG. 25B, the closed curve generating section 44 outputs, as P1 closed curve, the closed curve obtained by connecting the points pi to each other, and outputs, as P2 closed curve, the closed curve obtained by connecting the points $P_2$ to each other. The key signal $\alpha$ obtained at the integration executing section 43 and the P1 closed curve and the P2 closed curve obtained at the closed curve generating section 44 are delivered to the key signal generating section 50 (FIG. 10).

The operation of the integral value calculating section 40 will now be described with reference to the flowchart of FIG. 26.

At step S4-1, the integral path determining section 41 allows any one of feature points delivered from the feature point detecting section 20 to be remarked feature point to determine a straight line passing through the remarked feature point and in normal direction of the path determination closed curve delivered from feature point detecting section 20 as the integral path with respect to the remarked feature point. The integral path with respect to the remarked feature point is delivered to the normalization executing section 42 and the integration executing section 43.

At step S4-2, the normalization executing section 42 divides the change C' of the pixel value of the pixel existing on the integral path delivered from the integral path determining section 41 by absolute value $|F-B|$ of the difference which is the difference F−B delivered from the F−B detecting section 30 and is the difference determined from the very small area (FIG. 20) including the remarked feature point to deliver the normalized value $C'/|F-B|$ obtained as the result thereof to the integration executing section 43.

At step S4-3, the integration executing section 43 integrates the normalized value $C'/|F-B|$ in accordance with the equation (18) along the integral path from the integral path determining section 41 by using the integral path and the normalized value $C'/|F-B|$ with respect to the pixel existing on the integral path respectively delivered from the integral path determining path and the normalization executing section 42 to calculate a key signal $\alpha$ on that integral path. This key signal $\alpha$ is delivered to the closed curve generating section 44. In this case, at the integration executing section 43, e.g., the remarked feature point is regarded as the point where a becomes equal to 0.5, and the integration of the equation (18) is carried out with the remarked feature point being as the initial point. Accordingly, in this example, the integration of the equation (18) is carried out in the state where $\alpha(p_0)$ is caused to be 0.5.

At step S4-4, the integral path determining section 41 judges whether or not all of feature points delivered from the feature point detecting section 20 have been caused to be the remarked feature point. In the case where the integral path determining section 41 judges that all of the feature points from the feature point detecting section 20 have not yet been caused to be the remarked feature point, its processing operation returns to the step S4-1. As a result, at the integral path determining section 41, feature point which is not yet caused to be the remarked feature point is newly caused to be the remarked feature point. At times subsequent thereto, processing as described above will be repeated.

On the other hand, in the case where the integral path determining section 41 has judged at the step S4-4 that all the feature points have been already to be caused to be the remarked feature point, i.e., in the case where the integration of the equation (18) along all of integral paths passing through respective feature points delivered from the feature point detecting section 20 is carried out, whereby key signals a on those integral paths (hereinafter referred to as the skeleton portion as the occasion may demand), the processing proceeds to step S4-5.

At the step S4-5, the closed curve generating section 44 detects the point $p_1$ (the point of $\alpha=0$) and the point $p_2$ (the point of $\alpha=1$) from the key signals $\alpha$ on respective integral paths delivered from the integration executing section 43 to connect the points pi to each other and to connect the point $p_2$ to each other to thereby generate a P1 closed curve and a P2 closed curve. Thus, the processing at the integral value calculating section 40 is completed.

It is to be noted that, at the integration executing section 43, the integration along the integral path delivered from the integral path determining section 41 is carried out with respect to, e.g., segment (line segment) (hereinafter referred to as path segment as the occasion may demand) between the point where the key signal $\alpha$ becomes equal to 0 (the point $p_1$) and the point where it becomes equal to 1 (the point $p_2$) of that integral path, i.e., the integral path within the gray area. This is because since key signals a in areas except for the gray area take any one of values 0 and 1, it is unnecessary to determine a with respect to such areas in accordance with the equation (18). Accordingly, only the key signal $\alpha$ on the path segment is calculated at the integration executing section 43, and the above-described skeleton portion means the path segments in all integral paths delivered from the integral path determining section 41.

The skeleton portion of the key signal, and the P1 closed curve and the P2 closed curve obtained at the integral value calculating section 40 in a manner as described above are delivered to the key signal generating section 50.

At step S6 (FIG. 11), the key signal generating section 50 carries out interpolation with respect to the skeleton portion of the key signal to generate a key signal $\alpha$ corresponding to the entirety of the picture C. Thus, the processing at the key signal generating section 50 is completed.

Figure 27:
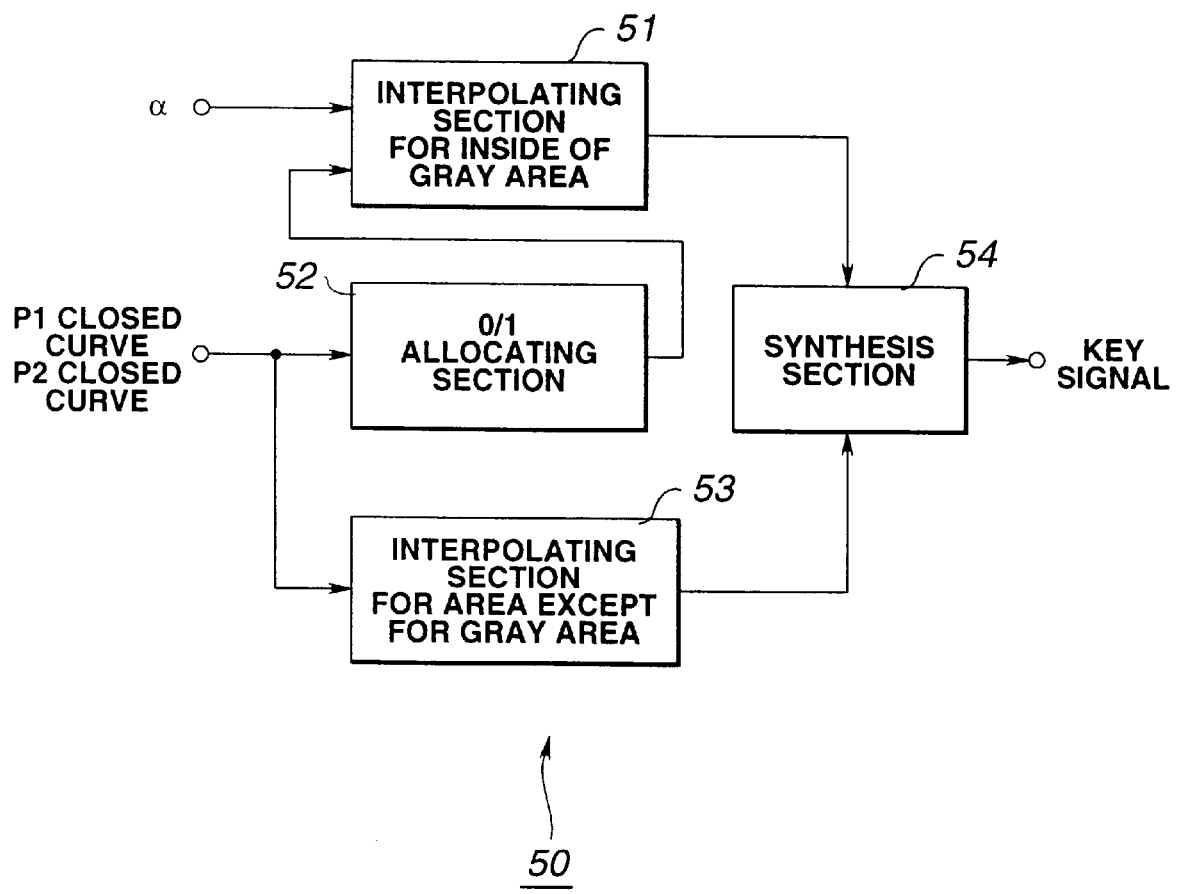
FIG. 27 is a block diagram showing an example of the configuration of key signal generating section 50 of FIG. 10.

A more practical example of the configuration of the key signal generating section 50 is shown in FIG. 27. An interpolating section 51 for inside of the gray area is supplied with the skeleton portion of the key signal from the integral value calculating section 40 and key signals on the P1 closed curve and the P2 closed curve from 0/1 allocating section 52 which will be described later. Thus, the interpolating section 51 for inside of the gray area carries out interpolation of the key signal in the area except for the skeleton portion, the P1 closed curve and the P2 closed curve of the gray area shown in FIG. 28A in such a manner that slanting lines are attached (the area surrounded by the skeleton portion, the P1 closed curve and the P2 closed curve).

Figure 28A:
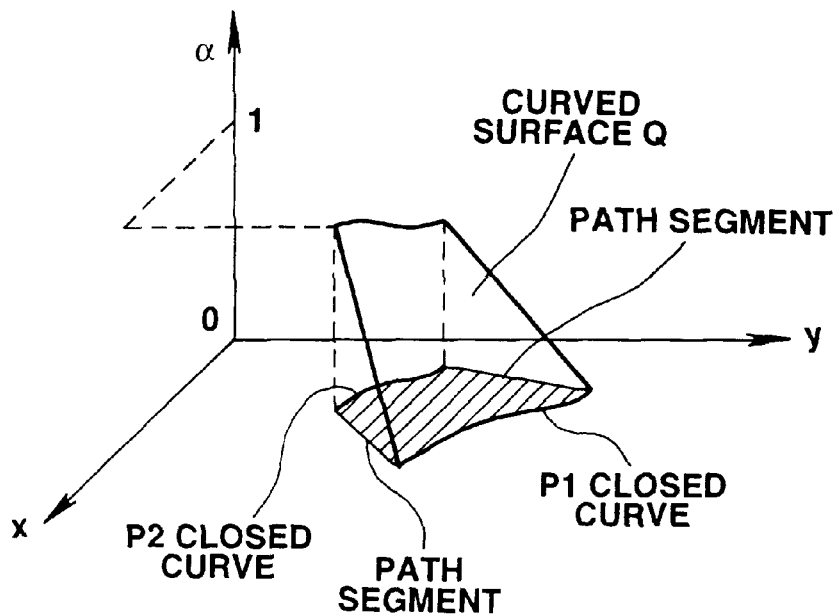
FIG. 28 is a view for explaining processing of the key signal generating section 50 of FIG. 27.

Namely, FIG. 28A shows xyα space in which picture C is disposed on the xy-plane and axis (α-axis) perpendicular to that xy-plane is taken. It is now assumed that key signals at respective points on the picture C are plotted in the α-axis direction within this xyα space. Since the key signals delivered to the interpolating section 51 for the inside of the gray area are the skeleton portion of the key signal (key signal on the path segment), key signals on the P1 closed curve (since the P1 closed curve is the curve in which points $p_1$ where $\alpha$ is equal to 0 are connected, values of key signals thereat are 0 (zero)), and key signals on the P2 closed curve (since the P2 closed curve is the curve in which points $p_2$ where $\alpha$ is equal to 1 are connected, values of key signals thereat are 1), points corresponding to the skeleton portion of the key signal are plotted on the path segment, and points of α=0 and α=1 are respectively plotted on the P1 closed curve and the P2 closed curve. Thus, a frame as indicated by thick line in FIG. 28A (hereinafter referred to as the skeleton frame as the occasion may demand) is formed on the xyα space.

Figure 28B:
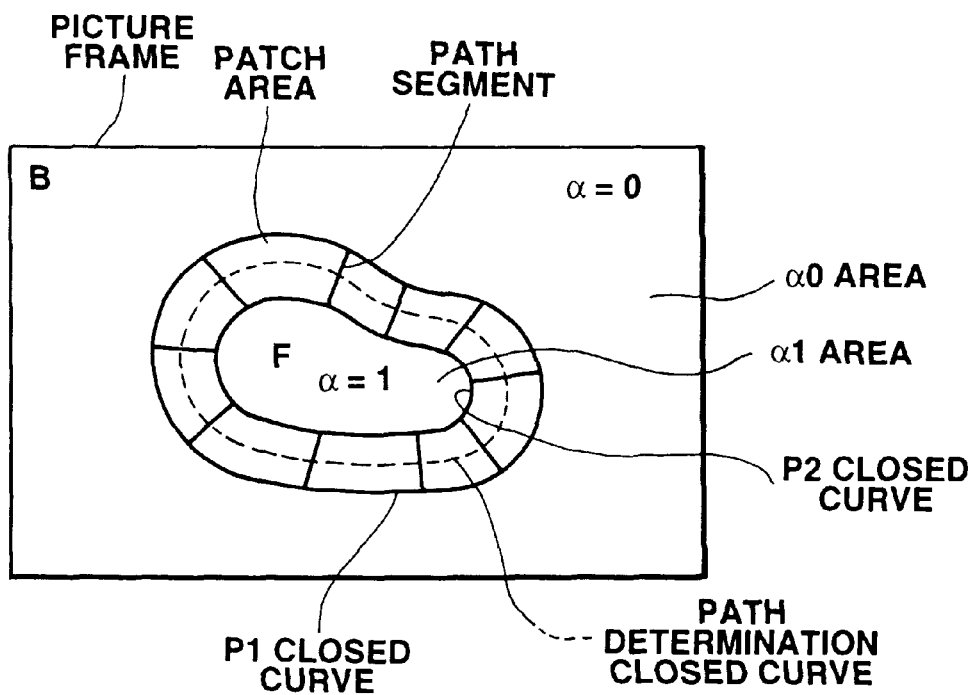

Then, the interpolating section 51 for the inside of the gray area generates curved surface Q for interpolating the inside of the skeleton frame to allow a that this curved surface Q provides (designates) to be key signals a at respective points within the area formed when the curved surface Q is projected onto the xy-plane (portions to which slanting lines are attached in FIG. 28B which will be referred to as patch areas as the occasion may demand).

In this case, the interpolating section 51 for the inside of the gray area carries out, as shown in FIG. 28B, interpolation of key signals as described above with respect to the areas surrounded by the P1 and P2 closed curves and the path segment, i.e., all of the patch areas.

The skeleton portion of the key signal, the key signals (α=0) on the P1 closed curve, the key signals (α=1) on the P2 closed curve, and the key signals in the patch area obtained by interpolation are delivered from the interpolating section 51 for the inside of the gray area to a synthesis section 54.

The 0/1 allocating section 52 is supplied with the P1 closed curve and the P2 closed curve. The 0/1 allocating section 52 respectively allocates 0 and 1 as key signals α on the P1 closed curve and the P2 closed curve to deliver them to the interpolating section 51 for the inside of the gray area. Moreover, an interpolating section 53 for area except for the gray area is supplied with the P1 closed curve and the P2 closed curve. As shown in FIG. 28B, the interpolating section 53 for area except for the gray area interpolates 0 as key signals at respective points within the area put between the picture frame of the picture C and the P1 closed curve (the area considered to be completely background B, which will be referred to as α0 area as the occasion may demand hereinafter), and interpolates 1 as key signals at respective points within the area surrounded by the P2 closed curve (the area considered to be completely the foreground F, which will be referred to as α1 area as the occasion may demand hereinafter), thus to deliver them to the synthesis section 54.

The synthesis section 54 synthesizes (arranges (allocates) at corresponding positions within the picture frame of the picture C) the skeleton portion of the key signal, the key signals on the P1 closed curve, the key signals on the P2 closed curve, and the key signals of the patch area obtained by interpolation from the interpolating section 51 for the inside of the gray area, and the key signals of the α0 area and the key signals of the a1 area from the interpolating section 53 for area except for the gray area, thereby to generate a key signal corresponding to the entirety of the picture C.

Figure 29:
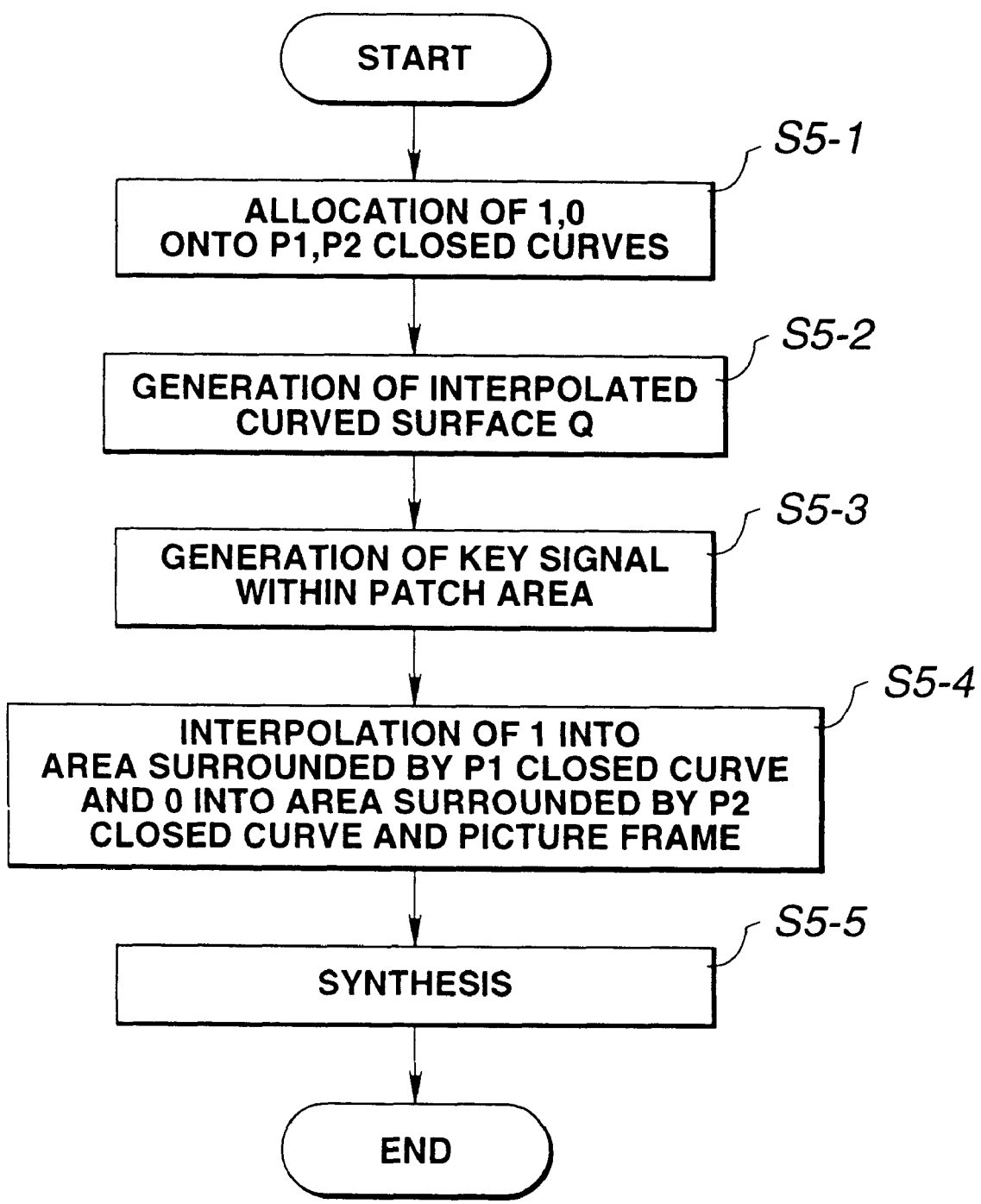
FIG. 29 is a flowchart for explaining the operation of the key signal generating section 50 of FIG. 27.

The operation of the key signal generating section 50 will now be described with reference to the flowchart of FIG. 29.

At step S5-1, the 0/1 allocating section 52 respectively allocates 0, 1 to the P1 closed curve and the P2 closed curve to generate key signals on the P1 closed curve and key signals on the P2 closed curve. The key signals on the P1 closed curve and the key signals on the P2 closed curve are delivered to the interpolating section 51 for the inside of the gray area.

At step S5-2, the interpolating section 51 for the inside of the gray area is operative so that when the key signals on the P1 closed curve and the key signals on the P2 closed curve are delivered thereto from the 0/1 allocating section 52, it forms the skeleton frame as has been explained with reference to FIG. 28A to further generate curved surface (interpolation curved surface) Q for interpolating the inside of the skeleton portion.

At step S5-3, the interpolating section 51 for the inside of the gray area generates key signals of the patch areas on the basis of the curved surface Q to deliver them to the synthesis section 54.

At step S5-4, the interpolating section 53 for area except for the gray area interpolates 0 as key signals at respective points within the α0 area, and interpolates 1 as key signals at respective points within the α1 area, thus to deliver them to the synthesis section 54.

At step S5-5, the synthesis section 54 synthesizes the skeleton portion of the key signal, the key signals on the P1 closed curve, the key signals on the P2 closed area and the key signals of the patch areas obtained by interpolation delivered from the interpolating section for the inside of the gray area, and the key signals of the α0 area and the key signals of the α1 area delivered from the interpolating section 53 for area except for the gray area to generate a key signal corresponding to the entirety of the picture C. Then, the synthesis section 54 converts this key signal (continuous key signal) into key signals of pixel units by implementing, e.g., filtering, etc. thereto as previously described to output these key signals as a key signal for extracting the foreground F from the picture, and allowing the extracted foreground F to undergo synthesis (keying) with respect any other picture. Thus, the processing at the key signal generating section 50 is completed.

It is to be noted that the processing of the step S5-4 may be carried out prior to the processing of the steps S5-1 to S5-3, or may be carried out at the same time (in parallel).

Further, while the key signals of the patch areas are obtained from the curved surface Q for interpolating the skeleton frame in the above-described case, the key signals of the patch areas may be determined, in addition to the above, e.g., in a manner as described below. Namely, an approach may be employed to determine key signals at points adjacent to the path segment, the P1 closed curve and the P2 closed curve within the gray area on the basis of the skeleton portion of the key signal, the key signals on the P1 closed curve and the key signals on the P2 closed curve which have been already obtained to sequentially, at times subsequent thereto, key signals at points adjacent to points where the key signals have been determined on the basis of already determined key signals.

Moreover, while such an approach is employed in the above-described case to determine key signals of the patch areas from the curved surface Q for interpolating the skeleton frame formed by plotting points corresponding to the skeleton portion of the key signal onto the path segment, and respectively plotting respective points of α=0, α=1 onto the P1 closed curve and the P2 closed curve, the key signals of the patch areas may be determined, in addition to the above-mentioned approach, e.g., from a curved surface for interpolating frame obtained by further plotting points of α=0.5 as well onto the path determination closed curve.

While the path determination closed curve, i.e., boundary between the foreground F and the background B is determined from change C' of the pixel value in the embodiment of FIG. 10, the path determination closed curve may be determined on the basis of instruction from users of the apparatus.

A more practical example of the configuration of a key signal generating apparatus for calculating a path determination closed curve on the basis of instruction from a user is shown in FIG. 30. It is to be noted that the same reference numerals are respectively attached to portions corresponding to the key signal generating apparatus shown in FIG. 10, and the explanation will be omitted as the occasion may demand in the following description.

Namely, at this key signal generating apparatus, a feature point detecting section 60 is provided in place of the feature point detecting section 20, and an operation section 1 is newly provided. In addition, other portions of this key signal generating apparatus are respectively constituted in the same manner as in the key signal generating apparatus shown in FIG. 10.

The operation section 1 is composed of, e.g., tablet and pen or mouse, etc., and is operated when a user designates the boundary between the foreground F and the background B while looking at picture C displayed on display (not shown). In addition, an operation signal corresponding to that operation is delivered to the feature point detecting section 60.

Figure 31:
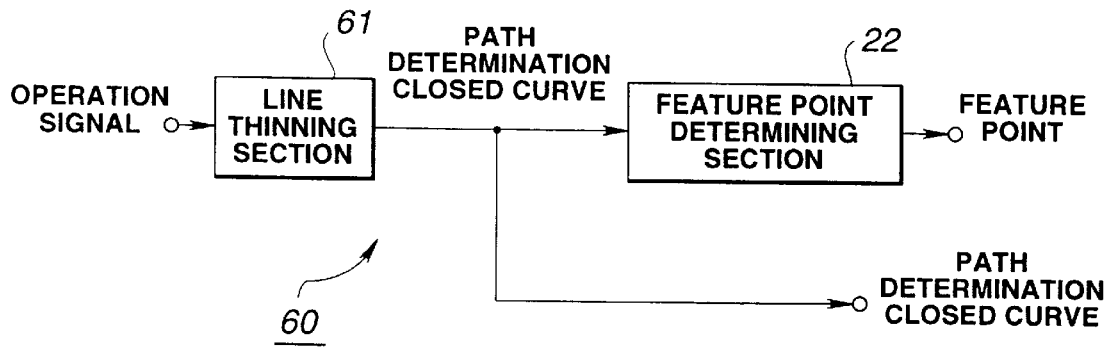
FIG. 31 is a block diagram showing an example of the configuration of feature point detecting section 60 of FIG. 30.

The feature point detecting section 60 detects the path determination closed curve and the feature points on the basis of the operation signal from the operation section 1. A more practical example of the configuration of the feature point detecting section 60 is shown in FIG. 31. It is to be noted that, in the feature point detecting section 60 shown in FIG. 31, the same reference numerals are respectively attached with respect to portions corresponding to the feature point detecting section 20 shown in FIG. 16 and their explanation will be omitted as the occasion may demand in the following description. Namely, a line thinning section 61 is provided, in place of the boundary detecting section 21, at the feature point detecting section 60, and other portions of the feature point detecting section 60 are constituted in the same manner as in the feature point detecting section 20.

Figure 32A:
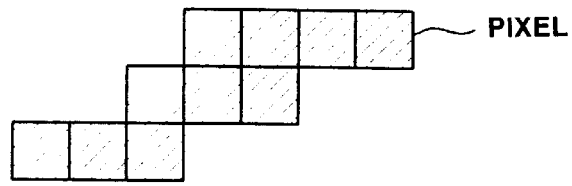
FIG. 32 is a view for explaining processing of line thinning section 61 of FIG. 31.
Figure 32B:
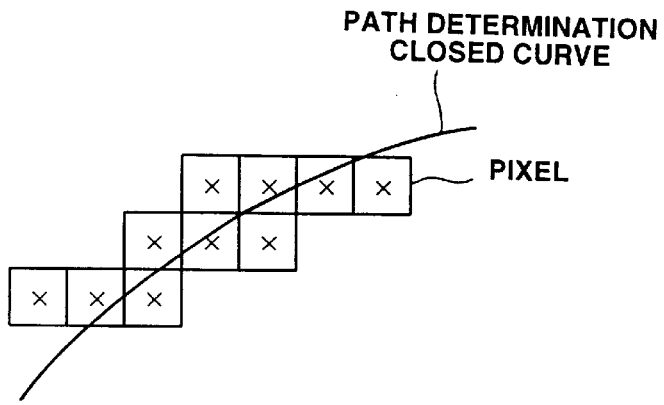

The line thinning section 61 recognizes line designated by user (hereinafter referred to as designation line as the occasion may demand), which corresponds to the boundary between the foreground F and the background B, on the basis of the operation signal delivered from the operation section 1 to carry out line thinning to thereby detect a path determination closed curve. For example, the designation line is displayed on a display where picture C is displayed in a manner overlaid upon the picture C, and is line having width of one pixel or more as shown in FIG. 32A. In view of this, the line thinning section 61 determines, as shown in FIG. 32B, for example, in order to determine path determination closed curve as an ideal line having no width from such designation line having width, a line (curve) which minimizes square error of distances from the centers of pixels constituting the designation line (portions indicated by mark x in FIG. 32B) by the least square (method) to allow this line to be the path determination closed curve.

This path determination closed curve is delivered from the line thinning section 61 to the feature point determining section 22.

It is to be noted that the method of thinning the designation line is not limited to the above-described method, but other methods may be used for this purpose. Namely, e.g., an approach may be employed to remove pixels constituting the designation line from pixels positioned outside to thereby generate a thin line having width consisting of one pixel to further determine a line which most satisfactorily approximate a line passing through the centers of pixels constituting that thin line to allow this line to be the path determination closed curve.

In the key signal generating apparatus constituted as described above, when designation line corresponding to the boundary between the foreground F and the background B (pixels constituting the boundary) as the result of the fact that the operation section 1 is operated by user, thinning of that designation line is carried out at the line thinning section 61 of the feature point detecting section 60, whereby the path determination closed curve is determined. The path determination closed curve thus obtained is delivered to the feature point determining section 22. At times subsequent thereto, processing similar to the key signal generating apparatus shown in FIG. 10 is carried out. Thus, a key signal α corresponding to the entirety of the picture C is determined.

Accordingly, since the path determination closed curve is determined on the basis of designation by user (designation line) in this case, change C' of the pixel value becomes unnecessary in order to determine the path determination closed curve. Namely, in this case, there is no necessity of delivering change C' of the pixel value with respect to the feature point detecting section 60 from the change detecting section 10.

While the key signal generating apparatus shown in FIG. 10 is adapted to determine difference F–B at the F–B detecting section 30 to normalize the change C' of the pixel value thereafter to determine the key signal, the key signal generating apparatus may be of construction in which no F–B detecting section 30 is provided.

As a more practical example, the configuration of another embodiment of the key signal generating apparatus to which this invention is applied is shown in FIG. 33. It is to be noted that, in the key signal generating apparatus shown in FIG. 33, the same reference numerals are respectively attached with respect to portions corresponding to the key signal generating apparatus shown in FIG. 10, and their explanation will be omitted as the occasion may demand. Namely, this key signal generating apparatus is adapted so that the F–B detecting section 30 is omitted and an integral value calculating section 70 is provided in place of the integral value calculating section 40. In addition, other portions of the key signal generating apparatus are constituted in the same manner as in the key signal generating apparatus shown in FIG. 10.

The integral value calculating section 70 is operative so that, within the range where quantity (magnitude) of change C' of the pixel value is above a predetermined threshold value K (hereinafter referred to as integral range as the occasion may demand), it integrates its change quantity, e.g., along the direction in which change of the pixel value C' has been detected, or the like to calculate a key signal (the skeleton portion of the key signal).

Figure 34A:
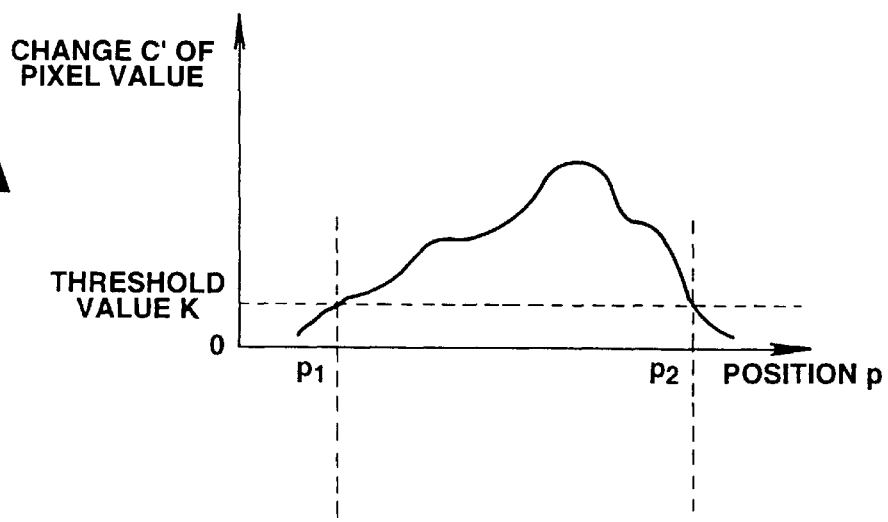
FIG. 34 is a view for explaining processing of integral value calculating section 70 of FIG. 33.

Namely, the integral value calculating section 70 first determines points on the boundary of the gray area, i.e., points $p_1$, $p_2$ where a is equal to 0, 1 of points on, e.g., the maximum inclination (gradient) direction path U (It is to be noted that the path itself may be path except for the maximum inclination (gradient) direction path U as described above). In more practical sense, as shown in FIG. 34A, for example, the integral value calculating section 70 determines two points where magnitude of change C' of the pixel value delivered from the change detecting section 10 becomes equal to the predetermined threshold value K to allow them to be respectively points $p_1$, $p_2$ (for example, when observing the change C' of the pixel value from the background B side toward the foreground F side, the point where the change C' of the pixel value be comes equal to the threshold value K in the beginning is caused to be the point $p_1$, and the point where the change C' of the pixel value becomes equal to the threshold value K thereafter is caused to be the point $p_2$.).

Further, the integral value calculating section 70 calculates, in accordance with the following equation (19), integral value (definite integral value) D (definite integral information) of change of the pixel value C' within the range (integral range) from the point $p_1$ to the point $p_2$, e.g., along the maximum inclination (gradient) direction path U.

$$D = \int_{p1}^{p2} C'(p)\,dp \qquad (19)$$

Then, the integral value calculating section 70 normalizes the change C' of the pixel value by the definite integral value D to thereby determine normalized value C'/D to integrate this normalized value C'/D, e.g. in accordance with the following equation (20) to thereby determine a key signal α with respect to the pixel at the point (position) p.

$$\alpha(p) = \int_{p1}^{p} \frac{C'(p)}{D}\,dp \qquad (20)$$

Figure 34B:
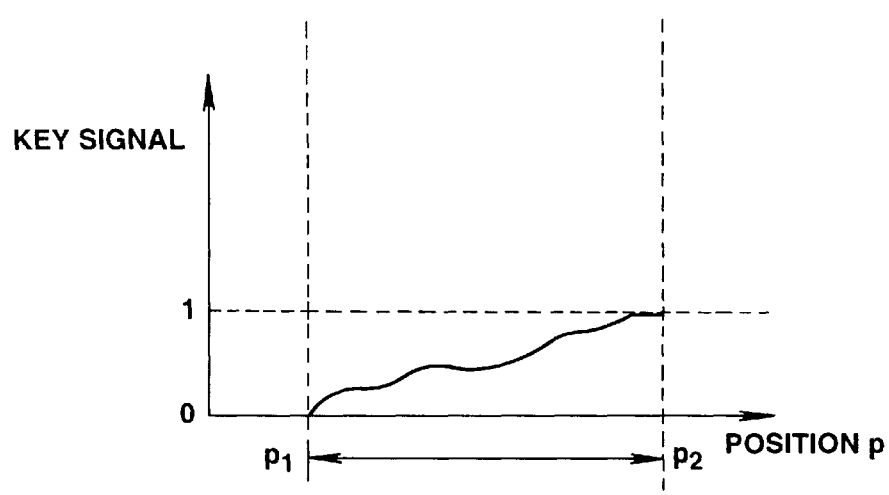

The definite integral value D corresponds to the absolute value |F−B| of difference F−B in the case of the key signal generating apparatus shown in FIG. 10. Accordingly, when the change C' of the pixel value is normalized by the definite integral value D to carry out the integration by the equation (20), it is possible to easily obtain a key signal α which takes value within the range from 0 to 1. It is to be noted that while, in this case, the key signal α is obtained within the range from the points (positions) p1 to p2 (the portion labeled "effective (valid) width" in FIG. 34B), values of key signals within the range at the left side (positioned) relative to the point $p_1$ or the range at the right side (positioned) relative to the point $p_2$ in FIG. 34B are caused to be respectively 0 and 1 (interpolation of 0 and 1 is carried out at the key signal generating section 50 as described above).

Since it is unnecessary to provide the F−B detecting section 30 at this key signal generating apparatus from facts as described above, the apparatus can be of a smaller-size configuration as compared to the key signal generating apparatus shown in FIG. 10.

Figure 35:
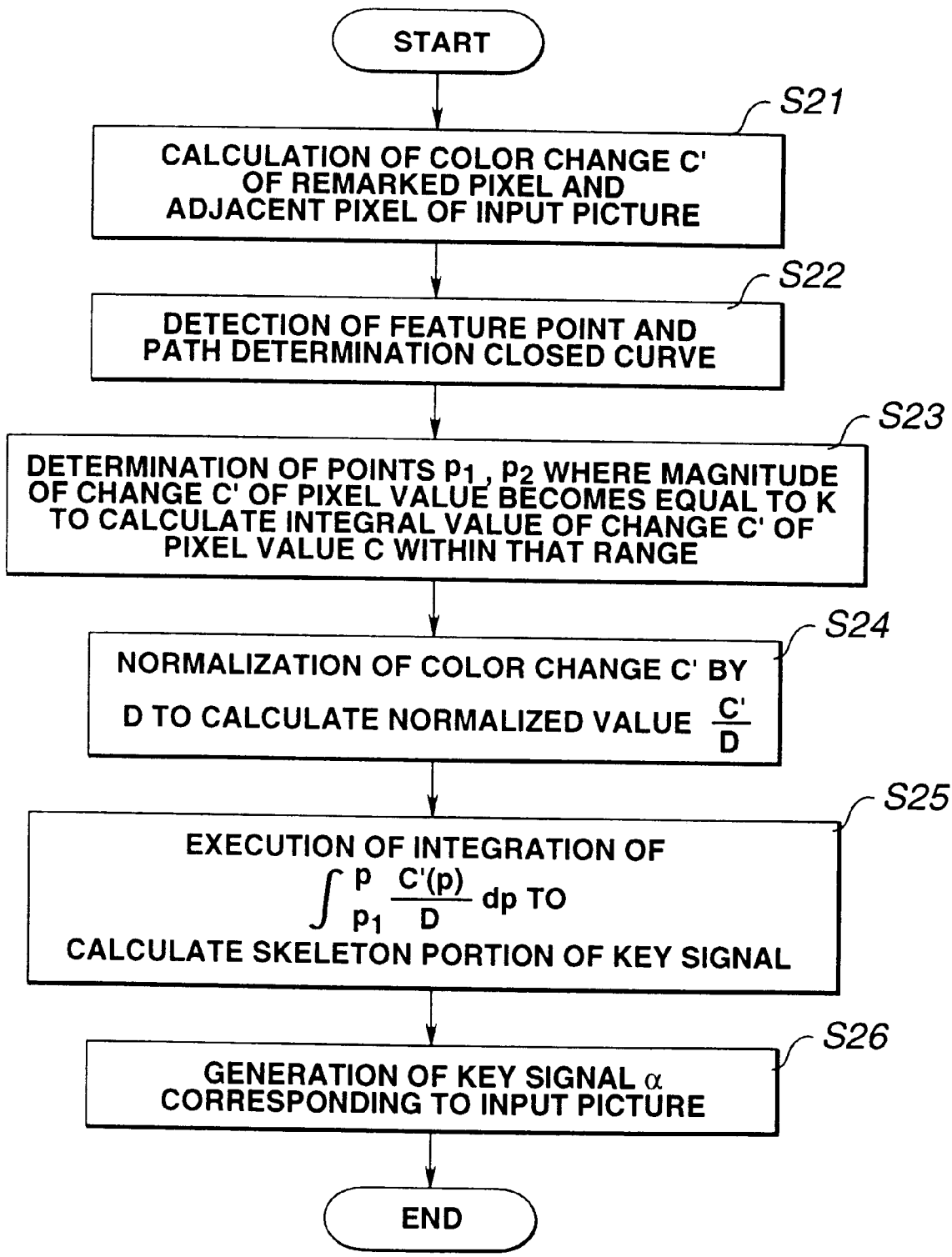
FIG. 35 is a flowchart for explaining the operation of the key signal generating apparatus of FIG. 33.

The operation of the key signal generating apparatus shown in FIG. 33 will now be described with reference to the flowchart shown in FIG. 35.

At step S21, the change detecting section 10 calculates change C' of the pixel value between pixels of picture (input picture) C similarly to the case of the step S1 of FIG. 11 to deliver it to the feature point detecting section 20 and the integral value calculating section 70.

At step S22, the feature point detecting section 20 is operative so that when the change C' of the pixel value is delivered thereto from the change detecting section 10, it detects the path determination closed curve and the feature points similarly to the case at the step S2 of FIG. 11 to deliver the path determination closed curve and the feature points to the integral value calculating section 70.

At step S23, the integral value calculating section 70 is operative so that the change C' of the pixel value is delivered thereto from the change detecting section 10 and the path determination closed curve and the feature points are delivered thereto from the feature point detecting section 20, it determines the integral path, e.g., similarly to the integral value calculating section 40 of FIG. 10 to further determine points $p_1$, $p_2$ where magnitude of change C' of the pixel value becomes equal to a predetermined threshold value K, as has been explained with reference to FIG. 34A, on the integral path. Then, the integral value calculating section 70 calculates integral value D of the quantity of the change C' of the pixel values at the points on the integral path existing within the range from the point $P_1$ to the point $P_2$ in accordance with the equation (19).

At step S24, the integral value calculating section 70 normalizes the change C' of the pixel value by the integral value D to calculate normalized value C'/D.

At step S25, the integral value calculating section 70 determines, in accordance with the equation (20), the key signal with respect to the points p constituting the integral path (path segment), i.e., the skeleton portion of the key signal to deliver it to the key signal generating section 50. Further, the integral value calculating section 70 generates P1 closed curve and P2 closed curve similarly to the integral value calculating section 40 of FIG. 10 to deliver them to the key signal generating section 50.

At step S26, the key signal generating section 50 carries out processing similar to that in the case of the step S6 of FIG. 11 to thereby generate a key signal α corresponding to the entirety of the picture C. Thus, the processing at the key signal generating apparatus is completed.

An example of the configuration of the integral value calculating section 70 of FIG. 33 is shown in FIG. 36.

Path determination closed curve and feature points from the feature point detecting section 20 are delivered to an integral path determining section 71, and change C' of the pixel value from the change detecting section 10 is delivered to the integral path determining section 71, α definite integral value calculating section 72, and a normalization executing section 73. In this example, the integral path determining section 71 is also supplied with a predetermined threshold value K from circuit (not shown).

Figure 24:
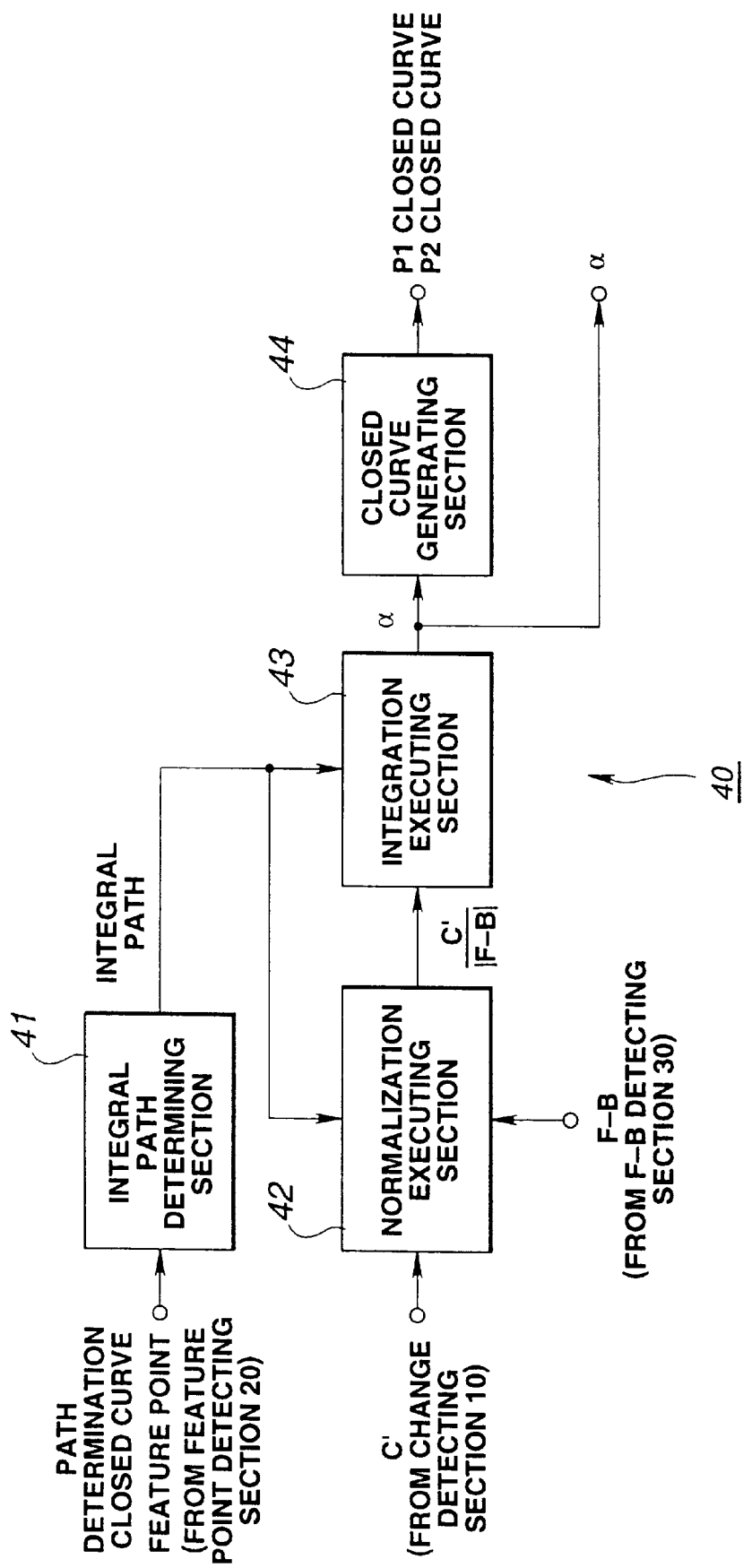
FIG. 24 is a block diagram showing an example of the configuration of integral value calculating section 40 of FIG. 10.

The integral path determining section 71 determines integral paths passing through respective feature points, similarly to the integral path determining section 41 shown in FIG. 24, on the basis of the feature points and the path determination closed curves to deliver these integral paths to the definite integral value calculating section 72, the normalization executing section 73 and the integration executing section 74. Further, the integral path determining section 71 determines points where the magnitude of the change C' of the pixel value becomes equal to the predetermined threshold value K, i.e., points $p_1$, $p_2$ of points on the integral paths passing through respective feature points to deliver these points $p_1$, $p_2$ to the definite integral value calculating section 72, an integration executing section 74 and a closed curve generating section 75.

The definite integral value calculating section 72 performs an operation in accordance with the equation (19). Namely, the definite integral value calculating section 72 carries out definite integral of change C' of the pixel value within the range from the point $p_1$ up to the point $p_2$ similarly delivered from the integral path determining section 71 along the integral paths passing through respective feature points delivered from the integral path determining section 71 to deliver, to the normalization executing section 73, integral values (definite integral values) D every respective integral paths obtained as the result thereof.

The normalization executing section 73 normalizes change C' of the pixel value on each integral path delivered from the integral path determining section 71 by the definite integral value D with respect to each integral path delivered from the definite integral value calculating section 72 to deliver the normalized value C'/D obtained as the result thereof to the integration executing section 74.

The integration executing section 74 performs an operation in accordance with the equation (20). Namely, the integration executing section 74 carries out integration of the normalized value C'/D delivered from the normalization executing section 73 along each integral path delivered from the integral path determining section 72 to output the skeleton portion of the key signal as the integral value on each integral path (path segment) obtained as the result thereof. It is to be noted that while the integration along each integral path at the integration executing section 74 is carried out according to the equation (20) in such a manner that the point $p_1$ on each integral path delivered from the integral path determining section 71 is caused to be the initial (start) point, such integration may be also carried out in such a manner that the point $p_2$ is caused to be the initial point.

The closed curve generating section 75 is operative so that when points $p_1$, $p_2$ on all integral paths are delivered thereto from the integral path determining section 71, it connects the points $p_1$ to each other, and connects the points $p_2$ to each other to thereby respectively generate P1 closed curve and P2 closed curve.

Figure 37:
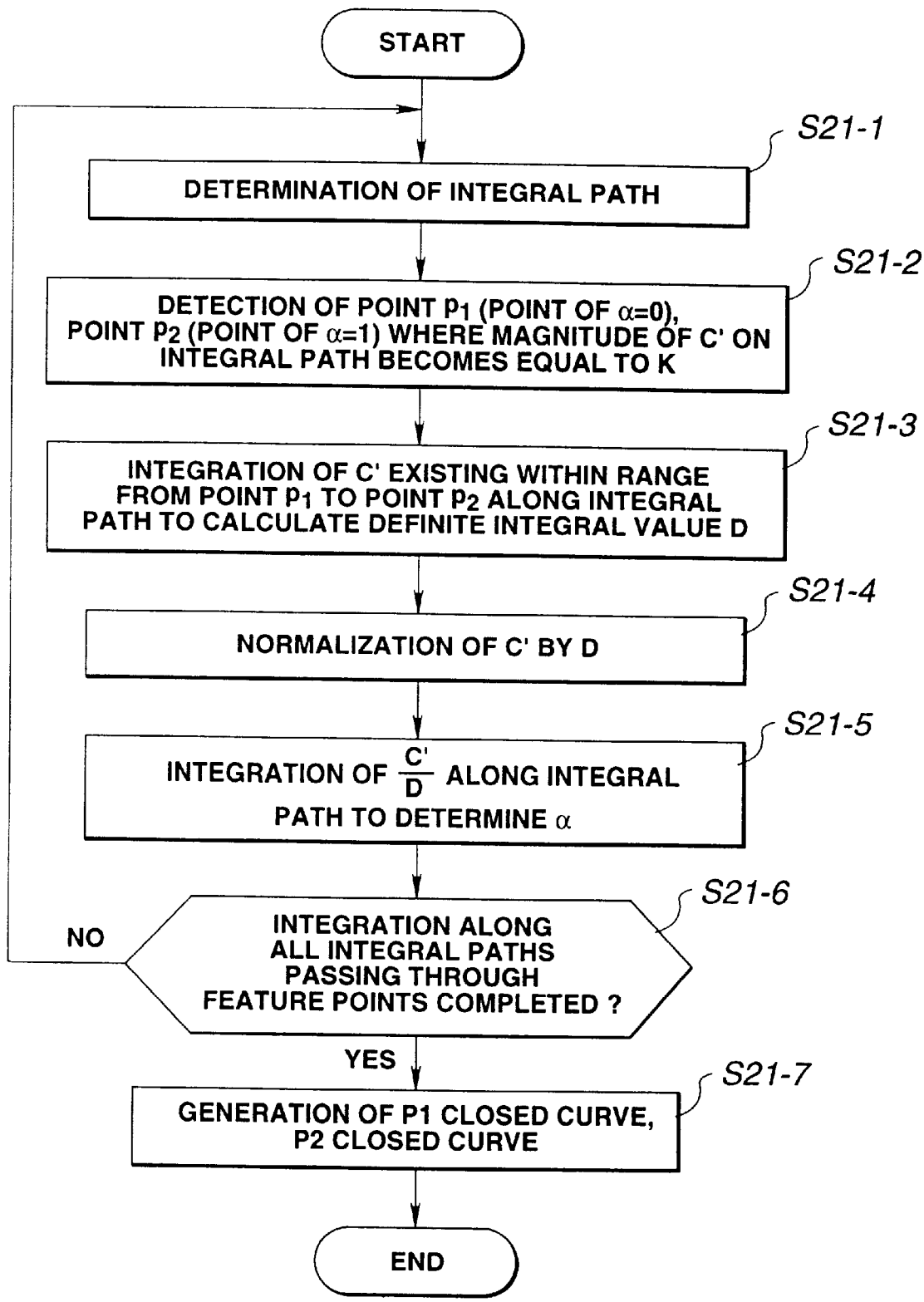
FIG. 37 is a flowchart for explaining the operation of integral value calculating section 70 of FIG. 36.

The operation of the integral value calculating section 70 will now be described with reference to the flowchart of FIG. 37.

Figure 26:
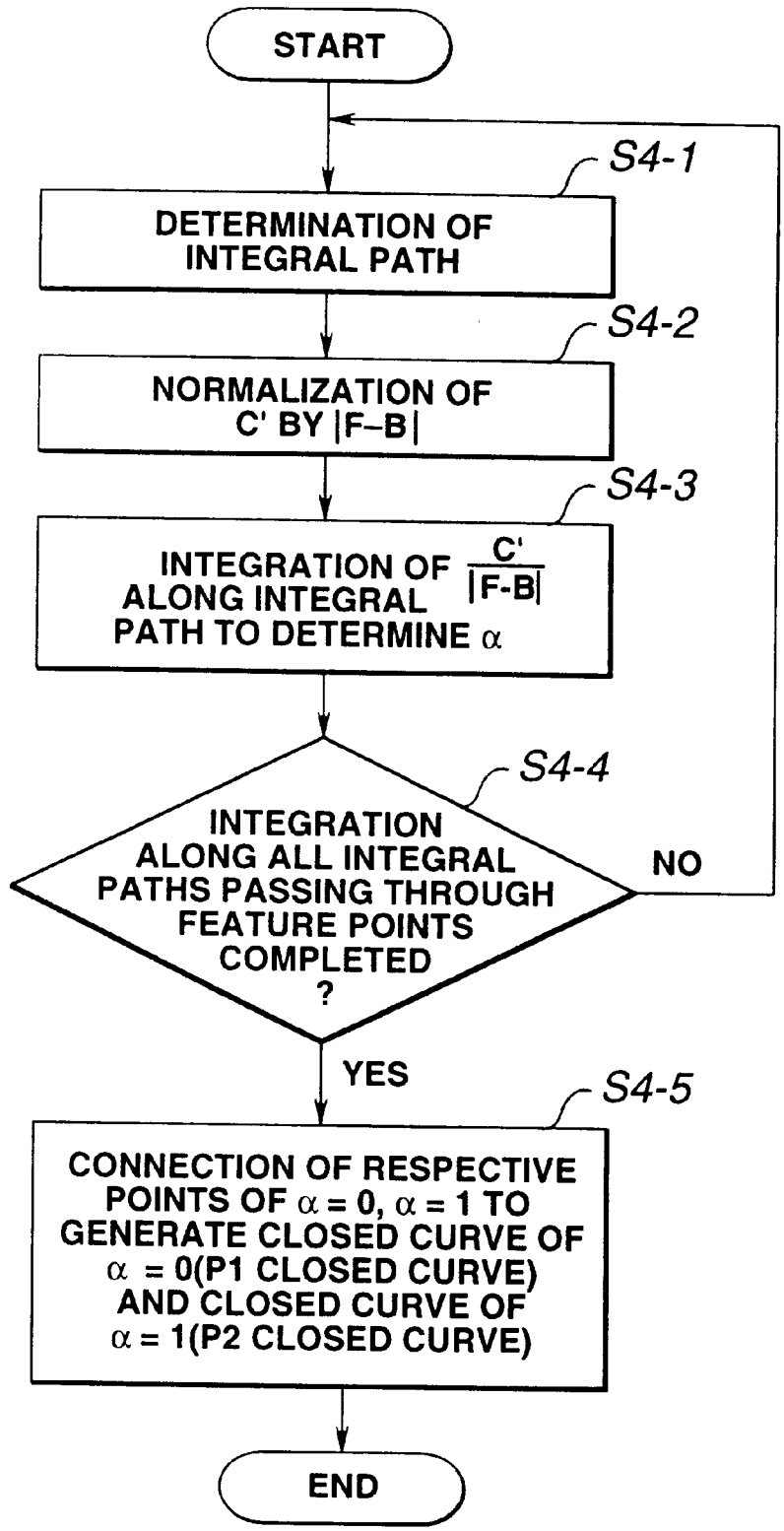
FIG. 26 is a flowchart for explaining the operation of the integral value calculating section 40 of FIG. 24.

At step S21-1, the integral path determining section 71 carries out processing similar to that in the case of the step S4-1 of FIG. 26 to determine integral paths passing through the remarked feature points to deliver these integral paths to the definite integral value calculating section 72, the normalization executing section 73 and the integration executing section 74.

At step S21-2, the integral path determining section 71 detects points $p_1$, $p_2$ where the magnitude of change C' of pixel value delivered from the change detecting section 10 becomes equal to the predetermined threshold value K of points on the integral paths passing through the remarked feature points to deliver these points $p_1$, $p_2$ to the definite integral value calculating section 72, the integration executing section 74 and the closed curve generating section 75.

At step S21-3, the definite integral value calculating section 72 is operative so that when the integral path with respect to the remarked feature point and points $p_1$, $p_2$ on the integral path are delivered thereto from the integral path determining section 71, it carries out integration of change C' of the pixel value within the range from the point $p_1$ to the point $p_2$ along the integral path in accordance with the equation (19) to deliver definite integral value D obtained as the result thereof to the normalization executing section 73.

At step S21-4, the normalization executing section 73 normalizes the change C' of the pixel value of pixel on the integral path with respect to the remarked feature point by the definite integral value D delivered from the definite integral value calculating section 72 to deliver normalized value C'/D obtained as the result thereof to the integration executing section 74.

At step S21-5, the integration executing section 74 integrates, in accordance with the equation (20), the normalized value C'/D delivered from the normalization executing section 73, with, e.g., the point pi delivered from the integral path determining section 71 being as the initial (start) point, along the integral path similarly delivered from the integral path determining section 71 to calculate the key signal on the integral path, i.e., the skeleton portion of the key signal.

At step S21-6, the integral path determining section 71 judges whether or not all of feature points from the feature point detecting section 20 have been caused to be the remarked feature point. In the case where the integral path determining section 71 has judged at this step S21-6 that all of feature points from the feature point detecting section 20 have not yet been caused to be the remarked feature point, the processing returns to the step S21-1. Thus, the integral path determining section 71 allows the feature point which is not yet caused to be the remarked feature point to be newly the remarked feature point. At times subsequent thereto, processing as described above is repeated.

On the other hand, in the case where the integral path determining section 71 has judged at the step S21-6 that all of feature points have been caused to be the remarked feature point, i.e., integration of the equation (20) along all the integral paths passing through respective feature points delivered from the feature point detecting section 20, whereby key signals on those integral paths (the skeleton portions of the key signals) have been determined, the processing proceeds to step S21-7.

At the step S21-7, the closed curve generating section 75 generates P1 closed curve and P2 closed curve. Thus, the processing at the integral value calculating section 70 is completed.

Namely, the closed curve generating section 75 connects the points $p_1$ to each other and connects the points $p_2$ to each other, those points existing on all integral paths delivered from the integral path determining section 71 to thereby respectively generate P1 closed curve and P2 closed curve.

It is to be noted that the integration at the integration executing section 74 is carried out only with respect to the path segment of the integral path similarly to the case at the integration executing sect io n 43 shown in FIG. 24.

Figure 38:
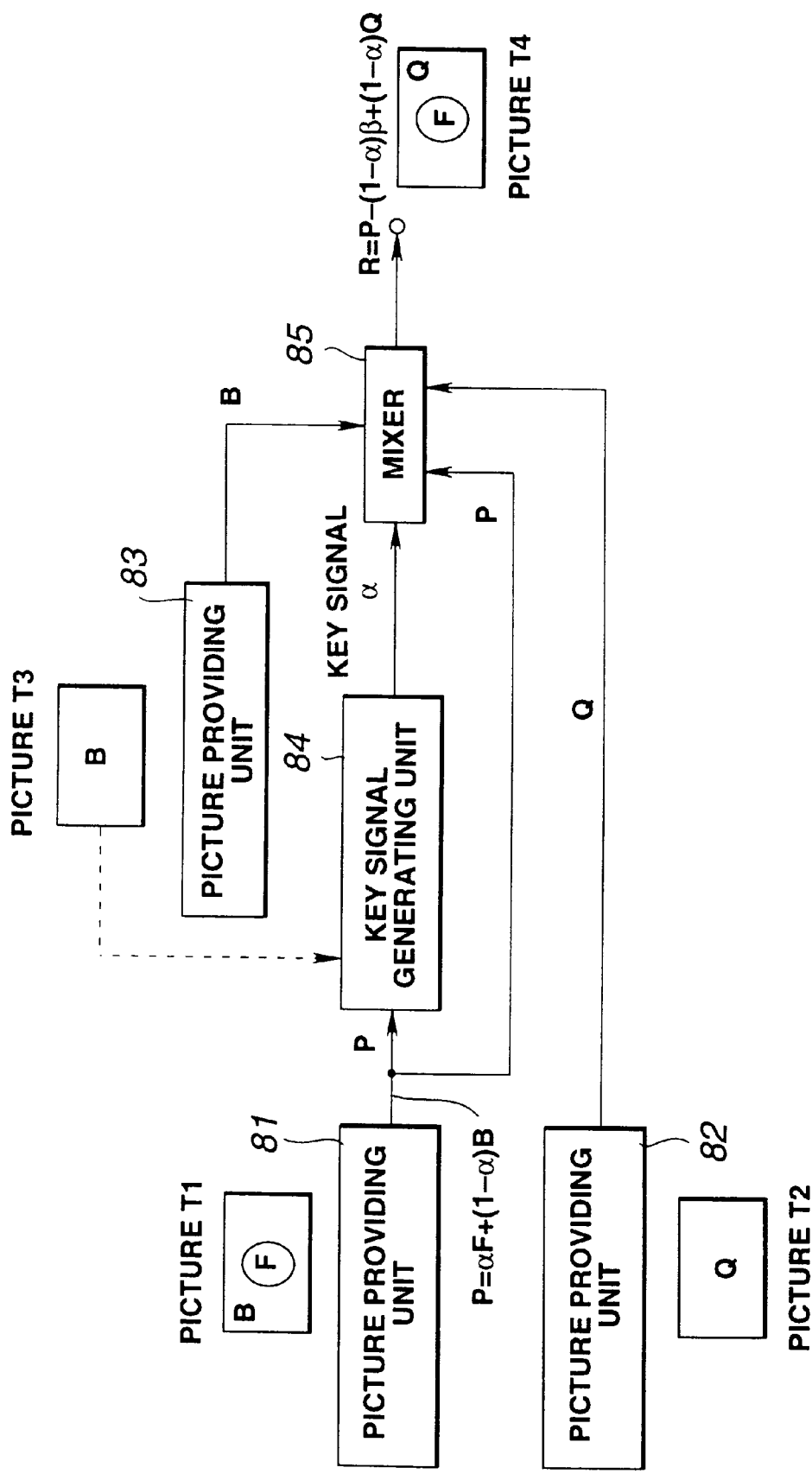
FIG. 38 is a block diagram showing the configuration of a first embodiment of a picture synthesis apparatus to which this invention is applied.

FIG. 38 shows the configuration of an embodiment of a picture synthesis apparatus to which this invention is applied.

Picture providing units comprise, e.g., a video tape recorder, hard disc device or disc player, etc., and serve to reproduce a predetermined picture to output it. In this example, picture T1 (first picture) in which the foreground and the background that the picture providing unit 81 reproduces are caused to be respectively F and B is delivered to a key signal generating unit 84 and a mixer 85. Thus, this picture T1 is caused to be the object picture for generating the key signal. Moreover, picture T2 (second picture) that the picture providing unit 82 reproduces is delivered to the mixer 85, at which the foreground F of the picture T1 is synthesized with respect to the picture T2. Further, picture T3 obtained by photographing or picking up image of only the background B of the picture T1 that the picture providing unit 81 reproduces is outputted from the picture providing unit 83. Namely, when, e.g., the picture T1 is assumed to be the picture image where a person is walking within a certain scene, the picture T3 in which image of that scene (background B) is picked up in the state where that person (foreground F) is excluded is outputted from the picture providing unit 83. The picture T3 that the picture providing unit 83 reproduces is delivered to the mixer 85.

The key signal generating unit 84 is constituted in a manner similar to the key signal generating unit of FIG. 10, 30 or 33, and generates a key signal α as described above to deliver it to the mixer 85. The mixer 85 synthesizes the picture T1 and the picture T2 inputted thereto by using the key signal α from the key signal generating unit 84. Namely, the mixer 85 extracts the foreground F from the picture T1 to synthesize (incorporate) that foreground F into (with respect to) the picture T2.

The operation of the picture synthesis apparatus will now be described.

At the picture providing units 81 to 83, pictures T1 to T3 are respectively reproduced. These pictures T1 to T3 are delivered to the mixer 85. Further, the picture T1 that the picture providing unit 81 reproduces is delivered also to the key signal generating unit 84.

The key signal generating unit 84 generates a key signal α in a manner as described above to deliver it to the mixer 85. The mixer 85 extracts the foreground F from the picture T1 inputted thereto by using the key signal α to further synthesize that foreground F into (with respect to) the picture T2 to generate picture in which the foreground F is synthesized into (with respect to) the picture T2 (synthetic picture) T4.

Namely, assuming now that pixel values of pixels at respective positions p constituting respective pictures T1, T2 are respectively designated at P(p), Q(p), pixel values of pixels at respective positions p constituting respective foreground and background of the picture T1 are respectively designated at F(p), B(p), and pixel value of pixel at each position p constituting the synthetic picture T4 is designated at R(p), the following equations (relational expressions) (21), (22) hold:

$$P(p)=\alpha F(p)+(1-\alpha)B(p) \qquad (21)$$

$$R(p)=\alpha F(p)+(1-\alpha)Q(p) \qquad (22)$$

When αF(p) of the right side of the equation (22) is eliminated from the equation (21), the equation (22) is rewritten into the following equation (23)

$$R(p)=P(p)-(1-\alpha)B(p)+(1-\alpha)Q(p) \qquad (23)$$

At the mixer 85, synthetic picture T4 is generated in accordance with the equation (23). Namely, pixel values P(p), Q(p), B(p) are respectively delivered from the picture providing units 81 to 83 to the mixer 85, and the key signal α(p) is delivered from the key signal generating unit 84 also to the mixer 85. At the mixer 85, operation of the equation (23) is performed by using the respective pixel values and the key signal. Thus, picture T4 consisting of pixel value R(p), i.e., in which the foreground F is synthesized with respect to the picture T2 is generated.

This picture T4 is delivered to, e.g., recording unit (e.g., video tape recorder, hard disc device, or writable disc drive, etc.), at which it is recorded.

Since precise key signals, i.e., key signals in which the influence of motion blur is taken into consideration and alias is permitted to be reduced are outputted from the key signal generating unit 84 as described above, in the case where such key signals are used to carry out synthesis of picture, precise synthetic picture (picture free from disagreement of feeling when viewed) can be obtained.

It is to be noted that the picture synthesis apparatus shown in FIG. 38 may be constituted as described below. Namely, since background B is provided by the picture providing unit 83, in the case where the key signal generating unit 84 is constituted by such a key signal generating apparatus as shown in FIG. 10 or 30 including the F–B detecting section 30, background B is delivered to the key signal generating unit 84 as indicated by dotted lines in FIG. 38, thus making it possible to determine difference F–B from the background B in the key signal generating unit 84.

Meanwhile, since picture T2 consisting of pixel value Q(p) is obtained from the picture providing unit 82 and the key signal α is obtained from the key signal generating unit 84, if the pixel value F(p) of the foreground F can be recognized (the pixel value F(p) can be estimated), it is possible to generate, also by the equation (22), picture T4 in which the foreground F is synthesized with respect to the picture T2.

Figure 39:
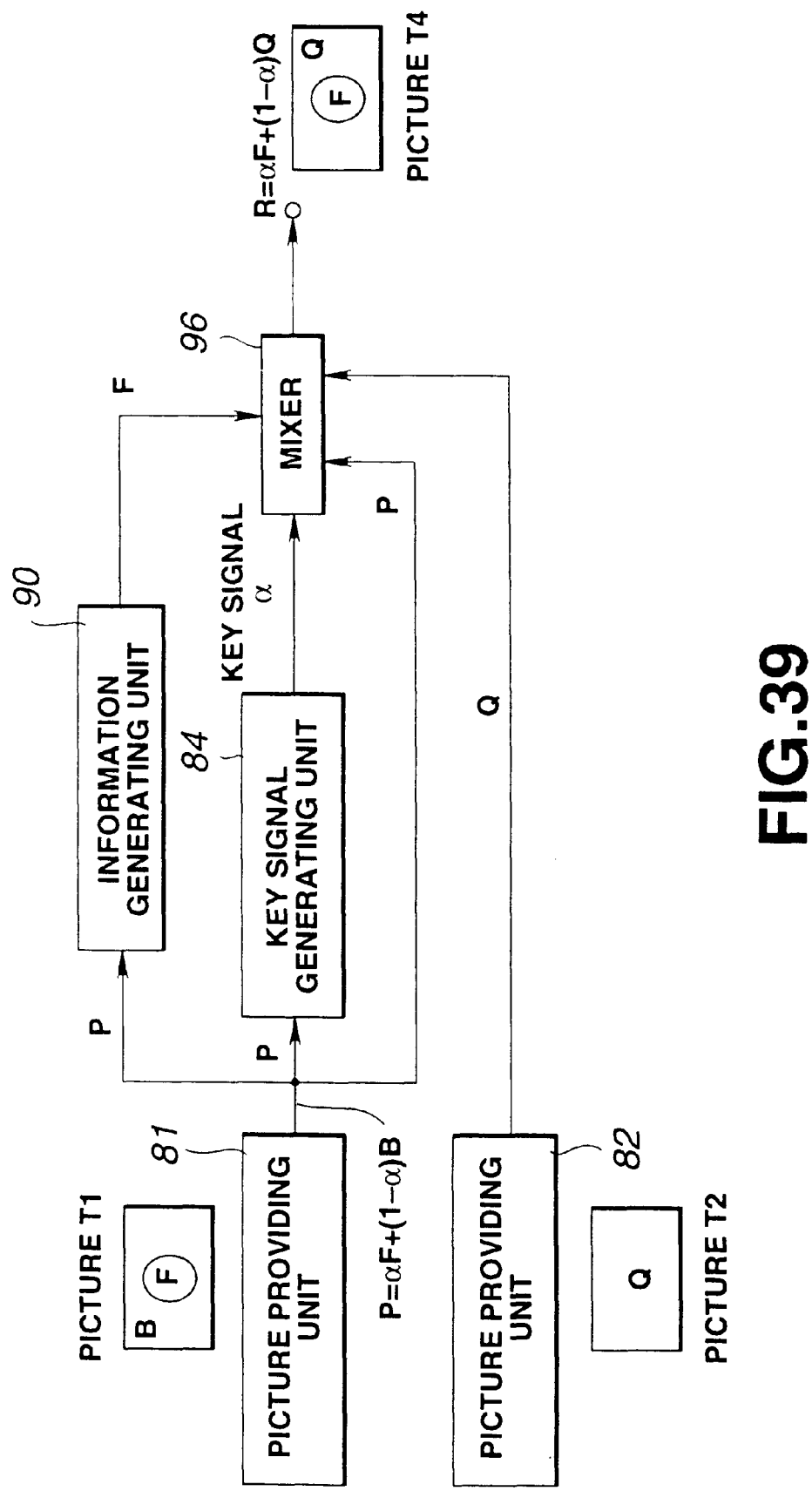
FIG. 39 is a block diagram showing the configuration of a second embodiment of the picture synthesis apparatus to which this invention is applied.

In view of the above, the configuration of an embodiment of the picture synthesis apparatus adapted for generating picture T4 in accordance with the equation (22) is shown in FIG. 39. It is to be noted that the same reference numerals are respectively attached with respect to portions corresponding to the picture synthesis apparatus shown in FIG. 38 in the picture synthesis apparatus shown in FIG. 39, and their explanation will be omitted as the occasion may demand. Namely, in this picture synthesis apparatus, an information generating unit 90 and a mixer 96 are provided in place of the picture providing unit 83 and the mixer 85. In addition, other portions of the picture synthesis apparatus are constituted similarly to the picture synthesis apparatus of FIG. 38.

The information generating unit 90 is supplied with picture T1 that the picture providing unit 81 outputs. The information generating unit 90 estimates (generates), from the picture T1, pixel value F(p) of the foreground F thereof to deliver it to the mixer 96. The mixer 96 performs an operation in accordance with the equation (22) by using pictures T1, T2 (pixel values P(p), Q(p)) that the picture information providing units 81, 82 respectively output, key signal α(p) that the key signal generating unit 84 outputs, and foreground F (pixel value F(p)) that the information generating unit 90 outputs to thereby generate synthetic picture T4 in which the foreground F is synthesized with respect to the picture T2.

In the picture synthesis apparatus constituted as described above, pictures T1, T2 are respectively reproduced at the picture providing units 81, 82. These pictures T1, T2 thus reproduced are delivered to the mixer 96. Further, the picture T1 that the picture providing unit 81 reproduces is delivered also to the information generating unit 90 and the key signal generating unit 84. The key signal generating unit 84 generates the key signal a in a manner as described above to deliver it to the mixer 96.

On the other hand, the information generating unit 90 determines, from the picture T1, pixel value F(p) of the foreground F thereof.

Figure 40:
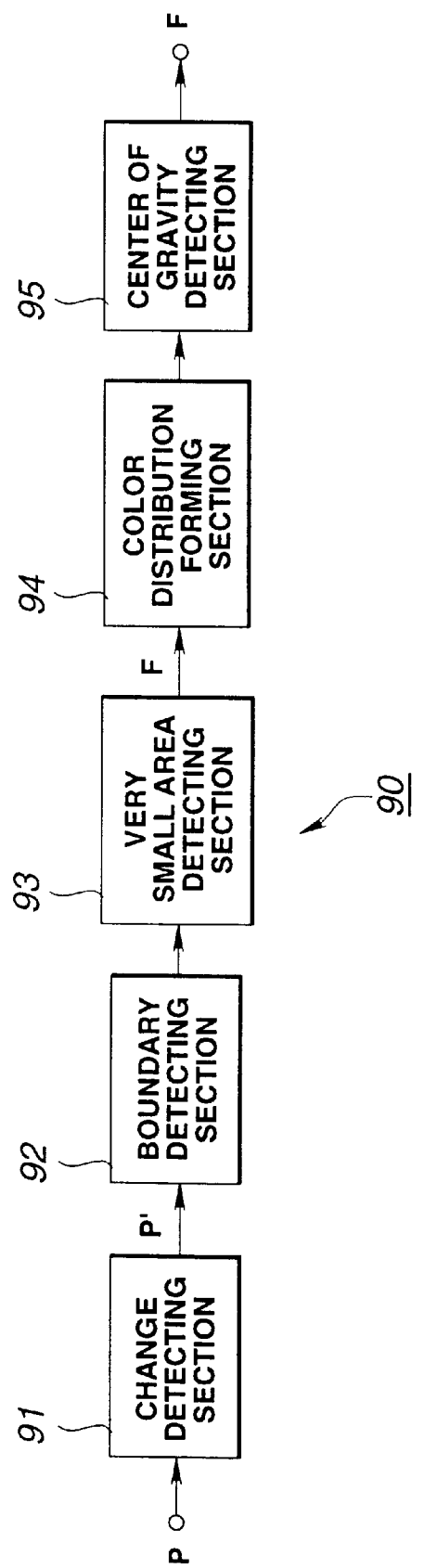
FIG. 40 is a block diagram showing an example of the configuration of information generating unit 90 of FIG. 39.

A more practical example of the configuration of the information generating unit 90 is shown in FIG. 40. This information generating unit 90 is composed of a change detecting section 91, a boundary detecting section 92, a very small area detecting section 93, a color distribution forming section 94, and a center of gravity detecting section 95. The change detecting section 91 is constituted similarly to the change detecting sections 10 respectively shown in FIGS. 10, 30 and 33, and the boundary detecting section 92 is constituted similarly to the boundary detecting section 21 of FIG. 16. Moreover, the very small area detecting section 93, the color distribution forming section 94 and the center of gravity detecting section 95 are constituted respectively similarly to the very small area detecting section 31, the color distribution forming section 32F and the center of gravity detecting section 33F. It is to be noted that the very small area detecting section 93 extracts only pixels constituting the foregrounds F with respect to respective very small areas to deliver pixel values of those pixels, i.e., only F boundary pixel values to the color distribution forming section 94.

Accordingly, at this information generating unit 90, change P' of the pixel value P of picture T1 is determined at the change detecting section 91, and path determination curve and feature points are determined on the basis of the change P' at the boundary detecting section 92. Further, at the very small area detecting section 93, very small area including respective feature points is detected, and F boundary pixel values are extracted with respect to respective very small areas. Further, color distribution on the color space of F boundary pixel values in respective very small areas is determined at the color distribution forming section 94. In addition, center of gravity of the color distribution is determined at the center of gravity detecting section 95, and the center of gravity thus obtained is outputted as pixel value F(p) of the foreground F of pixels existing at the periphery of respective feature points in the gray area.

In this example, at the information generating unit 90, with respect to the portion except for the gray area of the foreground F (completely the portion of the foreground F), pixel value F(p) of the foreground F thereof is outputted as it is.

Turning back to FIG. 39, at the mixer 96, pixel value R(p) of picture T4 in which the foreground F is synthesized with respect to the picture T2 is determined in accordance with the equation (22) by using pixel values P(p), Q(p) that the picture information providing units 81, 82 respectively output, key signal α(p) that the key signal generating unit 84 outputs, and pixel value F(p) that the information generating unit 90 outputs.

Accordingly, also in this case, it is possible to obtain precise synthetic picture.

In this instance, at the information generating unit 90, background B may be generated in place of generating foreground F. In this case, at the mixer 96, pixel value R(p) of synthetic picture T4 may be determined in accordance with the equation (23) by using the background B generated by the information generating unit 90.

It is to be noted that the synthesis method for picture at the mixers 85, 96 are not limited to the above-described method, but other synthesis methods may be used.

Further, while integration is carried out at the integral value calculating sections 40, 70 in this embodiment, there may be employed, in place of the integration, an operation equivalent to the integration, i.e., an operation to set sample points at the path for carrying out integration to add sample values at respective sample points.

In addition, while key signal portion except for the skeleton portion of key signals in the gray area is determined by interpolation in this embodiment, key signal portion except for the skeleton portion of the key signal may be determined, e.g., by carrying out integration based on the equation (18) or the equation (20) in place of the interpolation.

It should be noted that various modifications and/or application examples are conceivable (applicable) within the range which does not depart from the gist of this invention. Accordingly, the gist of this invention is not limited to the embodiments.

Industrial Applicability

In accordance with the key signal generating apparatus and the key signal generating method according to this invention, change of pixel value between pixels constituting picture is detected to generate a key signal on the basis of change of that pixel value. Accordingly, precise key signal can be obtained.

In accordance with the picture synthesis apparatus and the picture synthesis method according to this invention, change of pixel value between pixels constituting a first picture is detected to generate a key signal on the basis of the change of that pixel value. Then, that key signal is used to synthesize the foreground picture of the first picture and the background picture of a second picture. Accordingly, precise synthetic picture can be obtained.

What is claimed is:

1. A key signal generating apparatus adapted for generating a key signal from picture, key signal generating means for generating the key signal on the basis of the change of the pixel value outputted from the change detecting means;

wherein the key signal generating means is adapted so that in the case where alias takes place in the picture, it generates the key signal for allowing the influence of that alias to be reduced.

2. A key signal generating apparatus adapted for generating a key signal from picture, the apparatus comprising:

change detecting means for detecting change of pixel value between pixels constituting the picture;

integrating means for integrating the change information indicating the change in the pixel values outputted by said change detection means; and key signal generating means for generating the key signal on the basis of an integrated value outputted by said integrating means;

wherein the key signal generating means is adapted so that in the case where motion blur takes place in the picture, it generates the key signal in which that motion blur is reflected.

3. A key signal generating apparatus adapted for generating a key signal from picture, the apparatus comprising:

change detecting means for detecting change of pixel value between pixels constituting the picture;

integrating means for integrating the change information indicating the change in the pixel values outputted by said change detection means; and key signal generating means for generating the key signal on the bases of an integrated value outputted by said integrating means;

wherein the key signal generating means is adapted so that in the case where alias takes place in the picture, it generates the key signal for allowing the influence of that alias to be reduced.

4. A key signal generating apparatus as set forth in claim 1, wherein the picture -consists of foreground picture and background picture, wherein the apparatus further comprises difference detecting means for detecting difference between the foreground picture and the background picture to output difference information indicating that difference, wherein the change detecting means outputs change information indicating change of the pixel value, and wherein the key signal generating means generates the key signal on the basis of the difference information and the change information.

5. A key signal generating apparatus adapted for generating a key signal from picture, the apparatus comprising:

the change detecting means for detecting change of pixel value between pixels constituting the picture;

integrating means for integrating the change information indicating the change in the pixel values outputted by said change detection means; and key signal generating means for generating the key signal on the basis of an integrated value outputted by said integrating means;

wherein the picture consists of foreground picture and background picture, wherein the apparatus further comprises difference detecting means for detecting difference between the foreground picture and the background picture to output difference information indicating that difference, wherein the change detecting means outputs change information indicating change of the pixel value, and wherein the key signal generating means generates the key signal on the basis of the difference information and the change information, and comprises:

normalizing means for normalizing the change information by the difference information to output normalized information obtained as the result of the normalization, and integration executing means for integrating the normalized information along a predetermined integral path.

6. A key signal generating apparatus as set forth in claim 5, wherein the predetermined integral path is a path along a direction in which change of the pixel value has been detected by the change detecting means.

7. A key signal generating apparatus as set forth in claim 1, wherein the change detecting means outputs change information indicating change of the pixel value, and wherein the key signal generating means integrates the change information within an integral range which is the range where the change information takes a predetermined threshold value or more to thereby generate the key signal.

8. A key signal generating apparatus as set forth in claim 7, wherein the key signal generating means integrates the change information along a predetermined integral path.

9. A key signal generating apparatus as set forth in claim 8, wherein the predetermined integral path is a path along a direction in which change of the pixel value has been detected by the change detecting means.

10. A key signal generating apparatus as set forth in claim 7, wherein the key signal generating means comprises:

range detecting means for detecting the integral range;

definite integral information generating means for integrating the change information along a predetermined integral path within the integral range to generate definite integral information of the change information within the integral range;

normalizing means for normalizing the change information by the definite integral information to output normalized information obtained as the result of the normalization; and integration executing means for integrating the normalized information to thereby generate the key signal.

11. A key signal generating apparatus as set forth in claim 10, wherein the predetermined integral path is a path along a direction in which change of the pixel value has been detected by the change detecting means.

12. A picture synthesis apparatus adapted for receiving a first picture consisting of at least foreground picture and background picture, and a second picture consisting of at least background picture to synthesize the foreground picture of the first picture and the background picture of the second picture, the apparatus comprising:

change detecting means for detecting change of pixel value between pixels constituting the first picture;

integrating means for integrating the change information indicating the change in the pixel values outputted by said change detection means;

key signal generating means for generating a key signal on the basis of an integrated value outputted by said integrating means; and synthesis means for synthesizing the foreground picture of the first picture and the background picture of the second picture by using the key signal generated by the key signal generating means.

13. A picture synthesis apparatus as set forth in claim 12, which further comprises difference detecting means for detecting difference between the foreground picture and the background picture of the first picture to output difference information indicating the difference, wherein the change detecting means outputs change information indicating change of the pixel value, and wherein the key signal generating means generates the key signal on the basis of the difference information and the change information.

14. A picture synthesis apparatus as set forth in claim 12, wherein the change detecting means outputs change information indicating change of the pixel value, and wherein the key signal generating means integrates the change information within an integral range which is the range where the change information takes a predetermined threshold value or more.

15. A key signal generating method of generating a key signal from a picture, the method comprising the steps of:

detecting change of pixel value between pixels constituting the picture;

integrating the change information indicating the change in the pixel values; and generating the key signal on the basis of an integrated value.

16. A key signal generating method of generating a key signal from picture, the method comprising the steps of:

detecting change of pixel value between pixels constituting the picture;

integrating the change information indicating the change in the pixel values; and generating the key signal on the basis of an integrated value;

wherein in the case where motion blur takes place in the picture, the key signal in which that motion blur is reflected is generated.

17. A key signal generating method of generating a key signal from a picture, the method comprising the steps of:

detecting change of pixel value between pixels constituting the picture;

integrating the change information indicating the change in the pixel values; and wherein in the case where alias takes place in the picture, the key signal for allowing the influence of the alias to be reduced is generated.

18. A key signal generating method as set forth in claim 15, wherein the picture consists of foreground picture and background picture, the method comprising the steps of:

detecting difference between the foreground picture and the background picture to output different information indicating the difference; and generating the key signal on the basis of change information indicating change of the pixel value and the difference information.

19. A key signal generating method as set forth in claim 18, the method comprising the steps of:

normalizing the change information by the difference information to output normalized information obtained as the result of the normalization; and integrating the normalized information along a predetermined integral path to thereby generate the key signal.

20. A key signal generating method as set forth in claim 19, wherein the predetermined integral path is a path along a direction in which change of the pixel value has been detected.

21. A key signal generating method as set forth in claim 15, wherein, within an integral range which is the range where change information indicating change of the pixel value takes a predetermined threshold value or more, the change information is integrated to thereby generate the key signal.

22. A key signal generating method as set forth in claim 21, wherein the change information is integrated along a predetermined integral path to thereby generate the key signal.

23. A key signal generating method as set forth in claim 22, wherein the predetermined integral path is a path along a direction in which change of the pixel value has been detected.

24. A key signal generating method as set forth in claim 21, the method comprising the steps of:

detecting the integral range;

integrating the change information along a predetermined integral path within the integral range to generate definite integral information of the change information within the integral range;

normalizing the change information by the definite integral information to output normalized information obtained as the result of the normalization; and integrating the normalized information to thereby generate the key signal.

25. A key signal generating method as set forth in claim 24, wherein the predetermined integral path is a path along a direction in which change of the pixel value has been detected.

26. A picture synthesis method of receiving a first picture consisting of at least foreground picture and background picture and a second picture consisting of at least background picture to synthesize the foreground picture of the first picture and the background picture of the second picture, the method comprising the steps of:

detecting change of pixel value between pixels constituting the first picture;

integrating the change information indicating the change in the pixel values;

generating a key signal on the basis of an integrated value; and synthesizing the foreground picture of the first picture and the background picture of the second picture by using the key signal.

27. A picture synthesis method as set forth in claim 26, the method comprising steps of:

detecting difference between the foreground picture and the background picture of the first picture; and generating the key signal on the basis of difference information indicating the difference and change information indicating change of the pixel value.

28. A picture synthesis method as set forth in claim 26, wherein, within an integral range which is the range where change information indicating change of the pixel value takes a predetermined threshold voltage or more, the change information is integrated to thereby generate the key signal.

\* \* \* \* \*